United States Patent
Nakashima et al.

(10) Patent No.: US 9,027,692 B2
(45) Date of Patent: May 12, 2015

(54) ELECTRIC SADDLED VEHICLE AND DRIVE DEVICE FOR ELECTRIC VEHICLE

(75) Inventors: Masahiro Nakashima, Kikuchi-gun (JP); Toshiaki Takamura, Konosu (JP)

(73) Assignee: Honda Motor Co., Ltd., Tokyo (JP)

(*) Notice: Subject to any disclaimer, the term of this patent is extended or adjusted under 35 U.S.C. 154(b) by 54 days.

(21) Appl. No.: 13/885,084

(22) PCT Filed: Nov. 16, 2011

(86) PCT No.: PCT/JP2011/076393
§ 371 (c)(1),
(2), (4) Date: May 13, 2013

(87) PCT Pub. No.: WO2012/067144
PCT Pub. Date: May 24, 2012

(65) Prior Publication Data
US 2013/0228389 A1    Sep. 5, 2013

(30) Foreign Application Priority Data

Nov. 19, 2010  (JP) .................................. 2010-259209
Dec. 3, 2010   (JP) .................................. 2010-270253

(51) Int. Cl.
*B62K 11/00* (2006.01)
*B62K 11/10* (2006.01)
(Continued)

(52) U.S. Cl.
CPC ................. *B62K 11/00* (2013.01); *B62K 11/10* (2013.01); *B62K 2202/00* (2013.01);
(Continued)

(58) Field of Classification Search
CPC .. B62M 7/12; B62K 2202/00; B62K 2204/00
USPC ........................................................ 180/220
See application file for complete search history.

(56) References Cited

U.S. PATENT DOCUMENTS 7,210,550 B2 *  5/2007  Yonehana et al. ............ 180/220
7,931,110 B2 *  4/2011  Nishiura et al. ............. 180/220
(Continued)

FOREIGN PATENT DOCUMENTS

CN    201240465    5/2009
JP    H2-60694     5/1990
(Continued)

OTHER PUBLICATIONS

Taiwanese Office Action dated Jun. 10, 2014, with partial English Translation of Search Report, 6 pages.
(Continued)

*Primary Examiner* — Tony Winner
(74) *Attorney, Agent, or Firm* — Rankin, Hill & Clark LLP

(57) ABSTRACT

An electric saddled vehicle includes a vehicle body frame, a drive-wheel, a drum brake that brakes drive-wheel, and a swing unit that is swingably supported by vehicle body frame. The swing unit includes a drive motor configured separately from drive-wheel and a speed-reducing-mechanism that transmits power from the drive motor to the drive-wheel and has a wheel-drive-portion. The drive motor and speed-reducing-mechanism are arranged on a first-side, the drum brake is arranged on a second-side, and the wheel-drive-portion is arranged so that a distance of the wheel-drive-portion to a first-end-surface of the drive-wheel is shorter than a distance of the wheel-drive-portion to a center of vehicle in the left-right-direction, and a brake drum of the drum brake is arranged at position where the brake drum overlaps a second-end-surface of the drive-wheel in plan view.

18 Claims, 33 Drawing Sheets

(51) Int. Cl.
  *F16D 51/16* (2006.01)
  *B62K 25/28* (2006.01)
  *B62M 7/12* (2006.01)
  *F16D 51/20* (2006.01)
  *F16D 51/00* (2006.01)

(52) U.S. Cl.
  CPC ........ *B62K 2204/00* (2013.01); *B62K 2208/00* (2013.01); *F16D 51/16* (2013.01); *F16D 2051/003* (2013.01); *B62K 25/283* (2013.01); *B62M 7/12* (2013.01); *F16D 51/20* (2013.01)

(56) References Cited

U.S. PATENT DOCUMENTS

2005/0177285 A1* 8/2005 Honda ............................ 701/22
2007/0054763 A1  3/2007 Mochizuki et al.
2010/0078251 A1* 4/2010 Nishiura et al. ............. 180/229

FOREIGN PATENT DOCUMENTS

| JP | 2001-315534 | 11/2001 |
| JP | 3943196 | 4/2007 |
| JP | 2008-100609 | 5/2008 |
| JP | 2010-088173 | 4/2010 |
| JP | 2010-247811 | 11/2010 |
| TW | I253424 | 4/2006 |
| TW | I274006 | 2/2007 |
| TW | I309281 | 5/2009 |
| WO | 2010/109970 | 9/2010 |

OTHER PUBLICATIONS

Extended European Search Report dated Aug. 4, 2014, Application No. 11840768.3.

* cited by examiner

ELECTRIC SADDLED VEHICLE AND DRIVE DEVICE FOR ELECTRIC VEHICLE

TECHNICAL FIELD

The present invention relates to an electric saddled vehicle. Additionally, the invention relates to a drive device for an electric vehicle, and particularly, to a drive device for an electric vehicle that has an electric motor, and a speed reducer (speed-reducing mechanism) that reduces the output of the electric motor to transmit the reduced output to a drive wheel, and can reduce the size of an electric vehicle by virtue of a new arrangement structure of respective shafts of the electric motor and the speed reducer.

Priority is claimed on Japanese Patent Application No. 2010-259209, filed Nov. 19, 2010, and Japanese Patent Application No. 2010-270253, filed Dec. 3, 2010, the contents of which are incorporated herein by reference.

BACKGROUND ART

In the related art, there are electric saddled vehicles in which batteries for driving are mounted on a vehicle body side, a direct drive type wheel-in motor (in-wheel motor) is directly attached to one side of a rear wheel, and a drum brake that is a rear-wheel brake is provided on the other side of the rear wheel (for example, refer to Patent Document 1).

Additionally, there are known in-wheel type electric motorcycles in which an electric motor and a speed reducer are arranged so as to overlap a wheel of a rear wheel that is a drive wheel in a vehicle width direction. For example, Patent Document 2 discloses a drive device for an electric motorcycle in which an idling shaft is arranged ahead of an output shaft (hereinafter referred to as a "final shaft") of a speed reducer, and an output shaft (hereinafter referred to as a "drive shaft") of an electric motor is arranged ahead of the final shaft and on the upper rear side of the idling shaft.

PRIOR ART DOCUMENTS

Patent Documents

[Patent Document 1] Japanese Unexamined Utility Model Application, First Publication No. H2-60694
[Patent Document 2] Japanese Patent No. 3943196

SUMMARY OF INVENTION

Problems to be Solved by the Invention

Incidentally, if the direct-drive-type wheel-in motor is used for an electric saddled vehicle as in the above related-art configuration described in Patent Document 1, the drive motor and the wheel become exclusive parts, which is not preferable. For this reason, for example, in a unit swing type vehicle that has an existing speed-reducing mechanism, a configuration capable of selecting various wheels or the like is required.

Additionally, in the above related-art configuration, the drive motor is offset to the side opposite to the drum brake. From this, the center of gravity of the swing unit has a tendency to be offset to any side (one side) with respect to a vehicle body left-and-right center. Hence, in case where the center of gravity of an overall vehicle including this offset drive motor is balanced, deliberation, such as offsetting the batteries, is required.

However, in electric vehicles, it is desired to mount as larger batteries as possible in order to increase mileage. For this reason, in a case where cheap lead batteries are used, the lead batteries themselves become large. As a result, a case where the batteries cannot be offset is considered. From this, it is desired to maintain a left-and-right balance in a swing unit as a single body.

In the related-art electric motorcycle described in Patent Document 2, the final shaft that is a rear-wheel shaft is located at a rearmost portion of the drive device. Hence, in a case where a power unit is provided by providing the drive device in a swing arm swingably supported by a vehicle body frame, the swing arm becomes long in the front-and-rear direction of the vehicle. For this reason, a wheel base becomes large. Particularly, in a case where the drive shaft, the idling shaft, and the final shaft are housed into a unit in an integral case, and this unit is attached to the swing arm, it is considered that the wheel base becomes still larger. Additionally, when the performance or size of the motor is changed according to required specification in the case of a related-art device in which the final shaft is located at a final end, a case of the swing arm itself should be designed in detail according to the distance between the pivot portion and the final shaft as well as design changes in the speed reducer including a driving gear, an idling gear, and a final gear.

Additionally, if both the electric motor and the speed reducer are arranged in the in-wheel as in the related-art device described in Patent Document 2, the wheel is enlarged. From this, further improvement for compactness becomes a problem when the in-wheel type is used as the drive device.

Thus, an object of the invention is to provide an electric saddled vehicle that can select various wheels or the like and can improve a left-and-right balance in a swing unit as a single body.

Additionally, another object of the invention is to provide a drive device for an electric vehicle that copes with the above problem, and is suitable to integrate an axial arrangement structure and achieve further compactness when an in-wheel type is used.

Means for Solving the Problems

In order to solve the above problems, respective aspects of the invention have adopted the followings means.

[1] An electric saddled vehicle related to an aspect of the invention includes a vehicle body frame; a drive wheel; a drum brake that brakes the drive wheel; and a swing unit that is swingably supported by the vehicle body frame. The swing unit has: a drive motor configured separately from the drive wheel; and a speed-reducing mechanism that transmits the power from the drive motor, to the drive wheel and has a wheel drive portion. If one of the left side and the right side with respect to the center of the vehicle in the left-right direction is defined as a first side and the other is defined as a second side and if the end surface of the drive wheel on the first side is defined as a first end surface and the end surface of the drive wheel on the second side is defined as a second end surface, the drive motor and the speed-reducing mechanism are arranged on the first side, the drum brake is arranged on the second side, the wheel drive portion is arranged between the center of the vehicle in the left-right direction and the first end surface of the drive wheel, and the brake drum of the drum brake is arranged at a position where the brake drum overlaps the second end surface of the drive wheel in a plan view.

In addition, the electric saddled vehicle includes all vehicles in which a person rides over a vehicle body, and includes not only motorcycles (including bicycles with a motor and scooter type vehicles) but also three-wheel (including vehicles with two front wheels and one rear wheel besides vehicles with one front wheel and two rear wheels) or four-wheel vehicles.

[2] In the electric saddled vehicle described in the above [1], the swing unit may further have a swing arm and a speed-reducer case that houses the speed-reducing mechanism, a front portion of the swing arm may be supported by the vehicle body frame, and a rear portion of the swing arm supports the drive wheel, the speed-reducer case may have an outer case half body formed integrally with the swing arm; and an inner case half body attached to the outer case half body from a left-and-right center side of the vehicle body, and a mating plane between the outer case half body and the inner case half body may be arranged so that the distance to the first end surface of the drive wheel is shorter than the distance to the left-and-right center of the vehicle body.

[3] In the electric saddled vehicle described in the above [1] or [2], the distance from the wheel drive portion to the left-and-right center of the vehicle body may be shorter than the distance from the first end surface to the left-and-right center of the vehicle body.

[4] In the electric saddled vehicle described in any one of the above [1] to [3], the brake drum may have an opening covered with a brake panel, and a mating plane between the brake drum and the brake panel may be arranged so that the distance to the second end surface of the above is shorter than the distance to the left-and-right center of the vehicle body.

[5] In the electric saddled vehicle described in any one of the above [1] to [3], a cam shaft of the drum brake may be arranged at a position that overlaps the second end surface in a plan view.

[6] In the electric saddled vehicle described in any one of the above [1] to [3], the swing unit may further have a case hub portion that is provided at the inner case half body and has an opening; a drive shaft that is rotatably supported by the case hub portion via a bearing, protrudes to the outside of the speed-reducer case through the inner case half body, and rotates integrally with the wheel drive portion; and an oil seal that is arranged between the opening in an inner periphery of the case hub portion, and the bearing, and an annular recess may be provided between the opening in the inner periphery of the case hub portion and the oil seal.

[7] In the electric saddled vehicle described in any one of the above [1] to [6], the annular recess may be provided with an opening, and a drain passage may be provided to allow the communication from the opening of the annular recess to the first side of the swing unit.

[8] In the electric saddled vehicle described in any one of the above [1] to [7], the drive motor may be housed in the speed-reducing mechanism, the swing arm may further have a pivot portion and an arm portion, the pivot portion may be pivotally supported by the vehicle body frame, the arm portion may extend to the rear side of the vehicle body from the pivot portion and supports a rear wheel at a rear end portion of the vehicle body, the drive motor may drive the rear wheel, the speed-reducing mechanism may further have an output shaft of the drive motor, a final shaft coupled to the rear wheel, and an idling shaft that supports two idling gears, the two idling gears may reduce the rotation of the output shaft to transmit the reduced rotation to the final shaft, the output shaft may be arranged on the upper rear side of the final shaft, the idling shaft may be arranged on the lower rear side of the output shaft, and the interior angle formed by a first segment that connects the axial center of the final shaft and the axial center of the output shaft and a second segment that connects the axial center of the final shaft and the axial center of the idling shaft may form an acute angle in a side view.

[9] In the electric saddled vehicle described in the above [8], the speed-reducing mechanism may be settled inside a wheel of the rear wheel in a side view.

[10] In the electric saddled vehicle described in the above [8] or [9], a final gear may be supported by the final shaft, one of the two idling gears of the idling shaft may be a second-stage idling gear that meshes with the final gear, and the final gear and the second-stage idling gear may be arranged at a position that overlaps the rear wheel as seen from the rear.

[11] In the electric saddled vehicle described in any one of the above [8] to [10], one of the two idling gears of the idling shaft may be a first-stage idling gear that meshes with the output shaft, and a driving gear provided at the output shaft may mesh with the first-stage idling gear at a position further toward the front of the vehicle body than the idling shaft.

[12] In the electric saddled vehicle described in any one of the above [8] to [11], the drive motor may be arranged at a position that overlaps the two idling gears and the final gear in a vehicle side view.

[13] In the electric saddled vehicle described in any one of the above [8] to [12], the axial center of the output shaft, the axial center of the idling shaft, and the axial center of the final shaft may be arranged so as to be respectively located at the vertexes of an equilateral triangle in a side view.

[14] In the electric saddled vehicle described in any one of the above [8] to [13], the idling shaft and the final shaft may be arranged substantially at the same height.

[15] In the electric saddled vehicle described in any one of the above [8] to [14], wherein the swing arm further has a rear case portion integrated with a case of the speed-reducing mechanism; and a front case portion that is separably joined to the rear case portion and has the pivot portion.

Effects of Invention

According to the electric saddled vehicle related to the aspect of the above [1], the drive motor and the speed-reducing mechanism configured separately from the drive wheel are arranged on one side (one of the left side and the right side with respect to the left-and-right center of the vehicle is defined as the first side) of the drive wheel. For this reason, the drive wheel, the drum brake, the speed-reducing mechanism, and the like in the existing unit swing type vehicle can be used. Additionally, a left-and-right balance in the swing unit as a single body can be improved by arranging the speed-reducing mechanism and the drum brake near (in the vicinity of the left-and-right full width of the drive wheel) the vehicle body left-and-right center (vehicle body left-and-right centerline).

Additionally, according to the electric saddled vehicle related to the aspect of the above [2], the left-and-right balance in the swing unit as a single body can be further improved by arranging the mating plane of the speed-reducer case that houses the speed-reducing mechanism near the vehicle body left-and-right center (vehicle body left-and-right centerline).

Additionally, according to the electric saddled vehicle related to the aspect of the above [3], since the wheel drive portion of the speed-reducing mechanism is arranged near the vehicle body left-and-right center, that is, between the end surface of the first side and the vehicle body left-and-right centerline, this can contribute to improvement in the left-and-right balance of the vehicle body.

Additionally, according to the electric saddled vehicle related to the aspect of the above [4], the mating plane of the brake drum (having an opening) that opens toward the vehicle body left-and-right outer sides and the brake panel that covers the opening side (opening) is arranged near the vehicle body left-and-right center (between the second end surface and the vehicle body left-and-right center plane). For this reason, the left-and-right balance in the swing unit as a single body can be further improved.

Additionally, according to the electric saddled vehicle related to the aspect of the above [5], the cam shaft of the drum brake is arranged at a position that overlaps the end surface of the second side, that is, near the vehicle body left-and-right center in a plan view. For this reason, this can contribute to improvement in the left-and-right balance of the vehicle body.

Additionally, according to the electric saddled vehicle related to the aspect of the above [6], even in a case where the speed-reducing mechanism and the drum brake are arranged in close proximity to each other, the drum brake cannot be easily affected by the oil when the oil within the speed-reducer case has leaked from the oil seal to the case outer opening side (the outside of the opening).

Additionally, according to the electric saddled vehicle related to the aspect of the above [7], it is possible to discharge the oil that the annular recess has received to the side opposite to the drum brake. For this reason, the drum brake can be more reliably invulnerable to the oil.

Additionally, according to the electric saddled vehicle described in the above [8], the output shaft of the motor and the final shaft approach each other in the up-and-down direction. For this reason, the size of the speed-reducing mechanism in the up-and-down direction can be made compact. Additionally, the distance between the pivot portion and the final shaft is shortened by arranging the final shaft on the front of the vehicle with respect to the idling shaft or the motor output shaft. As a result, the overall drive device around the final shaft can be compactly accommodated. Moreover, the length of the swing arm can be shortened. Moreover, even in a case where the performance or size of the motor is changed according to required specification, the design of only the speed-reducing mechanism portion may be changed, and the swing arm itself can be prevented from being changed in design.

Additionally, since the motor having a thickness in the width direction of the vehicle is arranged above the idling gear and the final gear, a larger angle of bank can be secured.

Additionally, according to the electric saddled vehicle described in the above [9], it is easy to arrange the speed-reducing mechanism in an in-wheel type.

Additionally, according to the electric saddled vehicle described in the above [10], the dimension of the vehicle in the width direction can be suppressed so that the idling gear and the final gear overlap each other in the width direction of the rear wheel.

Additionally, according to the electric saddled vehicle described in the above [11], the speed-reducing mechanism can be kept from becoming long in the up-and-down direction. For this reason, it is easier to make the speed-reducing mechanism into an in-wheel.

Additionally, according to the electric saddled vehicle described in the above [12], a compact drive device in which the motor is brought close to the lower side while securing an angle of bank can be provided.

Additionally, according to the electric saddled vehicle described in the above [13], since each shaft-to-shaft distance is shortened, a smaller-diameter wheel can be made into an in-wheel.

Additionally, according to the electric saddled vehicle described in the above [14], the idling shaft and the final shaft are arranged substantially horizontally (substantially at the same height). For this reason, the amount of lubricating oil within the speed-reducing mechanism can be suppressed to a requisite minimum.

Additionally, according to the electric saddled vehicle described in the above [15], the rear case portion and the front case portion are separably joined together. For this reason, when a motor and a speed-reducing mechanism are selected according to specification required for the vehicle rank or the like of an electric vehicle, the motor and the speed-reducing mechanism can be commonly used for various vehicles without changing the design of chief portions of the swing arm including the pivot portion, that is, the front case portion.

DESCRIPTION OF EMBODIMENTS

Figure 1:
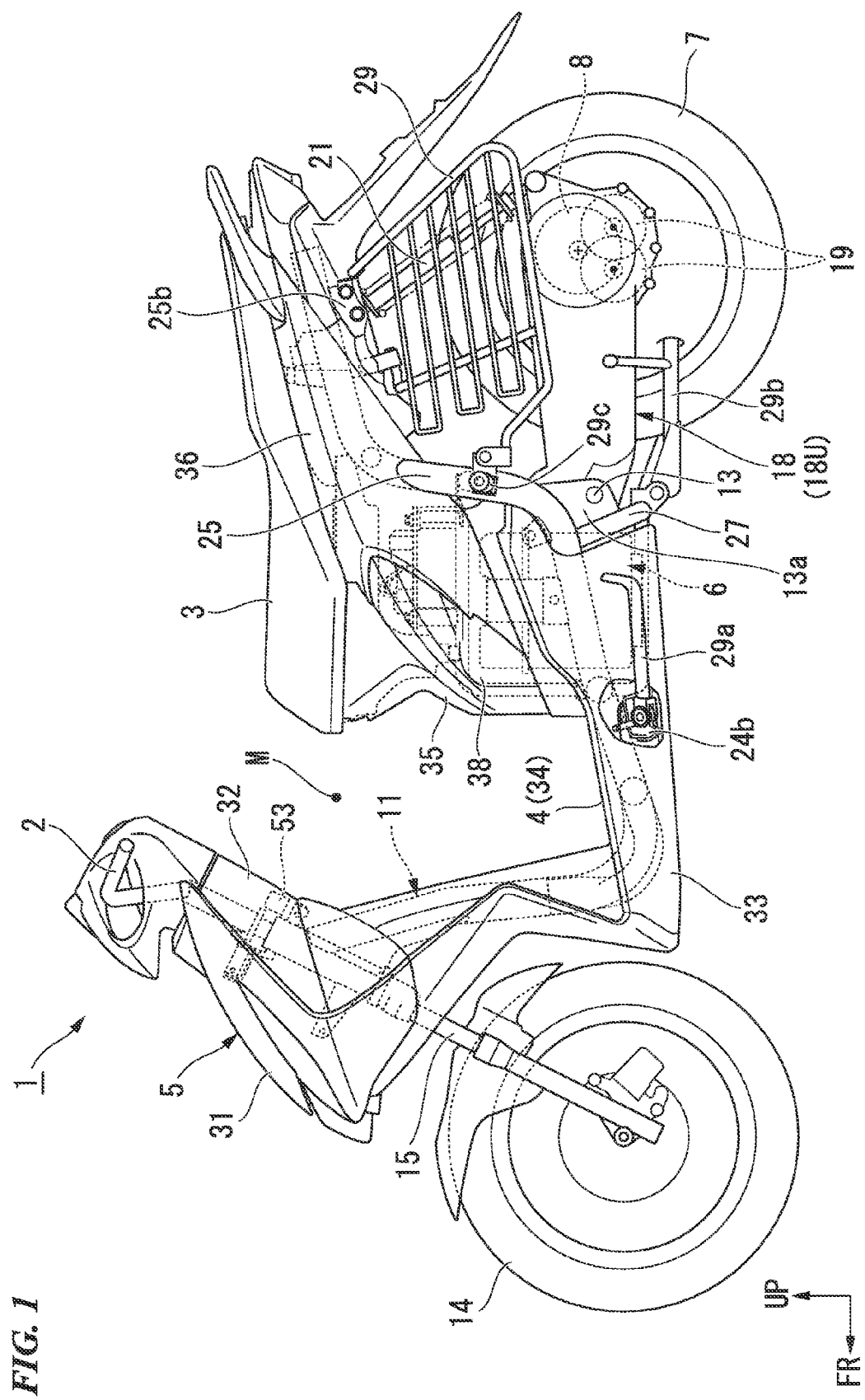
FIG. 1 is a left side view of a motorcycle in an embodiment of the invention.

A first embodiment of the invention will be described below referring to the drawings. In addition, directions, such as the front, the rear, the left, and the right, in the following description are the same as directions in a vehicle to be described below unless particularly mentioned. Additionally, arrow FR indicating the vehicle front, arrow LH indicating the vehicle left, and arrow UP indicating the vehicle upside are shown in proper places in the drawings to be used for the following description.

Figure 2:
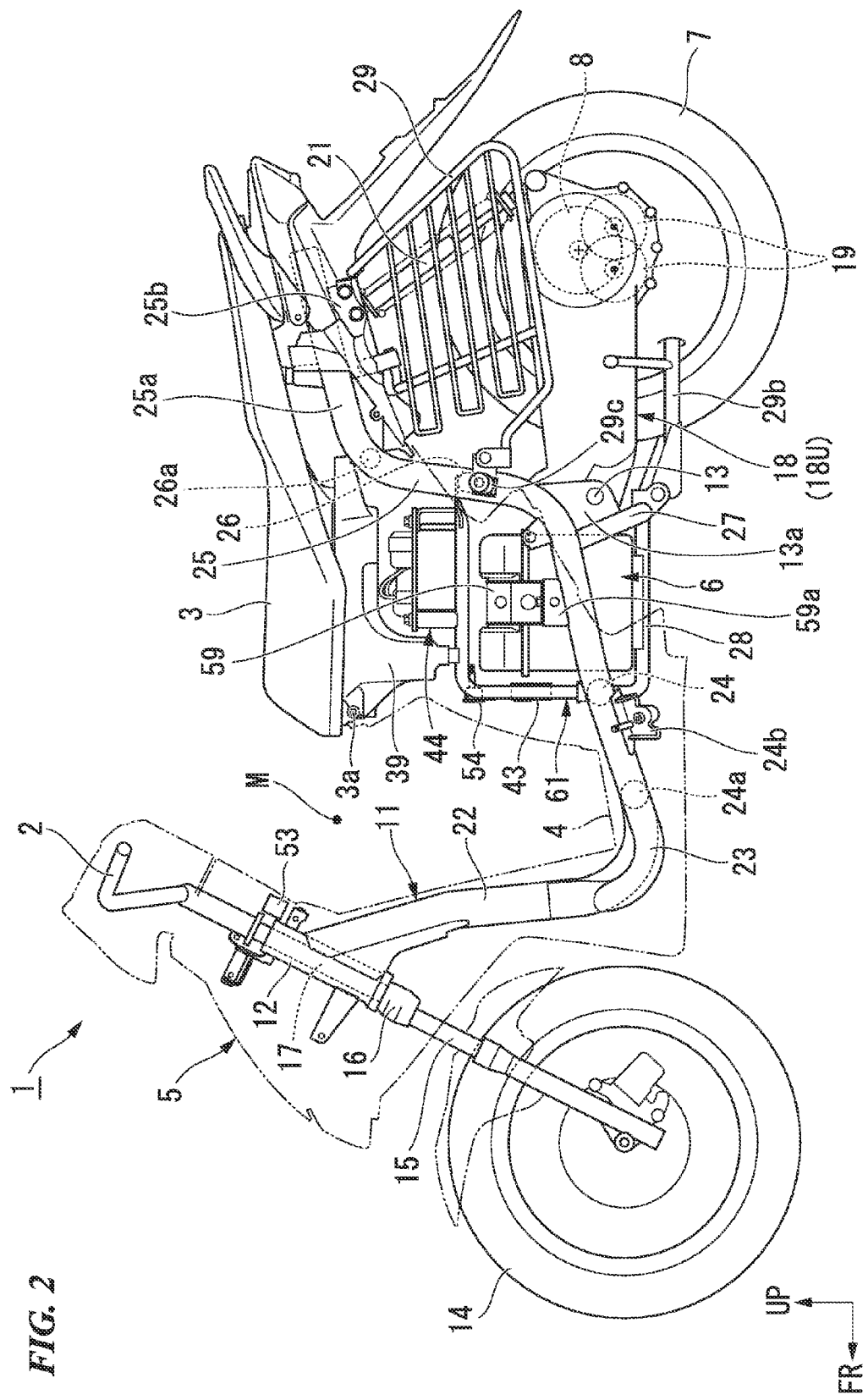
FIG. 2 is a left side view of a state where a vehicle body cover of the above motorcycle is removed.

A scooter type motorcycle 1 shown in FIGS. 1 and 2 includes a step floor 4 as a low-floor portion that is provided between a bar handle 2 for steering and a seat 3 on which a rider is seated, and allows the rider puts his/her feet thereon, and a vehicle body cover 5 that covers a substantially overall vehicle body. In addition, reference numeral M in the drawing designates a straddling space above the step floor 4.

A battery unit 6 is mounted at a rear position of the step floor 4. A drive motor 8 (electric motor) on the left side (a first side that is one of left and right sides) of a rear wheel 7 that is a drive wheel receives the electric power from the battery unit 6, and is driven. Then, the rear wheel 7 is driven by the driving force to make the motorcycle 1 travel. That is, the motorcycle 1 functions as an electric saddled vehicle.

As for a vehicle body frame 1 of the motorcycle 1, a plurality of types of steel materials are integrally joined by welding or the like. A head pipe 12 that steerably supports a front wheel suspension system is provided at a front end portion of the vehicle body frame 11. A pivot 13 that makes a rear wheel suspension system swingable up and down is supported on the lower rear side of the vehicle body frame 11.

The front wheel suspension system has left and right front forks 15 that journals a front wheel 14 at a lower end portion, a bridge member 16 that fixes upper end portions of the left and right front forks 15 together, and a stem pipe 17 that extends upward from a central portion of the bridge member 16 in the left-and-right direction. The stem pipe 17 is inserted through the head pipe 12 so as to be relatively rotatable from below the head pipe. An upper end portion of the stem pipe 17 protrudes above the head pipe 12. The bar handle 2 is fixed to the protruding portion of the stem pipe 17.

The rear wheel suspension system includes a swing arm 18 that journals the rear wheel 7 at a rear end portion. The swing arm 18 has a swing unit 18U that has a drive motor 8 and a gear mechanism (speed-reducing mechanism) 19 built in a rear end portion of a left arm 18b. A front end portion of the swing unit 18U is supported on the lower rear side of the vehicle body frame 11 via the pivot 13 so as to be swingable up and down. A rear end portion of the swing unit 18U is elastically supported on the upper rear side of the vehicle body frame 11 via cushion units 21. The swing unit 18U will be described below in detail.

Figure 3:
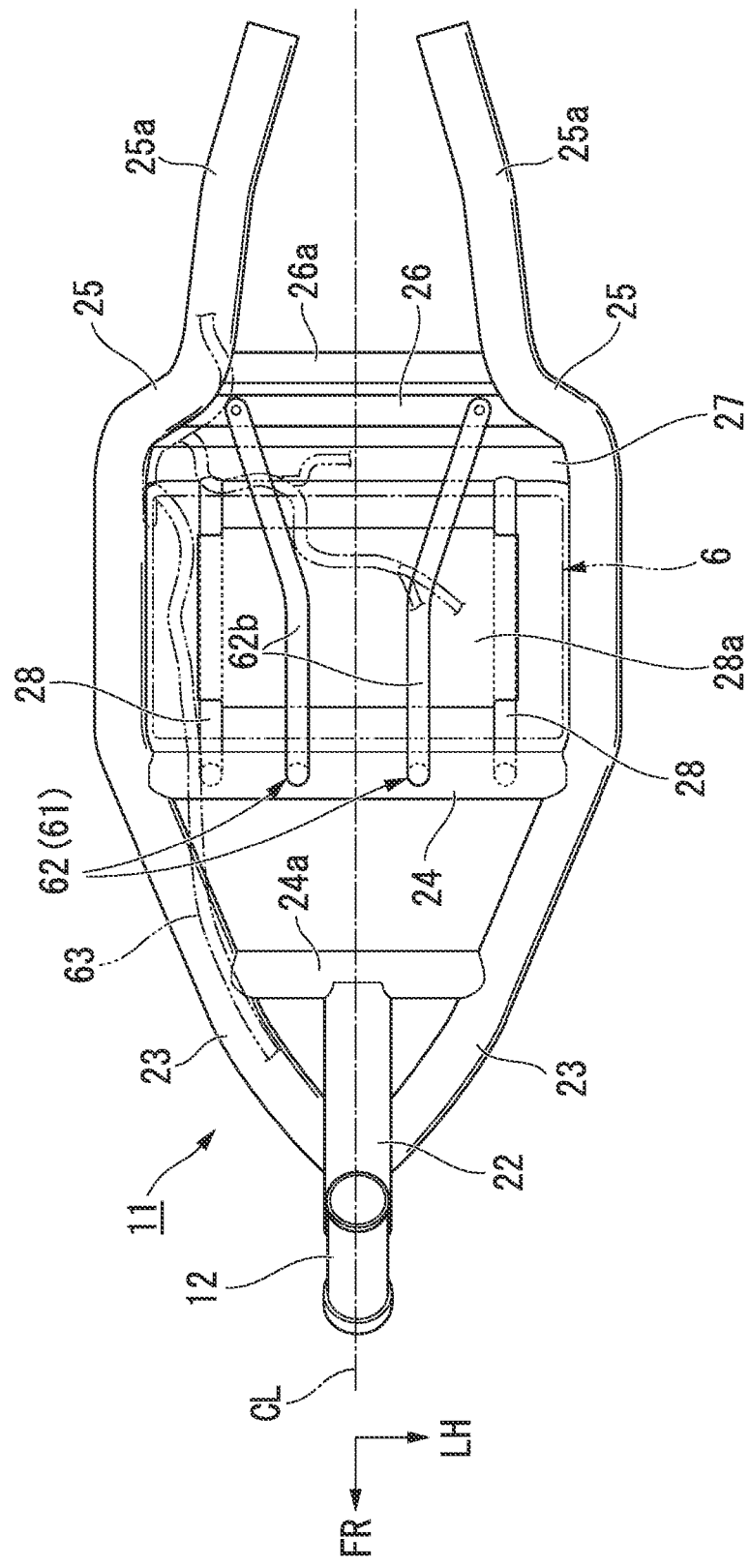
FIG. 3 is a top view of the vehicle body frame of the above motorcycle.

As shown in FIGS. 2 and 3, the vehicle body frame 11 includes the head pipe 12, a single down frame 22 that has an upper end (front end) joined to a rear portion of the head pipe 12 and extends obliquely downward and rearward at the left-and-right center of the vehicle body from the rear portion of the head pipe 12, and a pair of left and right lower frames 23 that have a front end joined to both sides of a lower portion of the down frame 22, branch to the left and right from the lower portion of the down frame 22, and extends rearward and upward. A lower end portion of the down frame 22 and front end portions of the lower frames 23 are curved so as to overlap each other in a vehicle side view. In addition, line CL in FIG. 3 or other drawings designates a vehicle body left-and-right centerline. Line CL is a line when a vehicle body left-and-right center plane is seen in a plan view, a front view, or a rear view. The rear wheel 7 is arranged at the center of the vehicle body in the left-and-right direction. The left-and-right centerline of the drive wheel coincides with the left-and-right centerline of the vehicle body.

As shown in FIG. 3, the left and right lower frames 23 extend obliquely in first half portions thereof so as to be located further toward the left-and-right outer sides as they go to the rear side. Additionally, in the second half portions of the left and right lower frames, the frames are substantially parallel to the vehicle body center plane (shown by the centerline CL) and extend rearward. Front-and-rear intermediate portions of the left and right lower frames 23 are coupled together by a center crossing pipe 24 parallel to the left-and-right direction. Front portions of the left and right lower frames 23 are coupled together by a front crossing pipe 24a parallel to the left-and-right direction. Rear portions of the left and right lower frames 23 are coupled together by a rear lower pipe 27 that extends left and right.

As shown in FIG. 2, a lower end (rear end) of the down frame 22 is butt-joined to the left-and-right center of the front crossing pipe 24a from the front. A side stand bracket 24b that rotatably supports a side stand 29a is fixed to the front-and-rear intermediate portion of the left lower frame 23. The rear portions of the left and right lower frames 23 have a maximum width in the vehicle body frame 11. The battery unit 6 is mounted between the center crossing pipe 24 and the rear lower pipe 27 between the rears portions of the left and right lower frames 23.

Rear end portions of the left and right lower frames 23 are curved upward. Lower end portions of left and right rear frame 25 that incline rearward and extend upward are integrally connected to the rear end portions of the left and right lower frames. Additionally, upper end portions of the left and right rear frame 25 are curved rearward. Front end portions of left and right seat frames 25a that incline upward to the rear and extend rearward are integrally connected to the upper end portions of the left and right rear frame. The left and right rear frame 25 incline so as to be located further toward the left-and-right inner sides (refer to FIG. 5) as they go to the upper side, and the left and right seat frames 25a incline so as to be located further toward the left-and-right inner sides as they go to the rear side.

In addition, reference numeral 26 in the drawing designates a rear lower cross pipe that couples up-and-down intermediate portions of the left and right rear frame 25 together, and reference numeral 26a designates a rear upper crossing pipe that connects upper end portions of the left and right rear frame 25 together. Left and right cushion brackets 25b that support upper end portions of the left and right cushion units 21 are fixed to the lower sides of the left and right seat frames 25a, respectively. An upper end portion of a dress guard 29 is supported by the left cushion bracket 25b.

Figure 6:
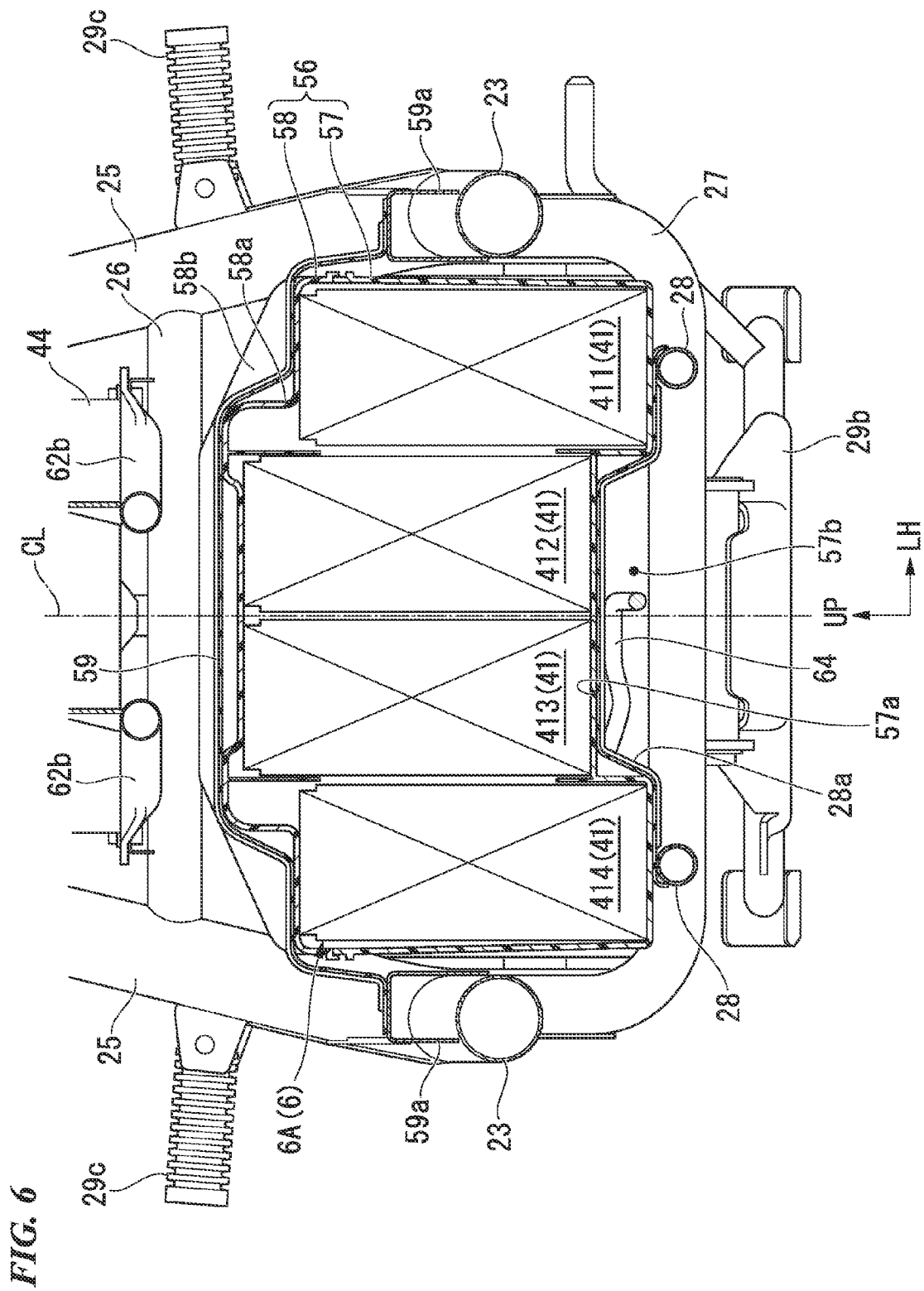
FIG. 6 is a cross-sectional view around a battery unit of the above vehicle body rear portion.

As shown in FIGS. 2 and 6, the rear lower pipe 27 is provided so that both sides of a main body portion parallel to the left-and-right direction are curved upward, and so as to have a U-shape that opens upward in a front view. Both side portions of the rear lower pipe 27 extend upward in forwardly inclined posture. The tip of the rear lower pipe is butt-joined to the rear end portions of the left and right lower frames 23 from below. Front end portions of left and right pivot brackets 13a are respectively joined to rear sides of both the side portions of the rear lower pipe 27. Upper end portions of the left and right pivot brackets 13a are joined to lower end portions of the left and right lower frames 23, respectively. The pivot 13 is supported by the left and right pivot brackets 13a. A main stand 29b is rotatably supported by the rear lower pipe 27.

As shown in FIGS. 2 and 3, rear ends of left and right under pipes 28 that extend back and forth is butt-joined to both left and right sides of the rear lower pipe 27 from the front. Front end portions of the left and right under pipes 28 are curved upward. The tips of the left and right under pipes are butt-joined to both left and right sides of the center crossing pipe 24 from below. A stepped supporting plate 28a in which the left-and-right inner sides are displaced upward with respect to the left-and-right outer sides like a bottom wall 57a of a battery case 56 to be described below is laid over the left and right under pipes 28. The battery unit 6 is mounted on the left and right under pipes 28 and the supporting plate 28a. In addition, the respective frames 22, 23, 25, and 25a and the pipes 24, 24a, 26, 26a, 27, and 28 are provided by, for example, circular steel pipes.

As shown in FIGS. 1 and 2, the seat 3 is disposed via the straddling space M behind the head pipe 12. The seat 3 integrally has, for example, seating surfaces for a rider and a rear fellow passenger back and forth and extends to the vicinity of the vehicle body rear portion. The seat 3 functions also as a lid that opens and closes a top opening of a goods storage box 39 that is located below a front portion thereof. In addition, reference numeral 3a in the drawing designates a rotation shaft that rotatably couples the lower side of a front end portion of the seat 3 to a front end portion of the goods storage box 39.

The vehicle body cover 5 has a front cover 31 that covers the peripheries of the head pipe 12 and the down frame 22 from the front thereof, a front inner cover 32 that covers the peripheries of the head pipe 12 and the down frame 22 from the rear thereof, an under cover 33 that covers the peripheries f the left and right lower frames 23 from the lower side there to the left-and-right outer sides, and a step floor cover 34 that covers the peripheries of the left and right lower frames 23 from the upper side thereof. This provides a step floor 4.

Additionally, the vehicle body cover 5 has a rear center cover 35 that rises from a rear portion of the step floor cover 34 toward a front lower end of the seat 3, and covers the battery unit 6 and a control unit 44 and a goods storage box 39 above the battery unit from the front thereof, left and right rear side covers 36 that extend so as to be continuous obliquely upward and rearward from the left and right side portions of the rear center cover 35 and that cover the peripheries of the left and right rear frame 25 and the left and right seat frames 25a from the left-and-right outer sides thereof below both sides of the rear portion of the seat 3. The respective covers 31 to 36 are formed from, for example, synthetic resin.

As for the step floor cover 34, the step floor 4 that inclines with respect to the horizontal direction between the front inner cover 32 and the rear center cover 35 is provided. Rear end portions of the left and right lower frames 23, lower portions of the left and right rear frame 25, the left and right pivot brackets 13a, and the rear lower pipe 27 are not covered with the vehicle body cover 5, and are exposed to the outside (the outside of the vehicle body) thereof. Foldable left and right steps 29c that are available by the rear fellow passenger are supported in the vicinity of end portions of the rear lower cross pipe 26 that are exposed portions of the left and right rear frame 25. Moreover, a front end portion of the dress guard 29 is supported in the vicinity of the left step 29c.

The left and right steps 29c are arranged at positions that do not overlap the battery unit 6 in a vehicle side view, behind an upper portion of the battery unit 6. Accordingly, even if an external force from the outer side in the vehicle width direction is applied to the left and right steps 29c that overhang to the outer sides of the left and right rear frame 25 in the vehicle width direction and the left and right rear frame 25 are deformed inward in the vehicle width direction, the external force is prevented from being intensively applied to the battery unit 6. Additionally, since the left and right rear frame 25 incline so as to be located further toward the left-and-right inner sides as they go to the upper side, the vehicle width around the left and right steps 29c is stopped as the left and right steps 29c are located further toward the upper side.

Figure 5:
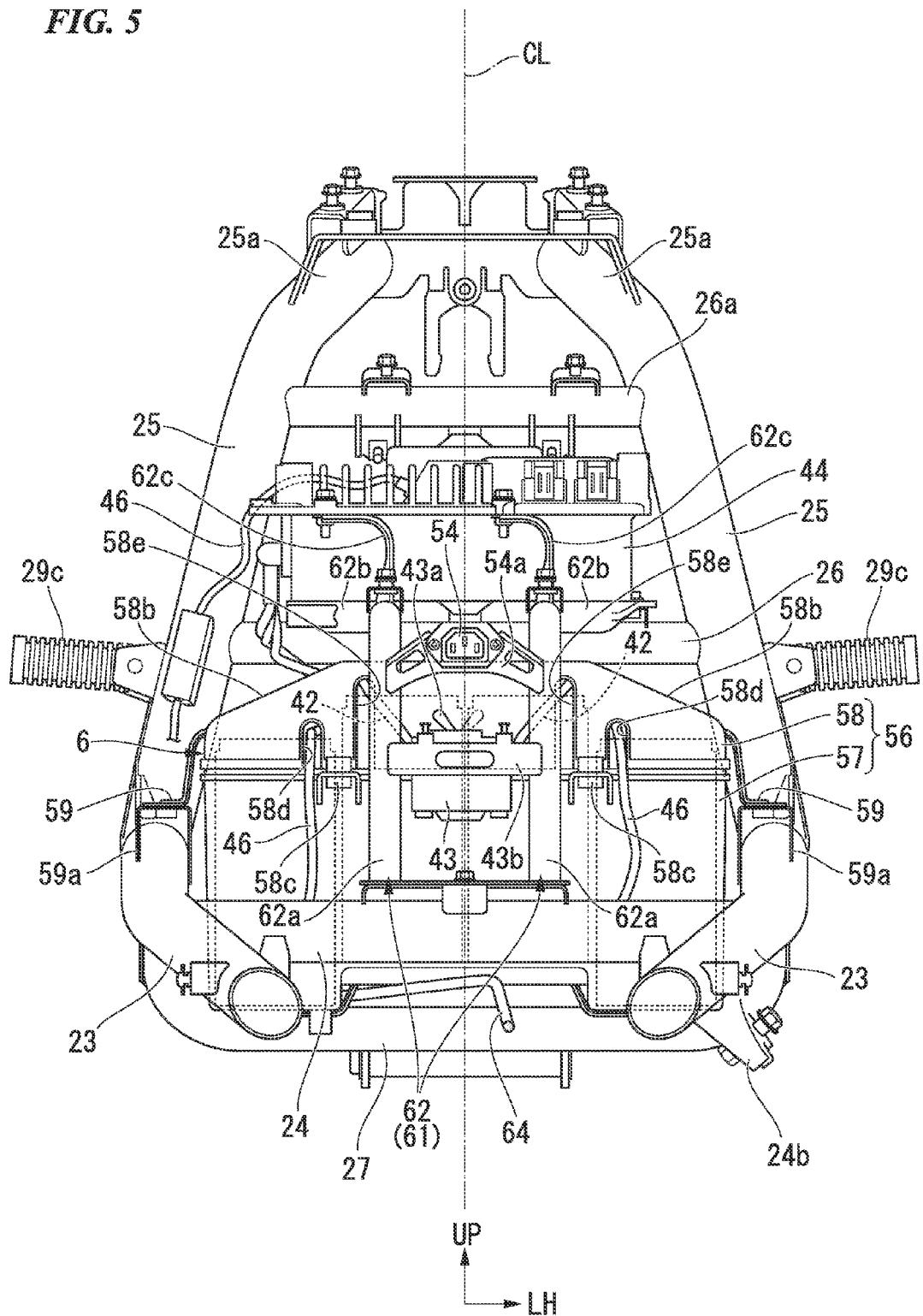
FIG. 5 is a front view of a state where a vehicle body cover of the above vehicle body rear portion is removed.
Figure 7:
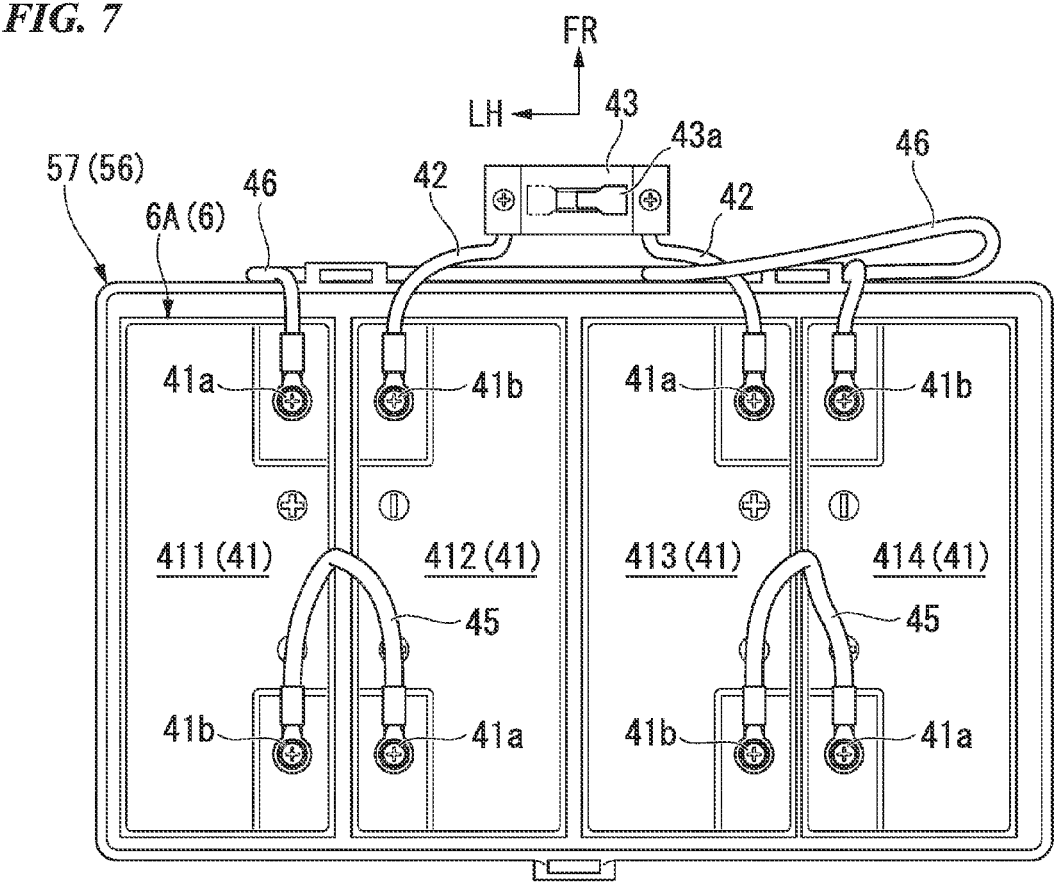
FIG. 7 is a plan view of a high-voltage battery or the like of the above battery unit.

As shown in FIGS. 5, 6, and 7, as for the battery unit 6, for example, four lead batteries 41 of 12 V are disposed side by side along the vehicle width direction (left-and-right direction). As these batteries are connected in series, a high-voltage battery 6A of 48 V is formed. The high-voltage battery 6A is housed within the single battery case 56. By supplying electric power from the battery unit 6 via the control unit (driver) 44 to the drive motor 8, the drive motor 8 is driven to make the motorcycle 1 travel.

As shown in FIG. 7, each lead battery 41 has a rectangular parallelepiped shape that forms an oblong shape in plan view. The lead battery 41 also has a positive electrode terminal 41a and a negative electrode terminal 41b at the positions of both ends of the oblong shape. The positive electrode terminal 41a and the negative electrode terminal 41b of each lead battery 41 are turned upward, and these terminals are arranged back and forth. The long sides of the respective lead batteries 41 are made to be adjacent to each other, and are disposed side by side along the vehicle width direction. The respective lead batteries 41 are arranged such that the positive electrode terminals 41a and the negative electrode terminals 41b thereof are made alternate back and forth between adjacent lead batteries 41. Hereinafter, the respective lead batteries 41 may be shown by 411, 412, 413, and 414 in order from the left.

A pair of lead batteries 412 and 413 located on the inner sides in the left-and-right direction in the high-voltage battery 6A are disposed side by side such that long sides opposite to long sides where respective terminals 41a and 41b thereof are located are made adjacent to each other in a plan view. The positive electrode terminal 41a and negative electrode terminal 41b that are located on the front sides of respective long sides in the lead batteries 412 and 413 are connected together via intermediate cables 42.

The intermediate cables 42 have a circuit breaker 43. The circuit breaker 43 is arranged at a left-and-right intermediate position ahead of an upper portion of the battery case 56 (refer to FIG. 5). The circuit breaker 43 connects or disconnects a connection line in an intermediate portion of the high-voltage battery 6A by the left-and-right swing operation (intermittence operation of the circuit breaker 43) of a lever 43a that protrudes upward from an upper portion thereof.

As shown in FIG. 6, the battery case 56 is made of, for example, synthetic resin, and has a case body 57 (having an opening) that opens upward and a case cover 58 that blocks the upper opening (top opening). The case body 57 forms a horizontally long rectangular parallelepiped box shape (refer to FIG. 7) corresponding to the appearance of the high-voltage battery 6A. A bottom wall 57a of the case body is arranged such that the respective lead batteries 41 shifts up and down as will be described below. With such arrangement, the respective lead batteries 41 are provided in a stepped fashion such that the left-and-right inner sides are displaced upward with respect to the left-and-right outer sides.

Figure 9:
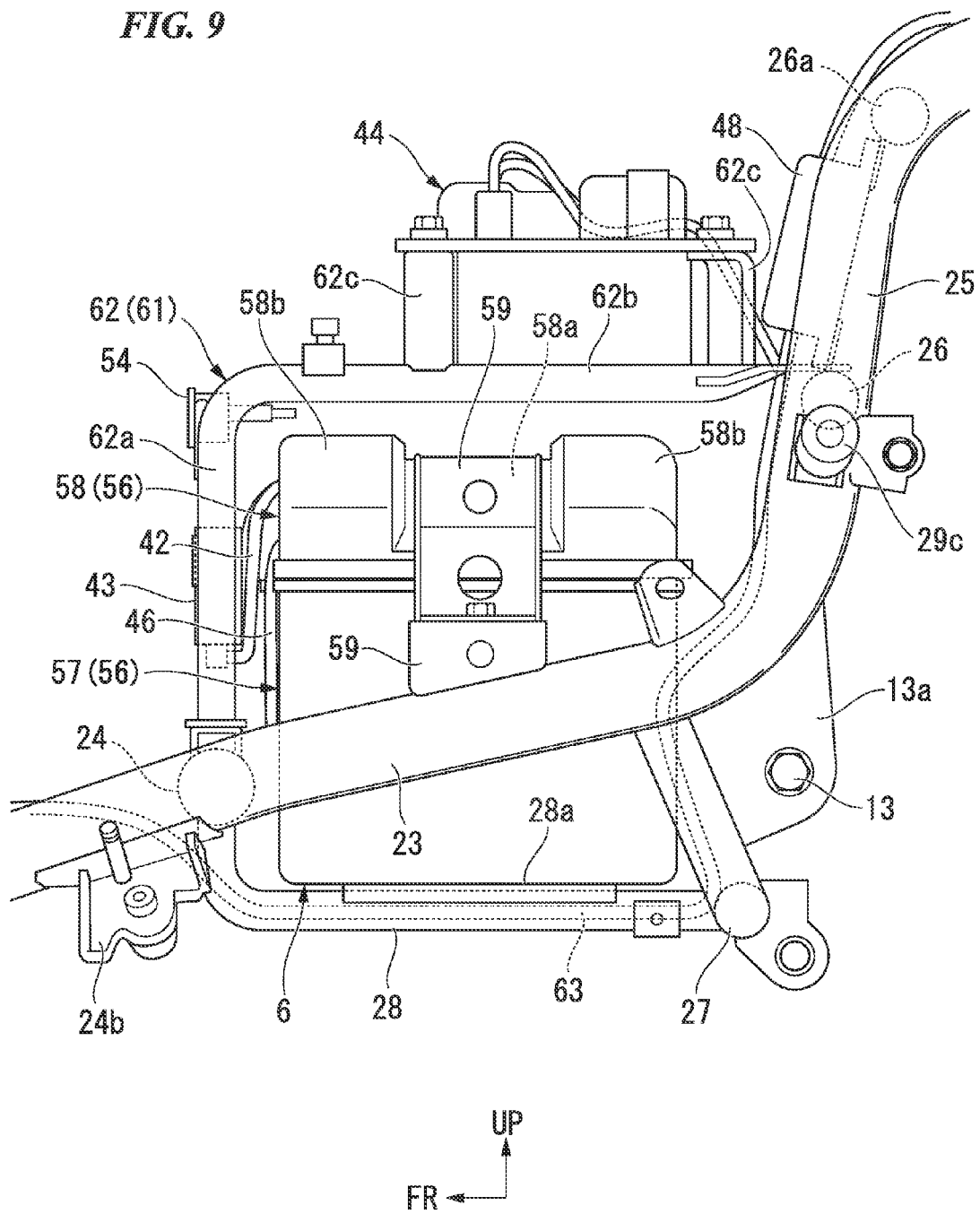
FIG. 9 is an enlarged view of chief portions of FIG. 2.
Figure 10:
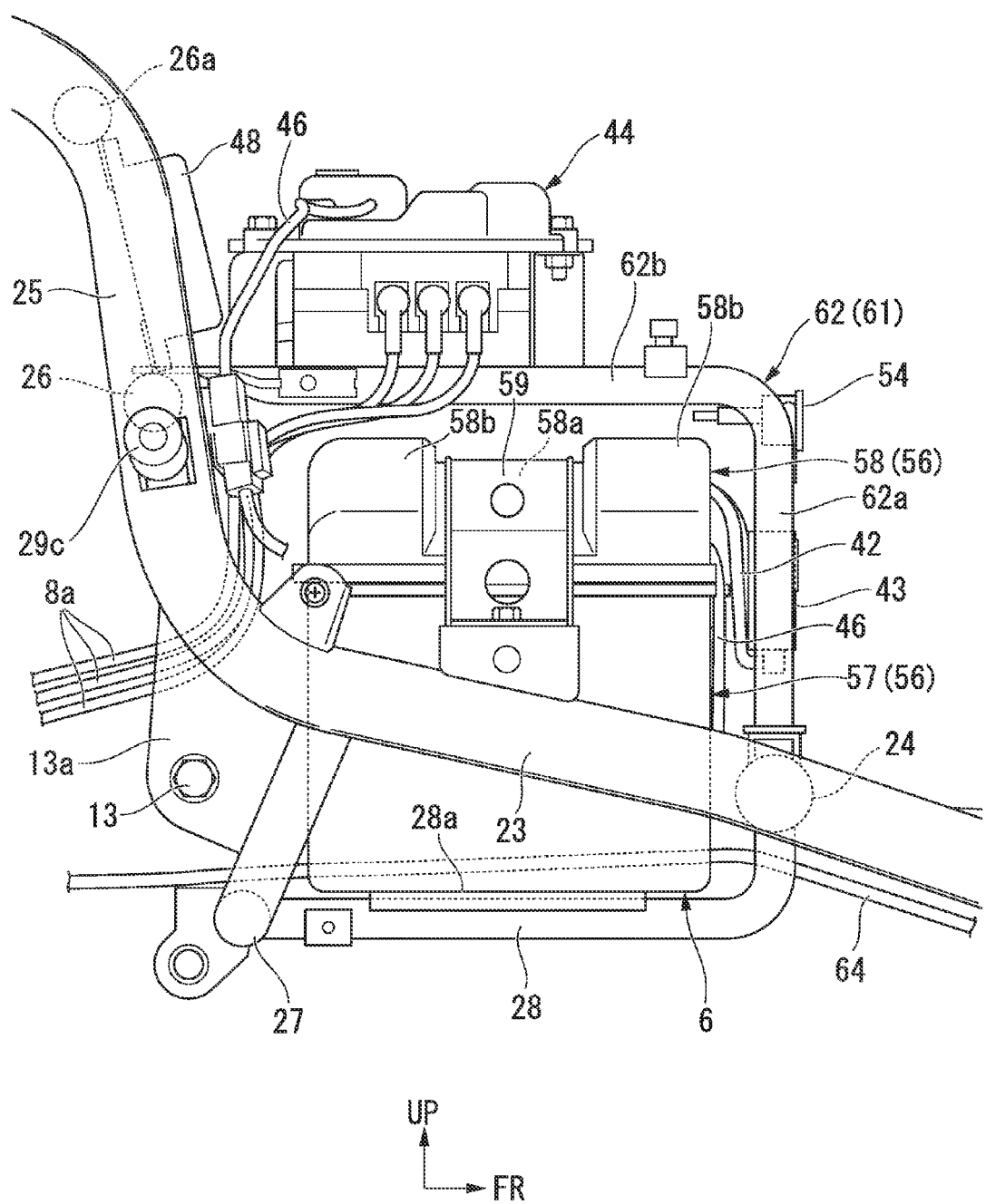
FIG. 10 is a right side view of FIG. 9.

As shown in FIGS. 9 and 10, a retaining portion 58a is provided at a front-and-rear intermediate portion of the case cover 58. The retaining portion 58a forms a stepped shape in which the left-and-right inner sides are displaced upward corresponding to the arrangement of the respective lead batteries 41. The retaining portion 58a abuts against the upper surfaces of the respective lead batteries 41 and presses and retains these batteries.

A front portion and a rear portion of the case cover 58 are provided with terminal housing portions 58b that overhang above the retaining portion 58a. The terminal housing portions 58b forms a substantially trapezoidal shape that has a horizontal side and inclination sides joined to both sides thereof in a plan view. The peripheries of the positive electrode terminal 41a and the negative electrode terminal 41b of each lead battery 41 are housed inside the terminal housing portions.

The case cover 58 is fixed to the upper portion of the case body 57 by a plurality of locking claws 58c or the like (refer to FIG. 5). A beltlike retainer 59 provided so as to run along the stepping portion of the retaining portion is mounted on the retaining portion 58a of the case cover 58 from above. The battery unit 6 is fixedly retained by the vehicle body frame 11 as both side portions of the retainer 59 are fastened to brackets 59a on the left and right lower frames 23 in a state where the battery unit is placed on the left and right under pipes 28 and the supporting plate 28a.

As shown in FIGS. 1 and 2, the battery unit 6 is arranged below the seat 3 and behind a front end of the seat 3. The battery unit 6 has a predetermined height. For this reason, the upper surface of the battery unit is arranged above the upper surface of the step floor 4, and the lower surface thereof is arranged below the upper surface of the step floor 4.

Figure 4:
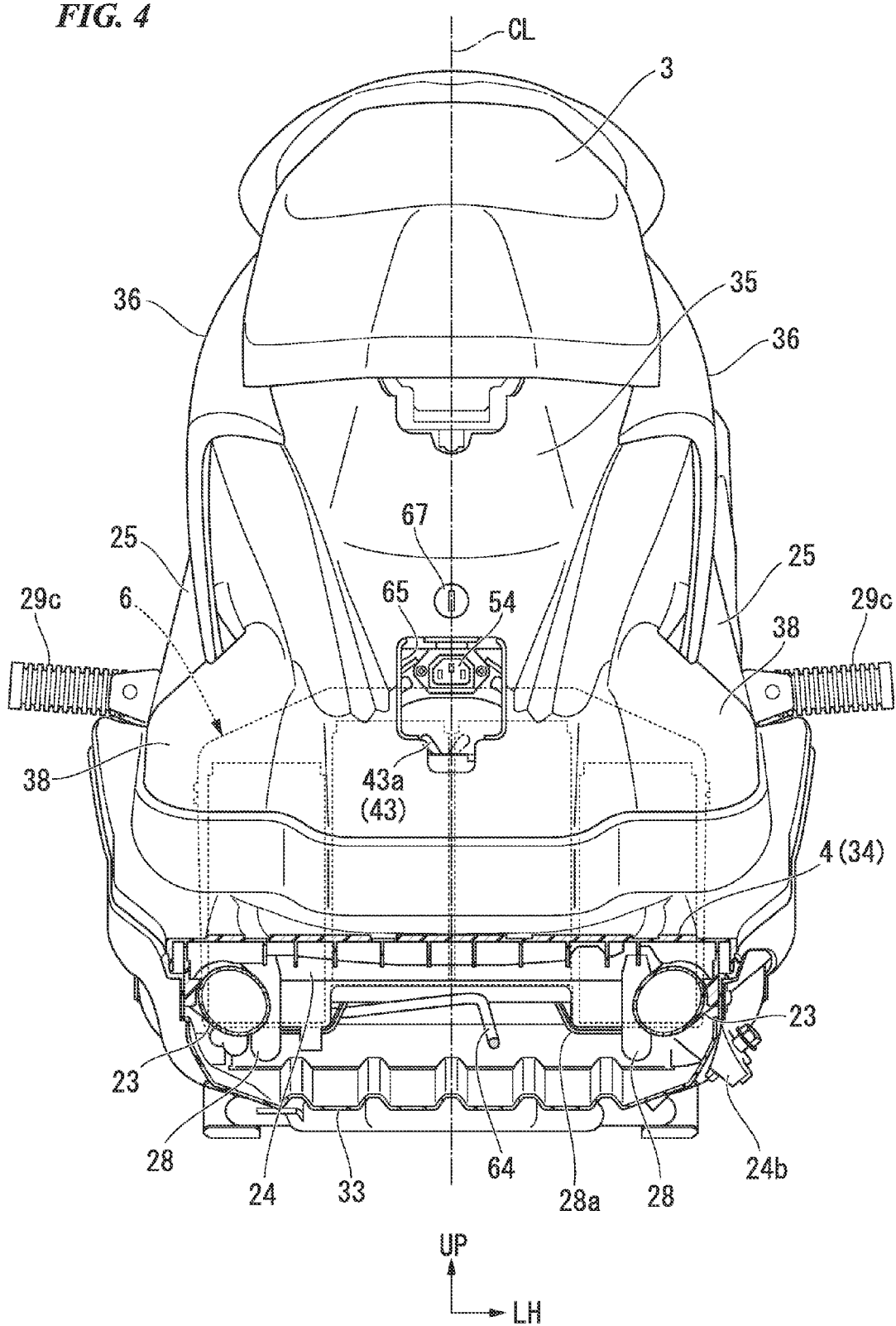
FIG. 4 is a front view of a vehicle body rear portion of the above motorcycle.

Although the battery unit 6 has a larger left-and-right width than the left-and-right width of the seat 3 as shown in FIG. 4, the battery unit is settled within the left and right inner widths of the rear portions of the left and right lower frames 23 as shown in FIGS. 3 and 5. Additionally, as shown in FIGS. 4 and 5, upper outer corner portions of the battery unit 6 (terminal housing portions 58b) are provided at an obtuse angle in a plan view. Overhanging portions 38 are provided from the rear center cover 35 to the rear side covers 36 so as to house both these corner portions (refer to FIG. 11).

Figure 12:
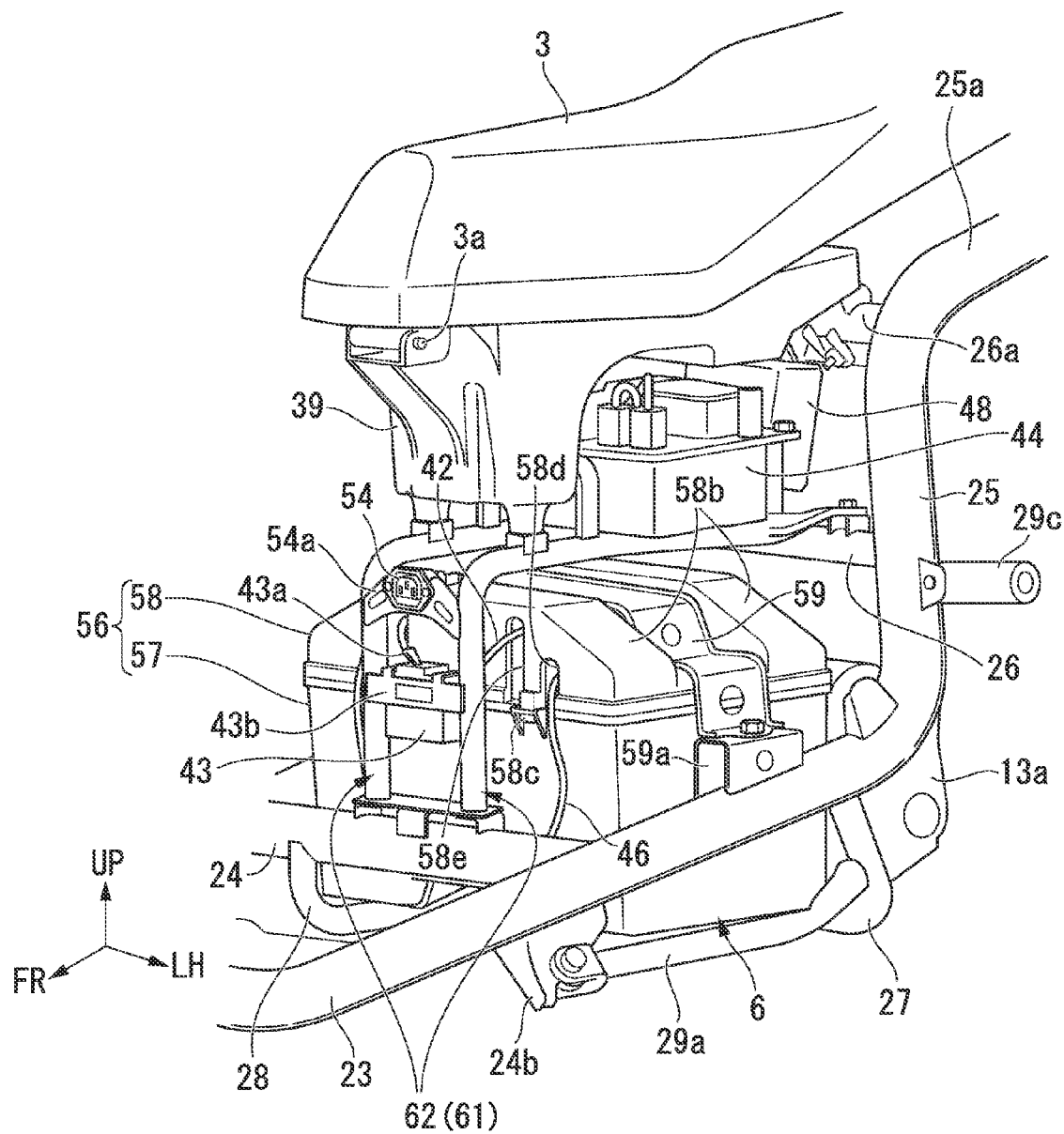
FIG. 12 is a perspective view of a state where the vehicle body cover of the above vehicle body rear portion is removed.

As shown in FIGS. 9, 10, and 12, the control unit 44 and the goods storage box 39 above the battery unit 6 are supported by a supporting frame 61 that forms an L-shape in a side view so as to run along that the front surface and upper surface of the battery unit 6.

The supporting frame 61 has a pair of left and right frame pipes 62 of that form an L-shape. The left and right frame pipes 62 are made of a circular steel pipe, and integrally have a front vertical portion 62a that extends substantially vertically to the horizontal direction in front of the battery unit 6, and an upper horizontal portion 62b that extends substantially horizontally above the battery unit 6. The supporting frame 61 is detachably fixed to the vehicle body frame 11 by bolt fastening or the like.

As shown in FIGS. 3 and 5, a first half portion and the front vertical portion 62a of the upper horizontal portion 62b are provided so as to run along the vehicle body center plane within the left-and-right width of the pair of lead batteries 412 and 413 on the left-and-right inner sides in the battery unit 6. On the other hand, a second half portion of the upper horizontal portion 62b is inclinedly provided so as to be located further toward the left-and-right outer sides as it goes to the rear side in a plan view.

As shown in FIG. 12, a front portion of the goods storage box 39 is supported on the first half portion of the upper horizontal portion 62b. Additionally, as shown in FIG. 5, the control unit 44 is supported on the second half portion of the upper horizontal portion 62b, for example, via a stay 62c that is L-shaped in a plan view. The control unit 44 is a driver for the drive motor 8, and integrally has a power driving unit (PDU) 47 and an ECU 49 to be described below. In addition, a rear portion of the goods storage box 39 is supported on the rear upper crossing pipe 26a.

As shown in FIGS. 5 and 7, in the lead batteries 411 and 414 located on the outermost sides of the battery unit 6, output cables 46 are respectively connected to the positive electrode terminal 41a and the negative electrode terminal 41b that are located on the front sides of the lead batteries. The respective output cables 46 are led out to the outside of the battery case 56 through oblong outer slits 58d provided on both the front sides of the case cover 58 of the battery case 56.

Each output cable 46 is appropriately arranged on the right of an upper portion of the vehicle body, for example, after the cable goes through a lower portion of the vehicle body, and is connected to the control unit 44 above the battery unit 6. Oblong inner slits 58e longer than the outer slits 58d are provided further toward the left-and-right inner sides than the outer slits 58d on both sides of the front surface of the case cover 58. The intermediate cables 42 are led out from the inner slits 58e to the outside of the battery case 56.

As shown in FIG. 7, a pair of lead batteries 411 and 412 on the left of the high-voltage battery 6A and a pair of lead batteries 413 and 414 on the right side thereof are disposed side by side such that long sides with the respective terminals 41a and 41b are made adjacent to each other when these batteries are seen in a plan view. The positive electrode terminal 41a and the negative electrode terminal 41b located on the rear side of each of these pairs of lead batteries 41 are connected together via a coupling cable 45.

Figure 13:
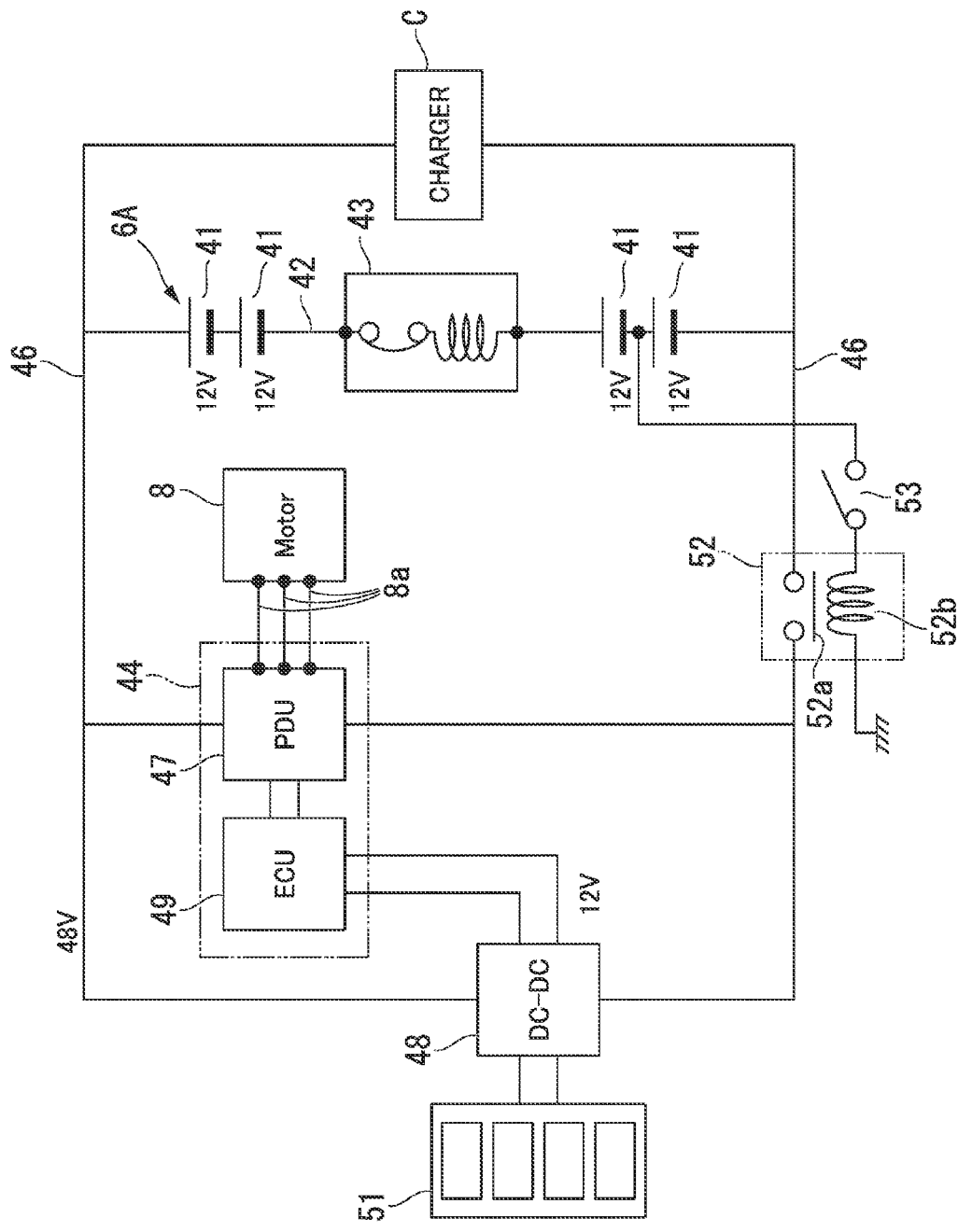
FIG. 13 is a configuration view of chief portions of the above motorcycle.

As shown in FIG. 13, a direct current of 48 V from the high-voltage battery 6A is converted into three-phase alternating currents via the PDU 47 in the control unit 44, and then supplied to the drive motor 8 that is a three-phase alternating current motor. Additionally, a direct current of 148 V is reduced in voltage to 12 V via an DC-DC converter (hereinafter simply referred to as a converter) 48 that is separate from the control unit 44, and then supplied to the ECU 49 within the control unit 44 or other general electric components 51. In addition, reference numeral C in the drawing designates a charger provided integrally or separately from the motorcycle 1.

A contactor 52 is interposed between the negative electrode side of the high-voltage battery 6A and the negative electrode side of the PDU 47 and the converter 48.

The contactor 52 includes a relay circuit, and the output cable 46 that extends from the negative electrode side of the high-voltage battery 6A is connected to one terminal of a switch 52a of the relay circuit. The other terminal of the switch 52a is connected to the negative electrode side of the PDU 47 and the converter 48.

Additionally, the positive electrode side of one lead battery 41 within the high-pressure battery 6A is connected to one terminal of a coil 52b of the relay circuit via a main switch 53. In addition, the other terminal of the coil 52b is grounded. If the main switch 53 is turned on and an electric current from one lead battery 41 flows to the coil 52b, the switch 52a of the relay circuit is closed, and an electric current from the high-voltage battery 6A flows to the PDU 47 and the converter 48.

In addition, reference numeral 8a in the drawing designates three-phase motor cables that extend from the control unit 44 (PDU 47) to the drive motor 8. Each motor cable 8a extends, for example, so as to transverse the vehicle body left and right from the right of the control unit 44, then extends along the left arm 18b of the swing arm 18, and reaches the drive motor 8 (refer to FIGS. 10 and 14).

The main switch 53 is provided, for example, in the vicinity of the head pipe 12 (refer to FIGS. 1 and 2). Additionally, as shown in FIGS. 3 and 9, main harness 63 over the periphery of the main switch 53, the control unit 44, or the like extends rearward so as to run along, for example, the left lower frame 23 and the left under pipe 28 from the front portion of the vehicle body. The main harness 63 extends upward so as to run along the left of the rear lower pipe 27 and the left rear frame 25, and then reaches the control unit 44, the converter 48, or the like.

As shown in FIGS. 9 and 10, the converter 48 is provided so as to overlap the left and right rear frame 25 in a vehicle side view behind the control unit 44 and between and the left and right rear frame 25. Upper and lower end portions of the converter 48 are fastened to and supported by the rear upper crossing pipe 26a and the rear lower cross pipe 26, respectively.

Figure 8:
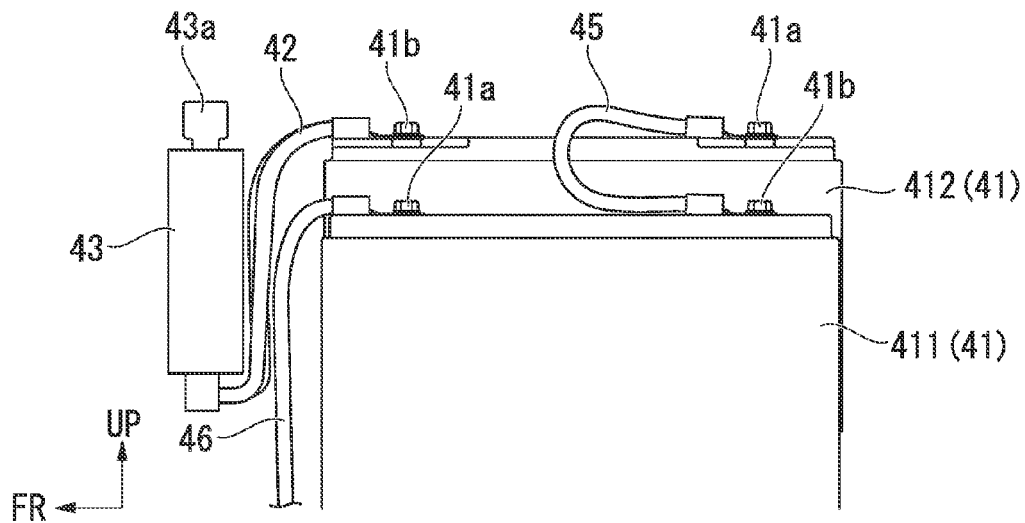
FIG. 8 is a left side view of the above high-voltage battery.

Here, as shown in FIGS. 6, 7, and 8, the battery unit 6 is provided so that two lead batteries 41 (center side battery 412, 413) arranged on the left-and-right central side thereof are displaced above two lead batteries 41 (side batteries 411 and 414) arranged on the left-and-right outer sides. Thereby, when the connection work of terminals of the respective cables 42, 45, and 46 to the respective terminals 41a and 41b of the lead batteries 41 on the left-and-right inner sides is performed, the lead batteries 41 on the left-and-right outer sides do not easily become the obstacle of the work. Additionally, the positions of upper outer corner portions of the lead batteries 41 on the left-and-right outer sides become low. For this reason, the overhanging portions 38 of seat lower covers (the rear center cover 35 and the left and right rear side covers 36) also do not become conspicuous.

As shown in FIG. 6, a horizontally long space 57b surrounded by the lower inner surfaces of the lead batteries 41 on the left-and-right outer sides, the bottom surfaces of the lead batteries 41 on the left-and-right inner sides, and the upper surface of the supporting plate 28a is provided below the battery unit 6 (below the bottom wall 57a of the case body 57). For example, a brake cable 64 or the like that extends toward the rear wheel 7 from the periphery of the bar handle 2 is wired in the space 57b. In addition, it is natural that the main harness 63, the output cables 46, or the like may be wired in the space 57b.

As shown in FIGS. 7 and 8, the intermediate cables 42 connect the lead batteries 41 on the left-and-right inner sides located on the relatively upper side. From this, the circuit breaker 43 provided at the intermediate cables 42 is arranged ahead of the upper portion of the battery unit 6.

As shown in FIG. 5, the circuit breaker 43 is detachably supported by the lower supporting plate 43b laid between the left and right frame pipes 62.

In this way, by attaching the circuit breaker 43 to the lead batteries 41 on the left-and-right inner sides at a relatively high position on a connection path that connects the lead batteries 41, it is easy to do the work on the circuit breaker 43, and the influence of water splashing or the like from a road surface is also suppressed.

Additionally, as shown in FIG. 7, the output cables 46 are connected to terminals on the front side of the battery unit 6. Moreover, the circuit breaker 43 is also arranged on the front side of the battery unit 6. Thereby, when the high-voltage battery 6A is removed, the respective output cables 46 on both sides can be removed after the circuit breaker 43 is cut and voltage is halved. Additionally, this work can be intensively performed from the front side of the battery unit 6.

As shown in FIGS. 5 and 12, an electric power input portion 54 that enables the battery unit 6 to be charged with the electric power from a power source outside of the vehicle is provided ahead of the battery unit 6. The electric power input portion 54 is provided, for example, by a socket (plug receptacle) with an earth electrode corresponding to a plug (insertion connector), such as a commercial power source (AC 100 V). The electric power input portion 54 is detachably supported by the upper supporting plate 54a laid between the left and right frame pipes 62 above the a circuit breaker 43. In addition, the power source also includes a charger C.

Figure 11:
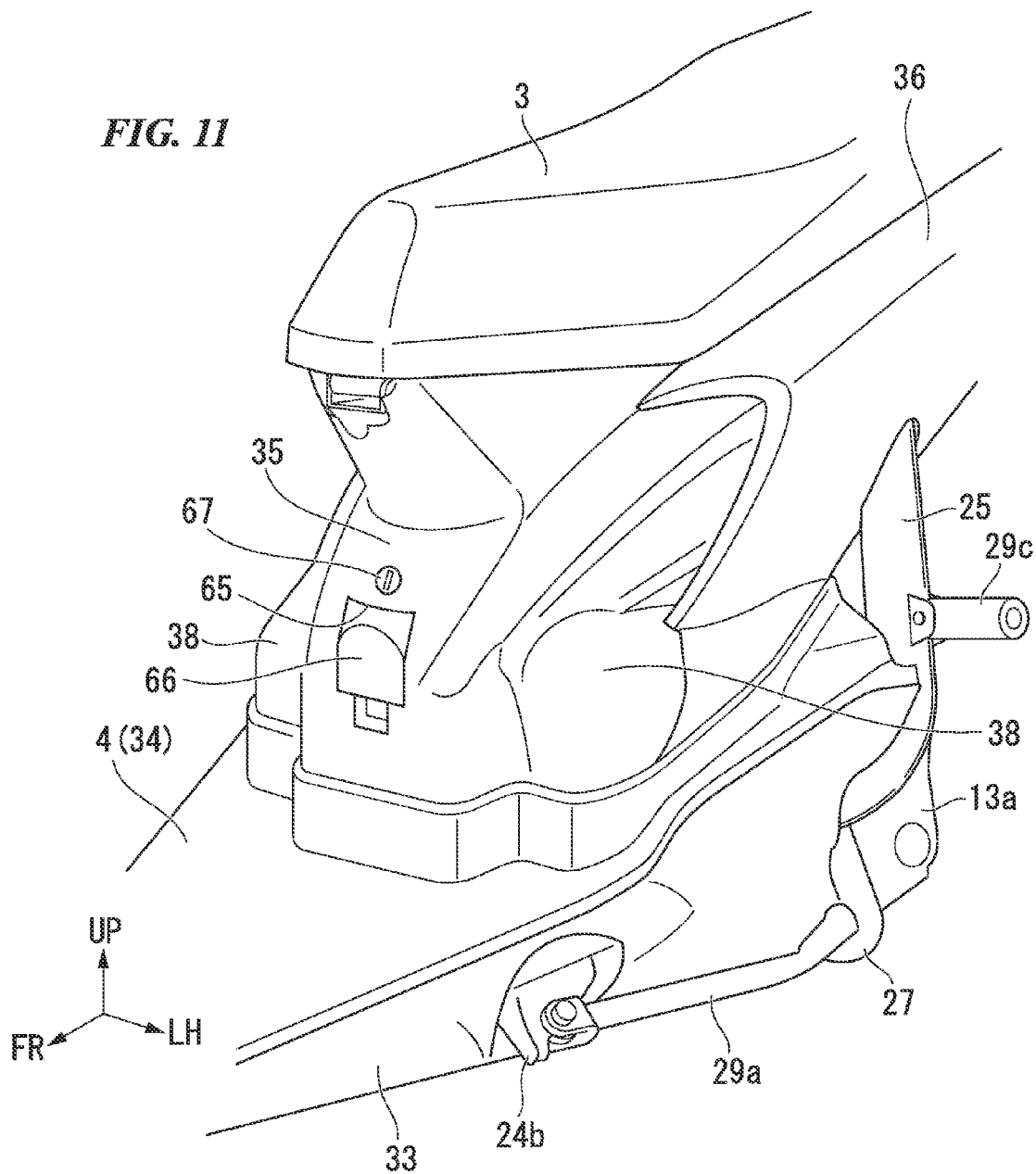
FIG. 11 is a perspective view of the above vehicle body rear portion.

As shown in FIGS. 4 and 11, the circuit breaker 43 and the electric power input portion 54 are covered with the rear center cover 35 from the front. A left-and-right central portion of the rear center cover 35 is provided with an opening 65 that enables the access from the outside of the cover to the circuit breaker 43 and the electric power input portion 54 that are located inside the central portion. The opening 65 is provided with a lid 66 that opens and closes this opening. The rear center cover 35 (or the lid 66) is provided with a locking mechanism 67 capable of locking the lid 66 in a closed state.

This facilitates the off and on work of the circuit breaker 43 or attachment and detachment (charging work) of a plug to the electric power input portion 54. Additionally, mischief or the like to the electric power input portion 54 and the circuit breaker 43 can be deterred by the locking mechanism 67. Moreover, water splashing or various disturbances at the time of rainfall, car washing, or the like can also be deterred by closing the lid 66. In addition, illustration of the lid 66 is omitted in FIG. 4. Additionally, whether or not the lid 66 is detachable from and attachable to the rear center cover 35 does not matter.

As shown in FIGS. 5 and 10, three motor cables 8a for power supply to the drive motor 8 are connected to a right side portion of the control unit 44. Each motor cable 8a is curved rearward after extending downward from the right side portion of the control unit 44. Next, the motor cable extends downward toward the left of the vehicle body above the pivot 13 after being curved again downward along the right rear frame 25.

Figure 14:
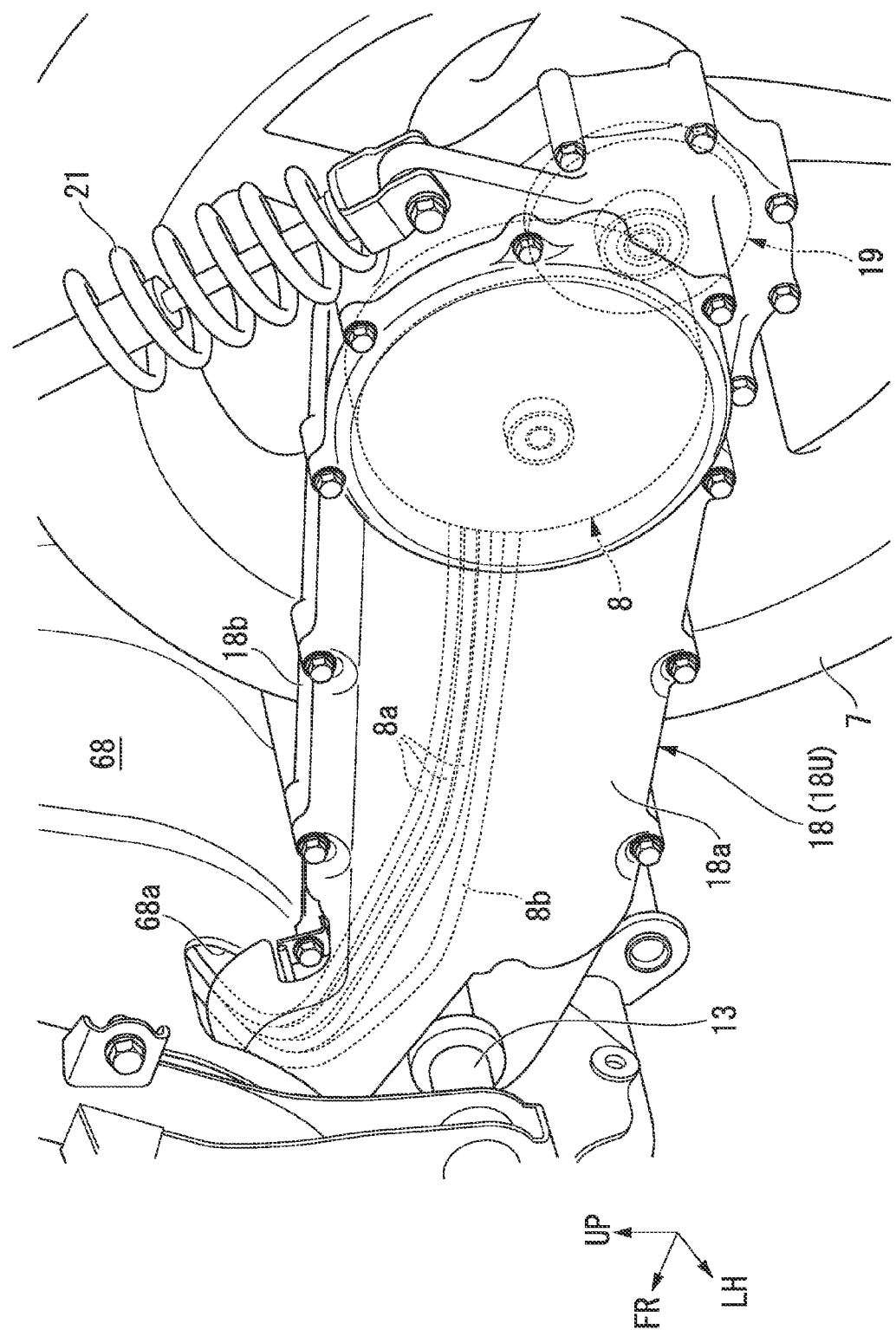
FIG. 14 is a perspective view when the swing unit of the above motorcycle is seen from the left rear.

As shown in FIG. 14, a plate-shaped inner rear fender 68 that overlaps each other in a vehicle side view is provided between the left and right rear frames 25. A cutout 68a that enables each motor cable 8a to be led out rearward from the front of the inner rear fender 68 is provided on the lower left of the fender. Each motor cable 8a that is lead out to the rear side of the vehicle body from the cutout 68a extends rearward so as to run along the left arm 18b of the swing arm 18, and reaches the drive motor 8. A detection cable 8b for detecting rotating speed (for detecting vehicle speed) extends from the drive motor 8 so as to run along each motor cable 8a. The respective cables 8a and 8b are arranged within the arm cover 18a attached to the outside of the left arm 18b.

Figure 15:
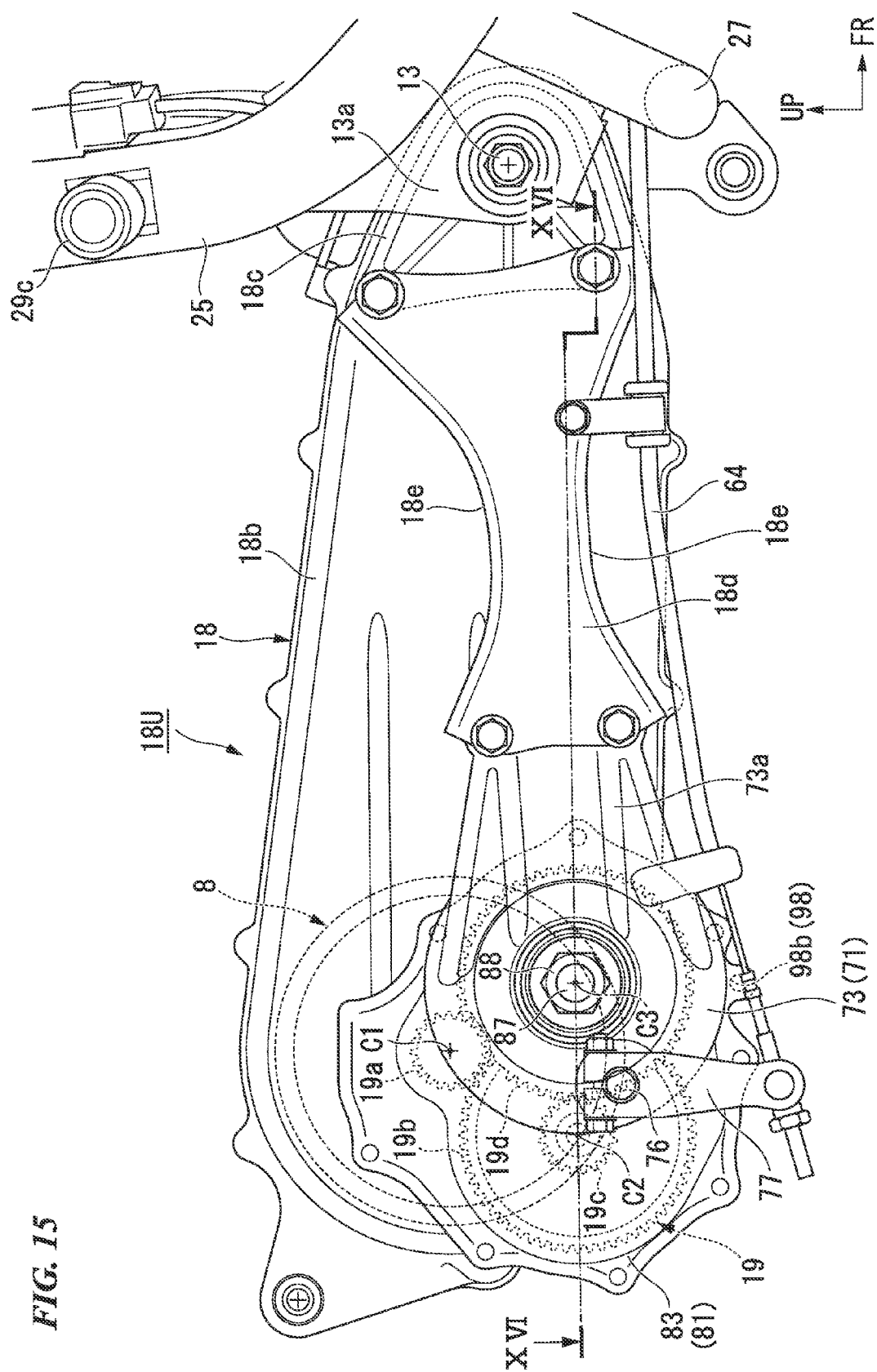
FIG. 15 is a right side view of the above swing unit.
Figure 16:
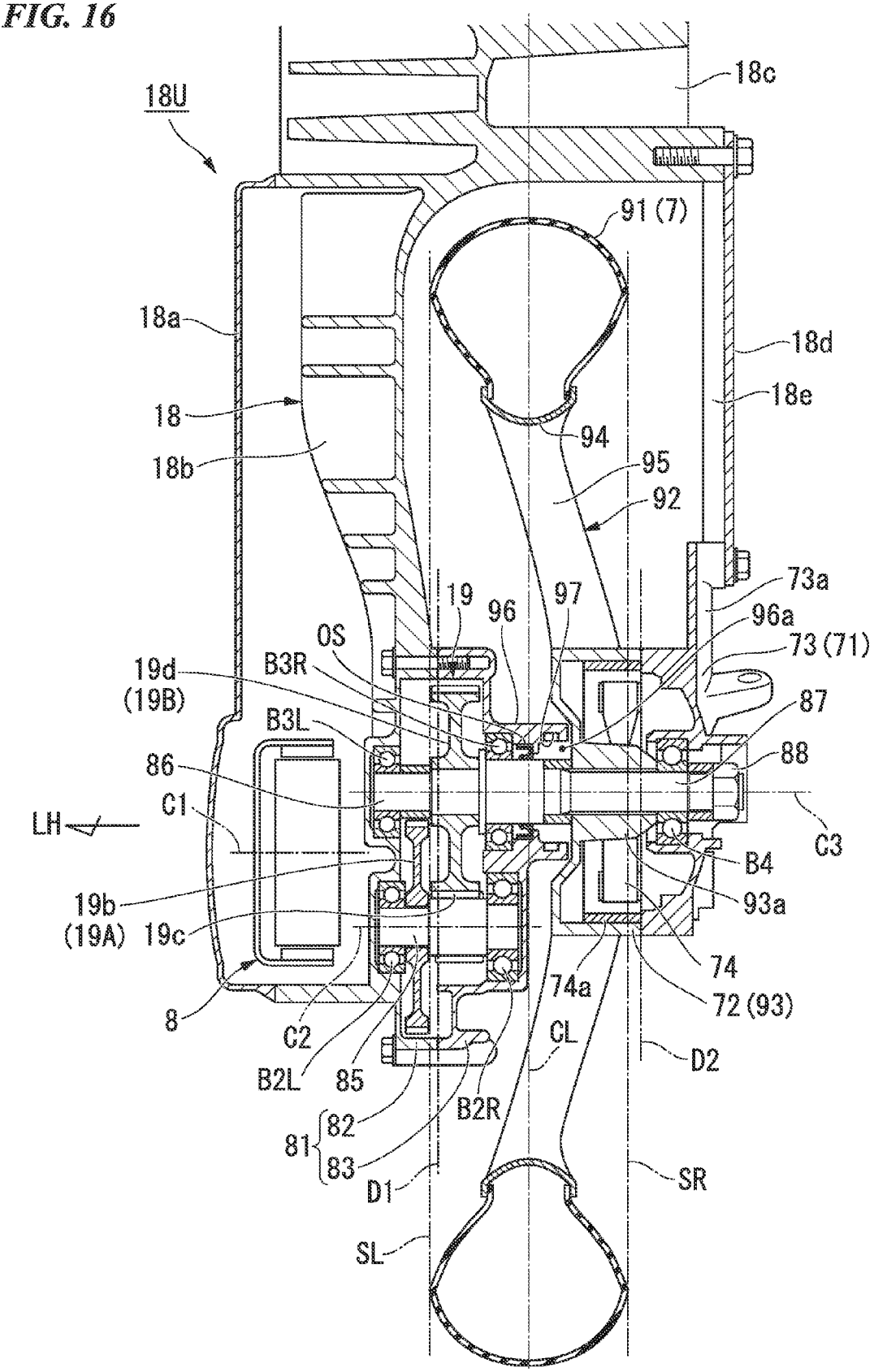
FIG. 16 is a cross-sectional view taken along XVI-XVI of FIG. 15.

As shown in FIGS. 15 and 16, the swing unit 18U has a gear case 81 provided on an inner side in the vehicle width direction of a rear end portion of the left arm 18b of the swing arm 18, a drum brake 71 that is provided on the right of a hub portion 93 of the rear wheel 7, and an auxiliary arm 18d that supports a right end portion of a rear axle 87 via the drum brake 71, in addition to the swing arm 18, the arm cover 18a, the drive motor 8, the gear mechanism 19, and the rear wheel 7. In addition, illustration of the rear wheel 7 is omitted for the sake of convenience of illustration in FIG. 15.

The swing arm 18 forms a main backbone of the swing unit 18U. The swing arm 18 integrally has a base end portion 18c that extends in the vehicle width direction at a front end portion thereof, and the left arm 18b rearward from the left of the base end portion 18c. That is, the swing arm 18 is of an L-shaped cantilever type in a plan view. The base end portion 18c is provided in a hollow shape that opens outward in the vehicle width direction and is appropriately subjected to thinning. The left arm 18b forms a hollow shape that opens to the left (outward in the vehicle width direction), and has an arm inner space that houses the drive motor 8, the respective cables 8a and 8b, or the like as the arm cover 18a is attached thereto from the left thereof.

As shown in FIG. 16, a hollow outer case half body 82 that opens to the right (inward in the vehicle width direction) is integrally formed on the inner side in the vehicle width direction, of a tip portion (rear end portion) of the left arm 18b. Additionally, a hollow inner case half body 83 that opens to the left (outward in the vehicle width direction) is attached to the right (inner side in the vehicle width direction) of the outer case half body 82. The respective case half bodies 82 and 83 are integrally coupled by fastening or the like after their respective open ends are butted against in a plane (mating plane D1) orthogonal to the vehicle width direction, thereby providing the gear case 81 that houses and supports the gear mechanism 19.

Figure 17:
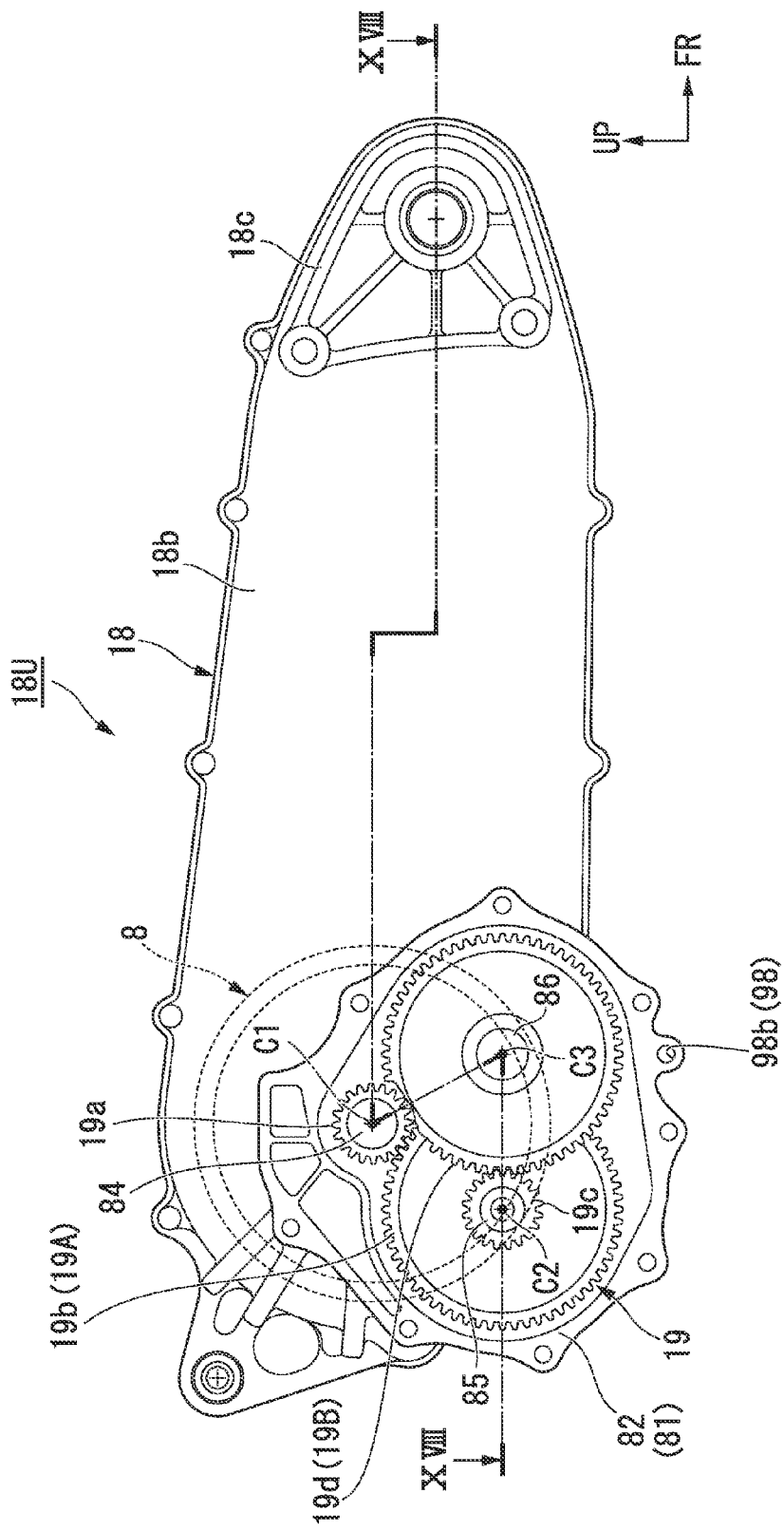
FIG. 17 is a right side view of a swing arm and a speed-reducing mechanism of the above swing unit.
Figure 18:
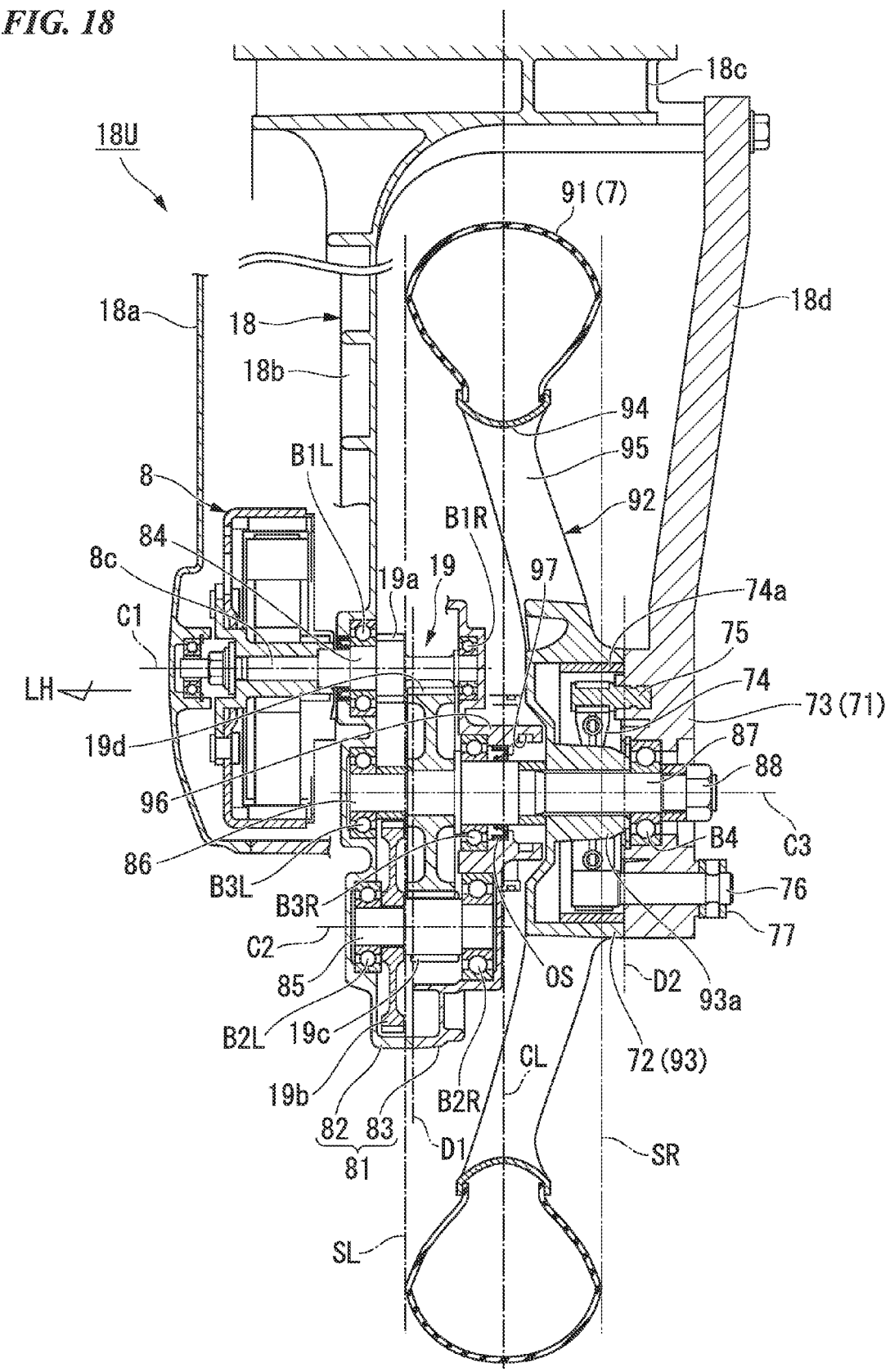
FIG. 18 is a cross-sectional view taken along XVIII-XVIII of FIG. 17.

As shown in FIGS. 17 and 18, the drive motor 8 is of a flat outer rotor type that has a drive shaft 8c parallel to the left-and-right direction, and is arranged at a rear end portion of the arm inner space. The drive shaft 8c of the drive motor 8 is coaxially connected to an input shaft 84 of the gear mechanism 19 arranged on the right thereof. The rotational driving force of the drive motor 8 is transmitted to the rear wheel 7 after speed is reduced via the gear mechanism 19.

The gear mechanism 19 has the input shaft 84, an intermediate shaft 85, and an output shaft 86, which are parallel to the left-and-right direction. The input shaft 84 and the intermediate shaft 85 are interconnected via a first reduction gear pair 19A. Additionally, the intermediate shaft 85 and the output shaft 86 are interconnected via a second reduction gear pair 19B. The drive shaft 8c that is coaxial with the input shaft 84 is integrally continuous with the left of the input shaft. The rear axle 87 that is coaxial with the input shaft 86 is integrally continuous with the right of the input shaft. In addition, another configuration in which the drive shaft 8c and the input shaft 84 are integrally rotatable may be adopted, or another configuration in which the output shaft 86 and the rear axle 87 are integrally rotatable may be adopted. Additionally, illustration of the inner case half body 83, the rear wheel 7, the drum brake 71, and the auxiliary arm 18d is omitted for the sake of convenience of illustration in FIG. 17.

The first reduction gear pair 19A has a smaller-diameter gear 19a that is integrally rotatably provided at an outer periphery of a left portion of the input shaft 84, and a larger-diameter gear 19b that is integrally rotatably provided at an outer periphery of a left portion of the intermediate shaft 85 and meshes with the smaller-diameter gear 19a. The second reduction gear pair 19B has a second smaller-diameter gear 19c that is integrally rotatably provided at an outer periphery of a right portion of the intermediate shaft 85, and a second larger-diameter gear 19d that is integrally rotatably provided at an outer periphery of a right portion of the output shaft 86 and meshes with the second smaller-diameter gear 19c. The input shaft 84 shares a center axis C1 with the drive shaft 8c, and the output shaft 86 shares a center axis C3 with the rear axle 87. The intermediate shaft 85 has a center axis C2 parallel to the left-and-right direction.

In a side view, the axial center (axis C1) of the input shaft 84, the axial center (axis C2) of the intermediate shaft 85, and the axial center (axis C3) of the output shaft 86 are arranged so as to be respectively located at the vertexes of a substantially equilateral triangle. The axial center of the intermediate shaft 85 and the axial center of the output shaft 86 are arranged so as to become a substantially equal height (substantially the same height). The axial center of the input shaft 84 (drive motor 8) is arranged above and behind the axial center of the output shaft 86 (rear axle 87).

Both left and right ends of the input shaft 84 are supported by left and right side wall portions (inner and outer case half bodies 82 and 83) of the gear case 81 via radial ball bearings B1L and B1R, respectively. Additionally, both left and right ends of the intermediate shaft 85 are supported by left and right side wall portions of the gear case 81 via radial ball bearings B2L and B2R, respectively. Both left and right ends of the output shaft 86 are supported by the left and right side wall portions of the gear case 81 via radial ball bearings B3L and B3R, respectively.

The rear axle 87 that extends to the right of the output shaft 86 has a left end portion supported by the right side wall portion (inner case half body 83) of the gear case 81 via the bearing B3R. Additionally, the right end portion of this rear axle is supported by a central portion of the brake base 73 of the drum brake 71 via a radial ball bearing B4. The right end portion of the rear axle 87 passes through the brake base 73, and protrudes to the right. A wheel lock nut 88 is attached to this protruding end portion.

The drum brake 71 has a brake drum 72 that forms a bottom cylindrical shape that opens to the right (outward in the vehicle width direction) and is provided integrally with the hub portion 93 of a wheel 92 of the rear wheel 7, the brake base 73 that forms a disc shape that blocks an open portion of the brake drum 72 and is integrally supported by a rear portion of the auxiliary arm 18d, and a pair of brake shoes 74 that are supported by the brake base 73 and are made to face the inside of the brake drum 72. An anchor pin 75 that becomes a rotation shaft of each brake shoe 74 is erected from the brake base 73, and a cam shaft 76 that operates to expand each brake shoe 74 is rotatably supported by the brake base.

The cam shaft 76 passes through the brake base 73, and protrude to the right. A base end portion of the brake arm 77 is attached to this protruding end portion. As the brake arm 77 and the rotation shaft are rotated via the brake cable 64 by the operation of a brake operation element (not shown), each brake shoe 74 operates to expand. A lining 74a of the brake shoe 74 is brought into frictional contact with an inner peripheral surface of the brake drum 72. In addition, another configuration in which the brake drum 72 and the wheel 92 are integrally rotatable may be adopted.

As shown in FIGS. 15 and 16, as for the auxiliary arm 18d, upper and lower flanges 18e that rise inward in the vehicle width direction are provided at upper and lower edges of, for example, a steel plate that is drum-shaped in a side view orthogonal to the vehicle width direction. A front end portion of the auxiliary arm 18d is integrally coupled to a ridge side surface of the base end portion 18c of the swing arm 18 by fastening or the like. A supporting portion 73a that extends forward from the brake base 73 is integrally coupled to a rear end portion of the auxiliary arm 18d by fastening or the like. In addition, although the brake base 73 and the auxiliary arm 18d are separately provided bodies in FIGS. 15 and 16, the brake base 73 and the auxiliary arm 18d may be integrally configured as shown in FIG. 18.

The wheel 92 of the rear wheel 7 integrally have the hub portion 93 that forms a central portion thereof, a rim portion 94 that supports a tire 91, and a spoke portion 95 that couples the hub portion 93 and the rim portion 94 together.

The brake drum 72 has the hub portion 93. Additionally, a cylindrical hub body 93 is provided at a central portion of the hub portion 93. The rear axle 87 is integrally rotatably inserted through the hub body 93. A right end portion of the rear axle 87 protrudes to the right of the hub body 93. This right end portion is supported by a central portion of the brake base 73 via the bearing B4, protrudes to the right of the brake base 73, and enables screwing of the wheel lock nut 88.

As shown in FIG. 16, the hub portion 93 is offset to the right with respect to the rim portion 94 located on the left-and-right center of the vehicle body. The spoke portion 95 that couples the hub portion 93 and the rim portion 94 together is inclinedly provided so as to be located further toward the right as it goes to the inner peripheral side of the wheel 92. An open end of the brake drum 72 and an outer peripheral portion of the brake base 73 are butted against each other in a plane (mating plane D2) orthogonal to the vehicle width direction.

Here, left and right end surfaces SL and SR that run along (touch) left and right end edges of the tire 91 in the rear wheel 7, respectively become planes orthogonal to the left-and-right direction. An end surface of a first side that is one (here, defined as a left side) of left and right sides is defined is defined as SL, and an end surface of a second side that the other (here, defined as a right side) is defined as SR. Additionally, in a plan view (vehicle top plan view), the second larger-diameter gear 19d that is a wheel drive portion of the gear mechanism 19 is arranged in the vicinity of the left end surface SL of the rear wheel 7 (position adjacent to a vehicle body left-and-right center side of the left end surface SL in the drawing). That is, the distance between the second larger-diameter gear 19d and the end surface SL of the first side of the rear wheel 7 is shorter than the distance between the second larger-diameter gear 19d and the vehicle body left-and-right centerline CL. Additionally, it is desirable that the second larger-diameter gear 19d be arranged so that the left end surface thereof touches the left end surface SL of the rear wheel 7 as shown.

On the other hand, in a plan view, the brake drum 72, the brake shoes 74, the anchor pins 75, and the cam shafts 76 of the drum brake 71 may be arranged at a position that overlaps the right end surface SR of the rear wheel 7 in a plan view.

By arranging the main parts of the gear mechanism 19 and the drum brake 71 so as to be brought close to each other within the left-and-right width of the rear wheel 7 in this way, the left and right weight balance of the swing unit 18U is easily kept.

Additionally, the mating plane D1 between the open ends of the respective case half bodies 82 and 83 is arranged in the vicinity of the left end surface SL of the rear wheel 7 (inner side in the vehicle width direction), that is between the end surface SL of the first side of the drive wheel 7 and the vehicle body left-and-right centerline CL, in a plan view. Similarly, the mating plane D2 between the brake drum 72 and the brake base 73 in the drum brake 71 is also arranged in the vicinity of the right end surface SR of the rear wheel 7 (outer side in the vehicle width direction) in a plan view. Here, the "vicinity" means being closer to the left and right end surfaces SL and SR of the rear wheel 7 than the vehicle body center plane (centerline CL), more preferably, being located at a position that overlaps the left end surface SL in the mating plane D1 and being located at a position that overlaps the right end surface SR in the mating plane D2. That is, the distance between the mating plane D2 and the end surface SR of the second side is shorter than the distance between the mating plane D2 and the vehicle body left-and-right centerline CL.

The swing unit 18U has the same configuration as the swing unit 18U of an existing internal combustion engine vehicle or the like, except for the drive motor 8, the arm cover 18a, or the like on the left of the left arm 18b of the swing arm 18. Accordingly, the swing unit 18U can use existing parts for the gear case 81, the gear mechanism 19, the rear wheel 7, and the drum brake 71.

Figure 21:
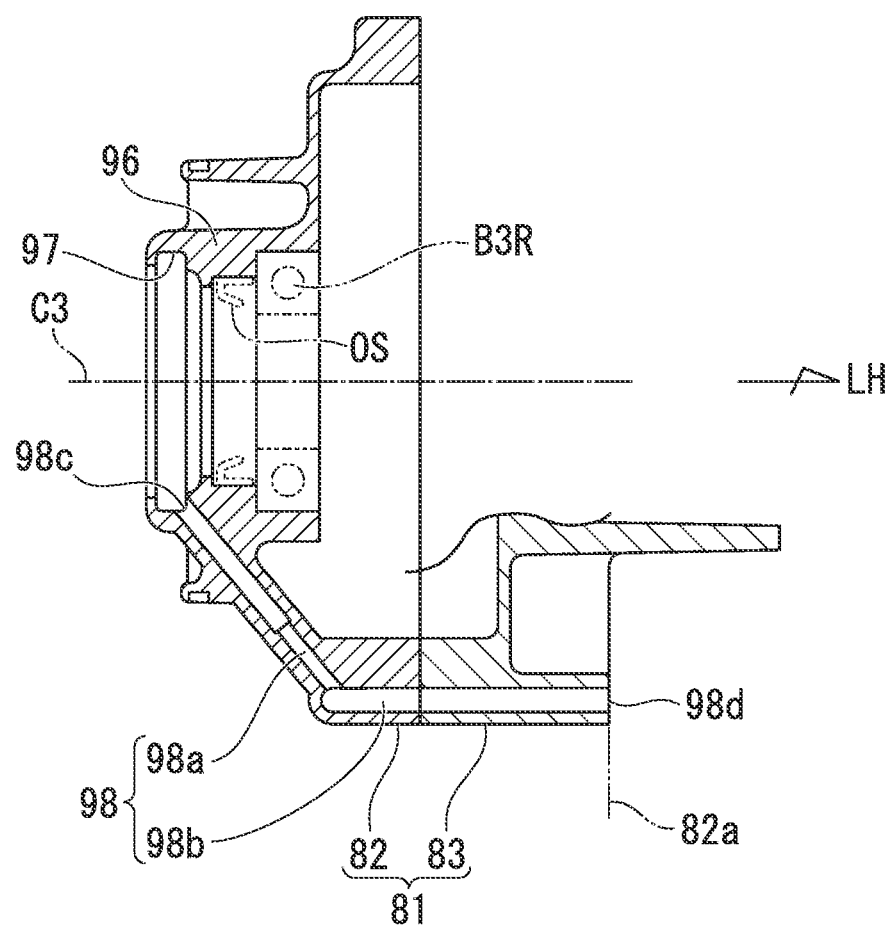
FIG. 21 is a cross-sectional view taken along XXI-XXI of FIG. 19.

As shown in FIGS. 16, 18, and 21, a cylindrical case hub portion 96 that supports a left end portion of the rear axle 87 via the bearing B3R is provided at a central portion of the inner case half body 83.

An annular oil seal OS that oil-tightly seals between the inner periphery of the case hub portion 96 and the outer periphery of the rear axle 87 is arranged on the right (a case outer open end side of the case hub portion 96) of the bearing B3R inside the case hub portion 96.

An annular recess 97 is provided on the right (case outer open end side) of the oil seal OS at the inner periphery of the case hub portion 96, that is, between the case outer opening and the oil seal OS. When the gear oil within the gear case 81 leaks from the periphery of the oil seal OS to the outside of the case, the annular recess 97 catches this gear oil. Thereby, this oil is caught by the annular recess 97 even if the gear oil within the gear case 81 leaks from the periphery of the oil seal OS to the outside of the case due to deterioration or the like of the oil seal OS. For this reason, the oil does not reach the right (drum brake 71 side) of the case hub portion 96.

Figure 19:
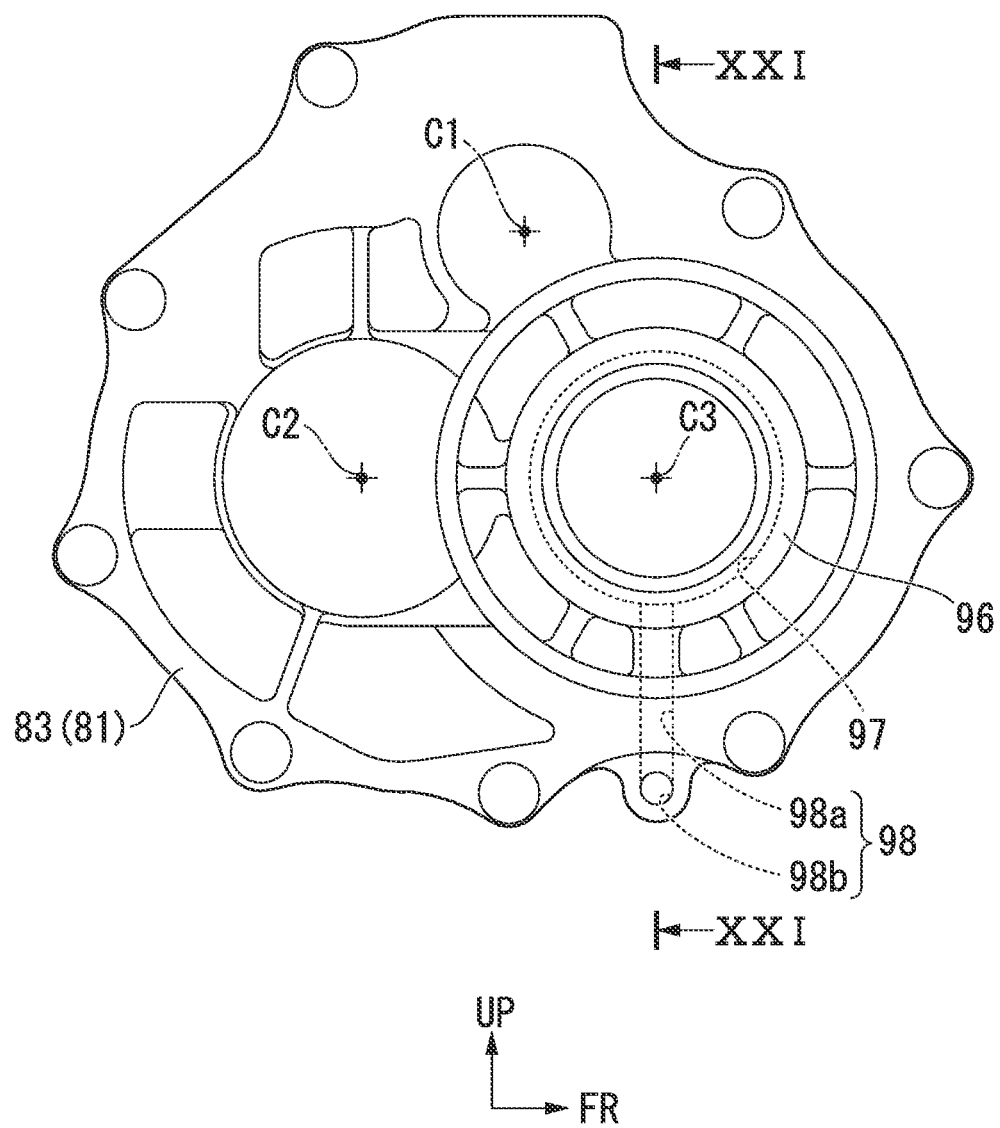
FIG. 19 is a right side view of an inner case half body of the above swing unit.
Figure 20:
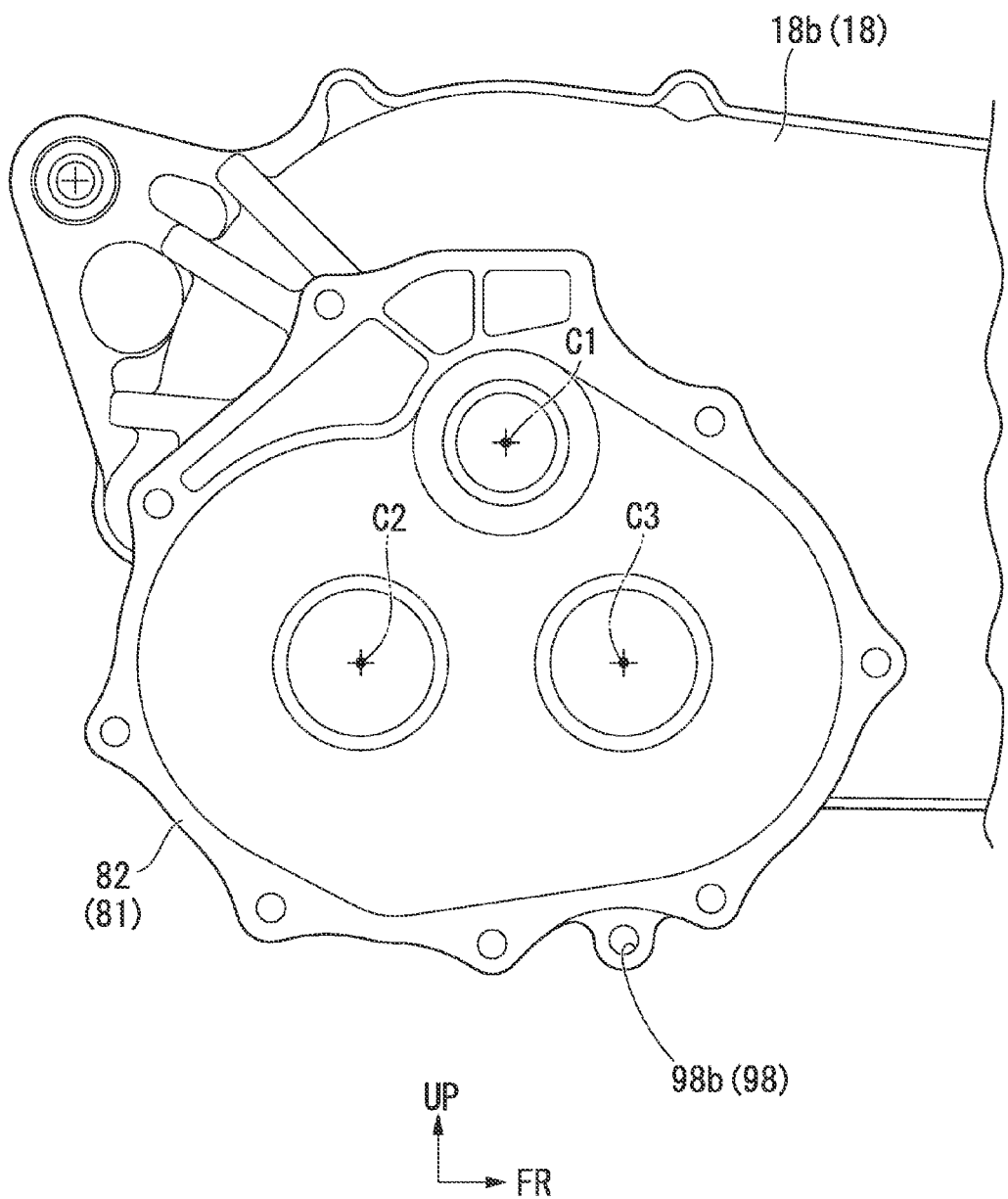
FIG. 20 is a right side view of an outer case half body of the above swing unit.

As shown in FIGS. 19, 20, and 21, an inlet 98c (opening) of a drain passage 98, which extends substantially horizontally outward in the vehicle width direction after obliquely extending downward and outward in the vehicle width direction, is bored at a lower end portion of the annular recess 97. The drain passage 98 has an inclination passage 98a that obliquely extends downward and outward in the vehicle width direction from a bottom surface of the lower end portion of the annular recess 97 in a lower portion of the inner case half body 83, and a horizontal passage 98b that substantially horizontally extends outward in the vehicle width direction from a lower end portion of the inclination passage 98a. The horizontal passage 98b is provided over lower end portions of the respective case half bodies 82 and 83 (straddling the mating plane D1). The tip of the horizontal passage 98b opens to an end surface 82a on the outer side in the vehicle width direction, of a lower end portion of the left arm 18b, and thereby, an outlet 98d of the drain passage 98 is provided. The oil caught in the annular recess 97 is discharged to the side opposite to the drum brake 71 through the drain passage 98 at a lower end portion of the gear case 81.

As described above, the electric saddled vehicle in the above embodiment includes the vehicle body frame 11; the drive wheel 7; the drum brake 71 that brakes the drive wheel 7, and the swing unit 18U that is swingably supported by the vehicle body frame 11. The swing unit 18U has the drive motor 8 configured separately the drive wheel 7, and the speed-reducing mechanism 19 that transmits the power from the drive motor 8 to the drive wheel 7, and has the wheel drive portion 19d. Here, one of the left side and the right side with respect to the left-and-right center of the vehicle is defined as the first side, and the other is defined as the second side, and the end surface of the first side of the drive wheel 7 is defined as the first end surface SL, and the end surface of the second side of the drive wheel 7 is defined as the second end surface SR. At this time, the drive motor 8 and the speed-reducing mechanism 19 are arranged on the first side, the drum brake 71 is arranged on the second side, the wheel drive portion 19d is arranged between the left-and-right center CL of the vehicle and the first end surface SL, and the brake drum 72 of the drum brake 71 is arranged at a position that overlaps the second end surface SL in a plan view.

According to this configuration, the rear wheel 7, the drum brake 71, the gear mechanism 19, and the like in the existing unit swing type vehicle can be used by arranging the drive motor 8 and the gear mechanism 19 configured separately from the rear wheel 7 on the first side (left side) of the rear wheel 7. Additionally, a left-and-right balance in the swing unit 18U as a single body can be improved by arranging the gear mechanism 19 and the drum brake 71 near (in the vicinity of the left-and-right full width of the rear wheel 7) the vehicle body left-and-right center.

The swing unit 18U of the above electric saddled vehicle may further have the swing arm 18, and the speed-reducer case 81 that houses the speed-reducing mechanism 19, as an aspect that is not indispensable but preferable. Additionally, the front portion of the swing arm 18 may be supported by the vehicle body frame 11, the rear portion of the swing arm 18 may support the drive wheel 7, the speed-reducer case 81 may have the outer case half body 82 formed integrally with the swing arm 18; and the inner case half body 83 attached to the outer case half body 82 from the left-and-right center side of the vehicle body, and the mating plane D1 between the outer case half body 82 and the inner case half body 83 may be arranged so that the distance to the first end surface SL is shorter than the distance to the left-and-right center CL of the vehicle body.

According to this configuration, the inner case half body 83 that is provided with the gear case 81 that houses the gear mechanism 19 is arranged near the vehicle body left-and-right center. For this reason, the left-and-right balance in the swing unit 18U as a single body can be further improved.

Additionally, in the above electric saddled vehicle, as an aspect that is not indispensable but preferable, the brake drum 72 may have an opening and the opening may be covered with the brake panel 73. The mating plane D2 between the brake drum 72 and the brake panel 73 may be arranged at a position where the distance from the end surface SR becomes shorter than the distance from the vehicle body left-and-right centerline CL.

According to this configuration, the mating plane D2 between the brake drum 72 that opens toward the vehicle body left-and-right outer sides and the brake base 73 that covers the opening side is arranged near the vehicle body left-and-right center. For this reason, the left-and-right balance in the swing unit 18U as a single body can be further improved.

Additionally, as an aspect that is not indispensable but preferable, the swing unit 18U of the above electric saddled vehicle may further have the drive shaft 87 that protrudes to the outside of the speed-reducer case 81; the case hub portion 96 having an opening 96a, which is provided in the case half body 83; and the oil seal OS that is provided on an inner peripheral surface of the case hub portion 96, the drive shaft 87 may rotate integrally with the wheel drive portion 19d and passes through the inner case half body 83, the case hub portion 96 may rotatably support the drive shaft 87 via the bearing B3R, the oil seal OS may be arranged between the opening 96a of the case hub portion 96, and the bearing B3R, and the annular recess 97 may be provided between the opening 96a and the oil seal OS.

According to this configuration, even in a case where the gear mechanism 19 and the drum brake 71 are arranged in close proximity to each other, the drum brake 71 cannot be easily affected by the oil when the oil within the gear case 81 has leaked from the oil seal OS to the case outer opening side.

Additionally, the opening 98b may be provided in the annular recess 97, and the drain passage 98 that allows the opening 98b and the first side (left side) of the swing unit 18U to communicate with each other may be provided.

According to this configuration, the oil received by the annular recess 97 received can be discharged to the side opposite to the drum brake 71. For this reason, the drum brake 71 can be more reliably invulnerable to the oil.

In addition, the invention is not limited to the above embodiment, and may use a nickel-hydrogen battery or a lithium ion battery instead of the lead battery 41. Additionally, the battery unit 6 may be provided by combining three or five or more batteries.

Moreover, the invention may be applied to three-wheel (including vehicles with two front wheels and one rear wheel other than vehicles with one front wheel and two rear wheels) or four-wheel vehicles as well as two-wheel vehicles as the electric saddled vehicle.

It will be obvious that the configuration in the above embodiment is an example of the invention, and various changes may be made without departing from the scope of the invention.

Figure 23:
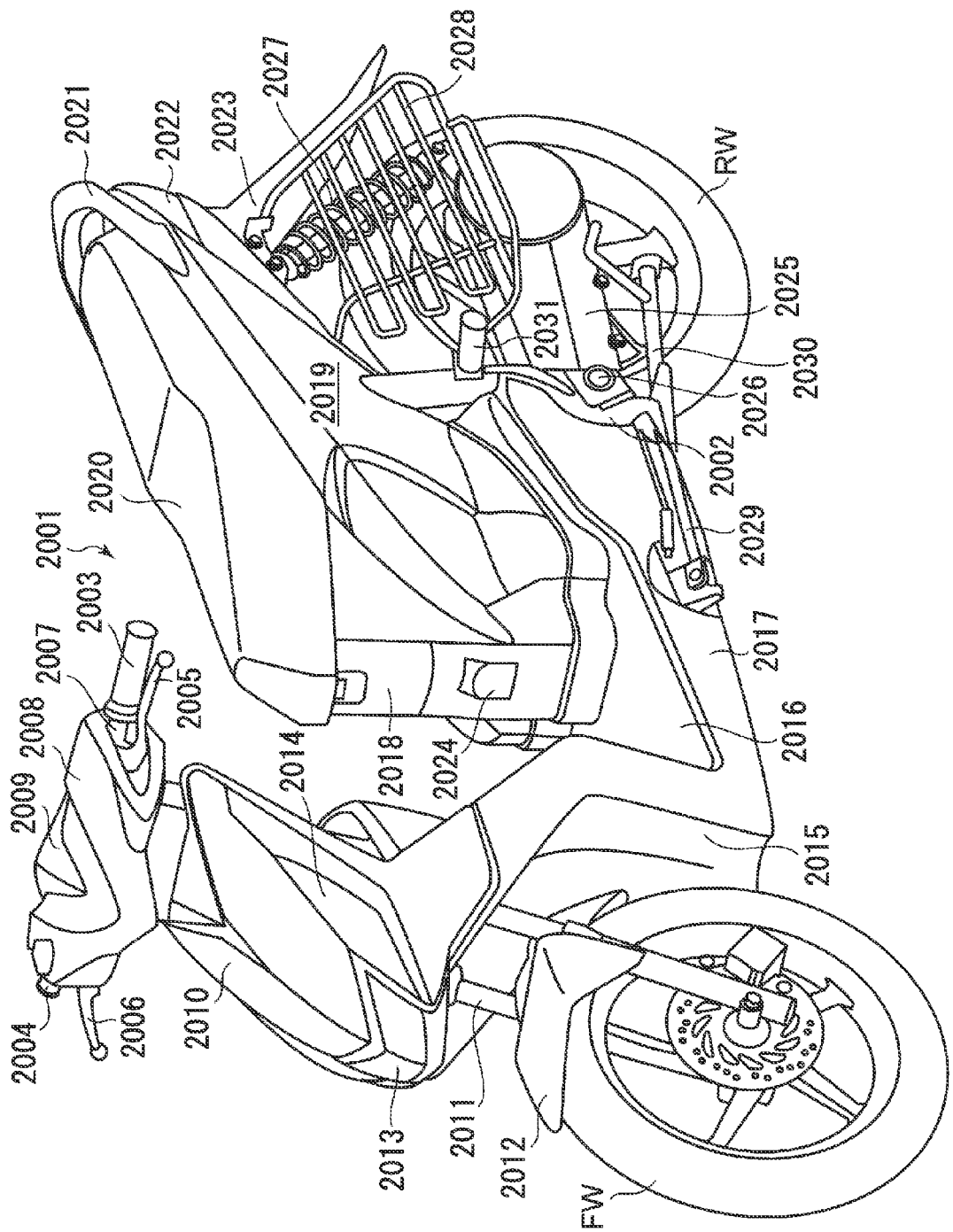
FIG. 23 is a left front perspective view of an electric vehicle including the drive device related to the second embodiment of the invention.

A second embodiment of the invention will be described below referring to the drawings. FIG. 23 is a perspective view from the left front of an electric vehicle (electric saddled vehicle) including a drive device related to the second embodiment of the invention. An electric vehicle 2001 is a scooter type two-seated two-wheel vehicle that has a low floor. The electric vehicle 2001 has a vehicle body frame 2002 to be described below in detail, and respective portions of the vehicle are supported by the vehicle body frame 2002. Except for right and left grips 2003 and 2004 and right and left brake levers 2005 and 2006, most of a steering handle 2007 is covered with a handle cover 2008. A meter that is not shown is built in the handle cover 2008, and a meter visor 2009 is arranged ahead of this meter.

The steering handle 2007 is coupled to a front fork 2011 via a steering shaft (to be described below) supported by a head pipe (to be described below) covered with a front cover 2010. The front fork 2011 rotatably and pivotally supports a front wheel FW at a lower end portion. The front fork 2011 is provided with a front fender 2012 arranged so as to cover the front wheel FW from above. A headlight 2013 and a front blinker 2014 are assembled into the front cover 2010. A leg shield 2015 located at the rear of a vehicle body with respect to the front fork 2011 is connected to a lower portion of the front cover 2010.

A central portion of the vehicle body is covered with a floor panel 2016 that is nearly horizontally arranged, an under cover 2017 that is located under the floor panel, and a center cover 2018 and a frame body cover 2019 that are connected to an upper portion of the under cover 2017.

A tandem seat 2020 is arranged above the center cover 2018 and the frame body cover 2019. A grip rail 2021 is provided behind the tandem seat 2020. Additionally, a rear lamp unit 2022 having a taillight and a rear blinker is provided below the grip rail 2021. A lower portion of the rear lamp unit 2022 is connected to a rear fender 2023. A front portion of the center cover 2018 is provided with a lid 2024 that faces a charge coupler (to be described below) for charging a main battery (to be described below) located below the tandem seat 2020.

A swing arm 2025 is supported by the vehicle body frame 2002 so as to be swingable in an up-and-down direction by a pivot shaft 2026. A rear portion of the swing arm 2025 is supported by a rear portion of a rear suspension 2027 of the vehicle body frame 2002. An electric motor that drives the rear wheel RW and harness that is led out from the electric motor is stored within the swing arm 2025. A speed reducer (speed-reducing mechanism) having a final shaft that is coupled to an output shaft of the electric motor, and reduces the output rotation speed of the electric motor to transmit the reduced rotation speed to the rear wheel RW is attached to the swing arm 2025. A drive device having the electric motor and the speed-reducing mechanism will be described below in detail. A guard 2028 that covers the rear wheel RW and the rear suspension 2027 from the first side of the vehicle body is provided between the swing arm 2025 and the rear fender 2023.

A side stand 2029 that supports the vehicle body during a stop is pivoted on a left lower portion of the vehicle body frame 2002, and a main stand 2030 is pivotally supported on a central lower portion of the vehicle body frame 2002. A step 2031 for a fellow passenger that protrudes to the left and right of the vehicle body from the vehicle body frame 2002 is pivotally supported ahead of the guard 2028.

Figure 24:
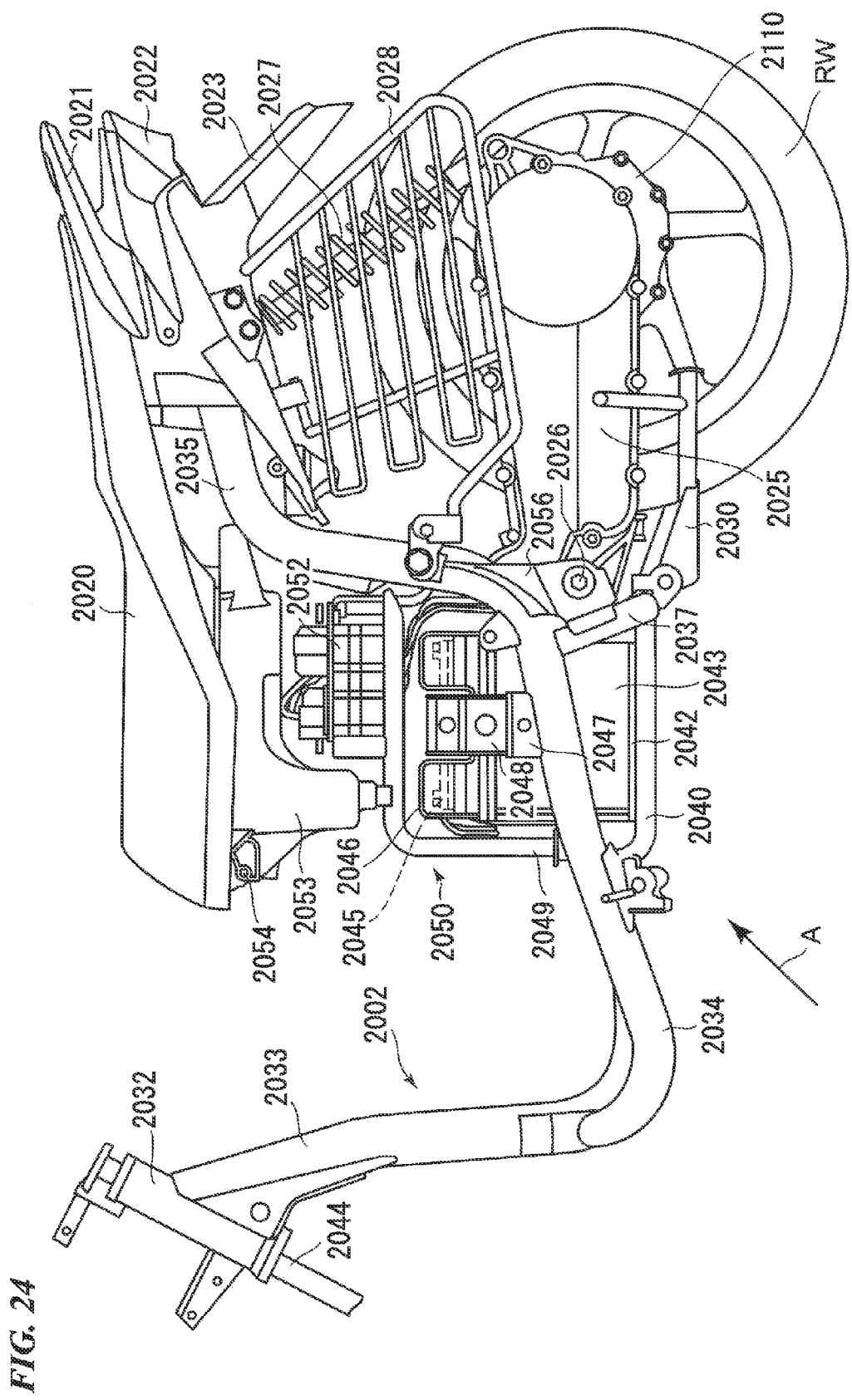
FIG. 24 is a left side view of chief portions of the electric vehicle in which a cover is removed.
Figure 25:
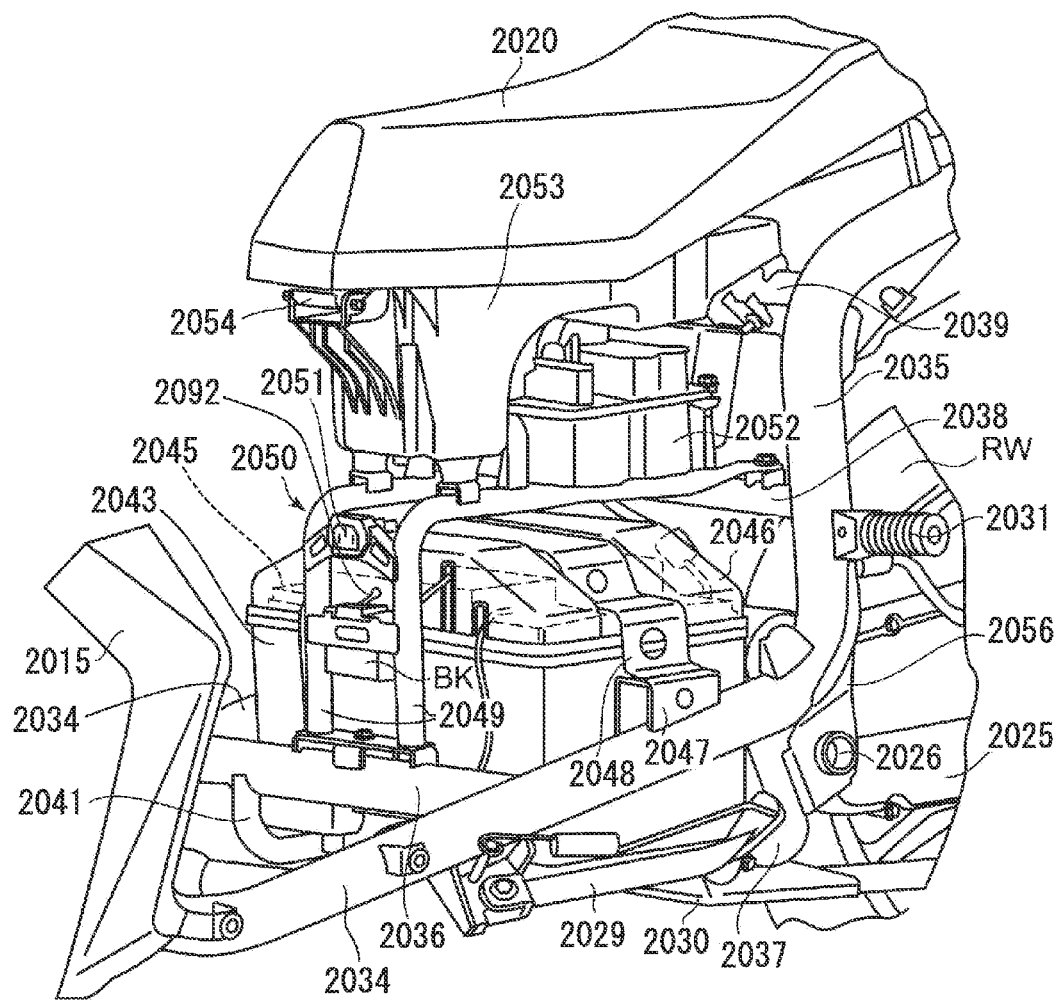
FIG. 25 is a perspective view of the chief portions of the electric vehicle in which the cover is removed.
Figure 26:
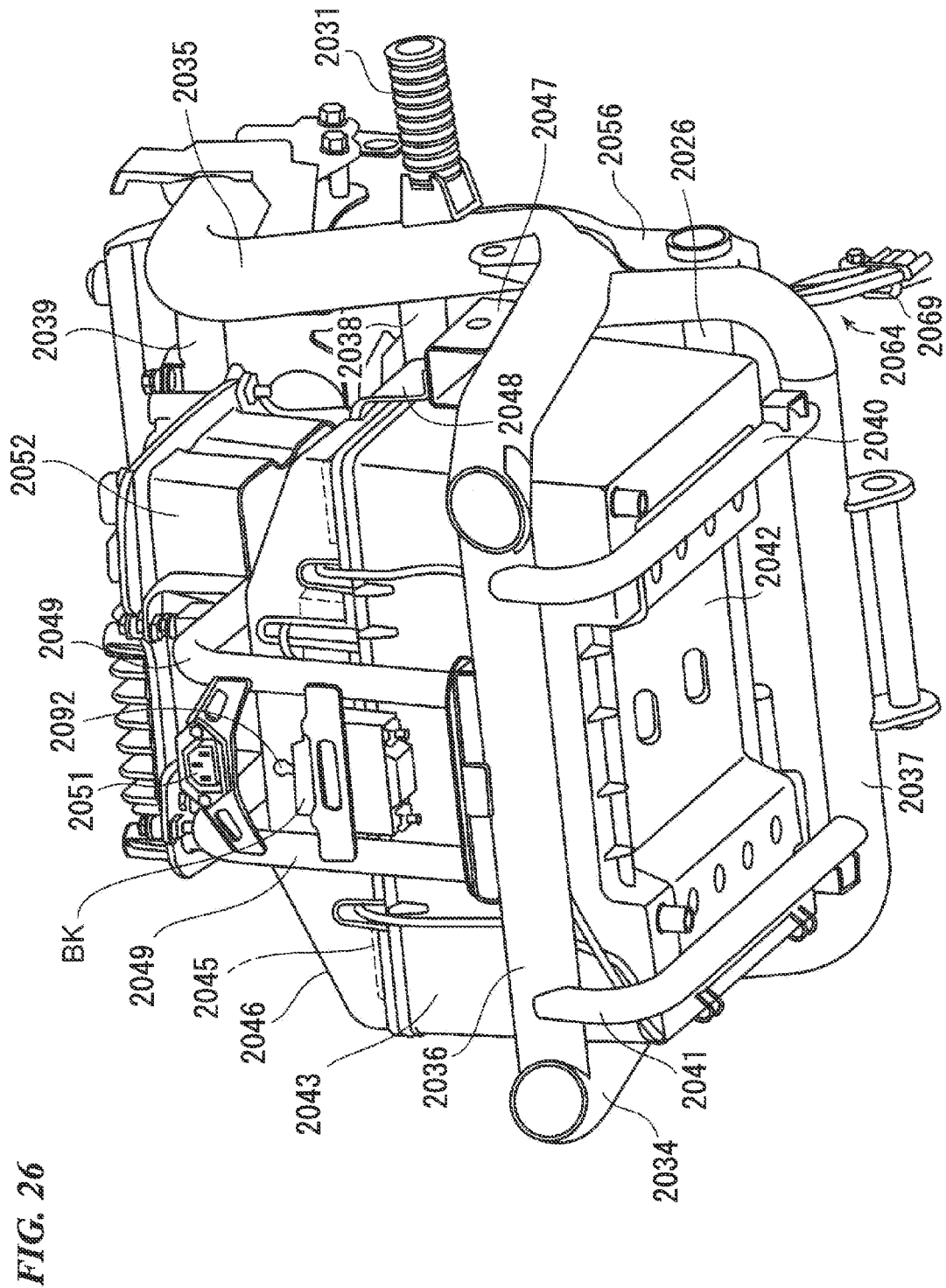
FIG. 26 is a perspective view of the chief portions as seen from the direction of arrow A of FIG. 24.

FIG. 24 is a left side view of chief portions of the electric vehicle 2001 from which the covers are removed, FIG. 25 is a perspective view of the chief portions of the electric vehicle 2001 from which the cover is removed, and FIG. 26 is a perspective view of the chief portions as seen from arrow A of FIG. 24. In FIGS. 24 to 26, the vehicle body frame 2002 includes a head pipe 2032 of the front portion of the vehicle body, a down frame 2033 that has a tip joined to the head pipe 2032, and has a rear end that extends downward, a pair of under frames 2034 that are coupled to a lower portion of the down frame 2033, branch to the left and right in the vehicle width direction, respectively, and extend in the vicinity of the rear of the vehicle body, and rear frames 2035 that extend to the upper rear sides of the vehicle body from the under frames 2034.

The left and right under frames 2034 and 2034 are coupled together by crossing pipes 2036 and 2037, and the left and right rear frames 2035 and 2035 are coupled together by the crossing pipes 2038 and 2039. The crossing pipe 2036 arranged near the front of the vehicle body is a straight pipe that nearly linearly couples the under frames 2034 and 2034 together. Additionally, the crossing pipe 2037 that is arranged further toward the vicinity of the rear frames 2035 than the crossing pipe 2036 has a first portion that extends downward from the under frames 2034 and 2034, and a second portion that extends horizontally from the first portion.

The second portion (horizontal portion) of the crossing pipe 2037, and the front crossing pipe 2036 are coupled together by two sub-pipes 2040 and 2041 that extend in the front-and-rear direction of the vehicle body, and a mounting portion structure of a battery box 2043 is provided by the sub-pipes 2040 and 2041, and a plate 2042 that has left and right ends joined to the sub-pipes 2040 and 2041. The side stand 2029 is attached to the under frame 2034 on the left of the vehicle body, and the main stand 2030 is attached to the second portion of the crossing pipe 2037.

The head pipe 2032 rotatably supports a steering shaft 2044. The steering handle 2007 is coupled to an upper portion of the steering shaft 2044, and the front fork 2011 is coupled to a lower portion of the steering shaft.

The battery box 2043 houses a plurality of (for example, four) batteries (main batteries) 2045 that are aligned in the vehicle width direction. A transparent lid 2046 is put on an upper portion of the battery box. The battery box 2043 is retained on a plate 2042, using a band 2048 that has both ends coupled to a bracket 2047 joined to the under frames 2034 and 2034.

Moreover, a mount 2050 having two pipes 2049 and 2049 that have both ends coupled to the crossing pipe 2038 bridged between the rear frames 2035 and 2035 and to the crossing pipe 2036 near the front bridged between the under frames 2034 and 2034 is provided over the battery box 2043. A front portion of the mount 2050 is provided with a charge coupler 2051 capable of being connected to an external charger. A breaker BK is provided between the two pipes 2049 and 2049 that have the mount 2050, and is located below the charge coupler 2051. The breaker BK is connected between the plurality of batteries 2045 that are connected in series, and is used to operate a knob 2092 manually during the maintenance of the batteries 2045, a control device 2052 or the like to cut off electric power.

The mount 2050 mounts and supports the control device 2052. Additionally, the mount 2050 supports the storage box 2053 that extends in the front-and-rear direction of the vehicle body over the control device 2052, in cooperation with the crossing pipe 2039. The storage box 2053 provides a space that can house some things that a user carries.

The tandem seat 2020 also serves as a lid that covers an upper portion of the storage box 2053. Moreover, the tandem seat 2020 is supported by the storage box 2053 so as to be openable and closable with a hinge 2054 provided at a front portion of the tandem seat as a pivot shaft. The control device 2052 has a DC-DC converter, a battery management unit (BMU), a power drive device (PDU) that controls an electric motor to be described below, and the like. Additionally, the control device 2052 may include a sub-battery that is charged by the batteries 2045, and outputs the control voltage of the control device 2052 or a voltage that biases lighting systems, such as a headlight, and a blinker.

Brackets (pivot plates) 2056 are joined to intermediate regions between the under frames 2034 and the rear frames 2035 and the first portion of the crossing pipe 2037. A pair of left and right brackets 2056 are provided, and both ends of the pivot shaft 2026 are supported by these brackets.

Figure 22:
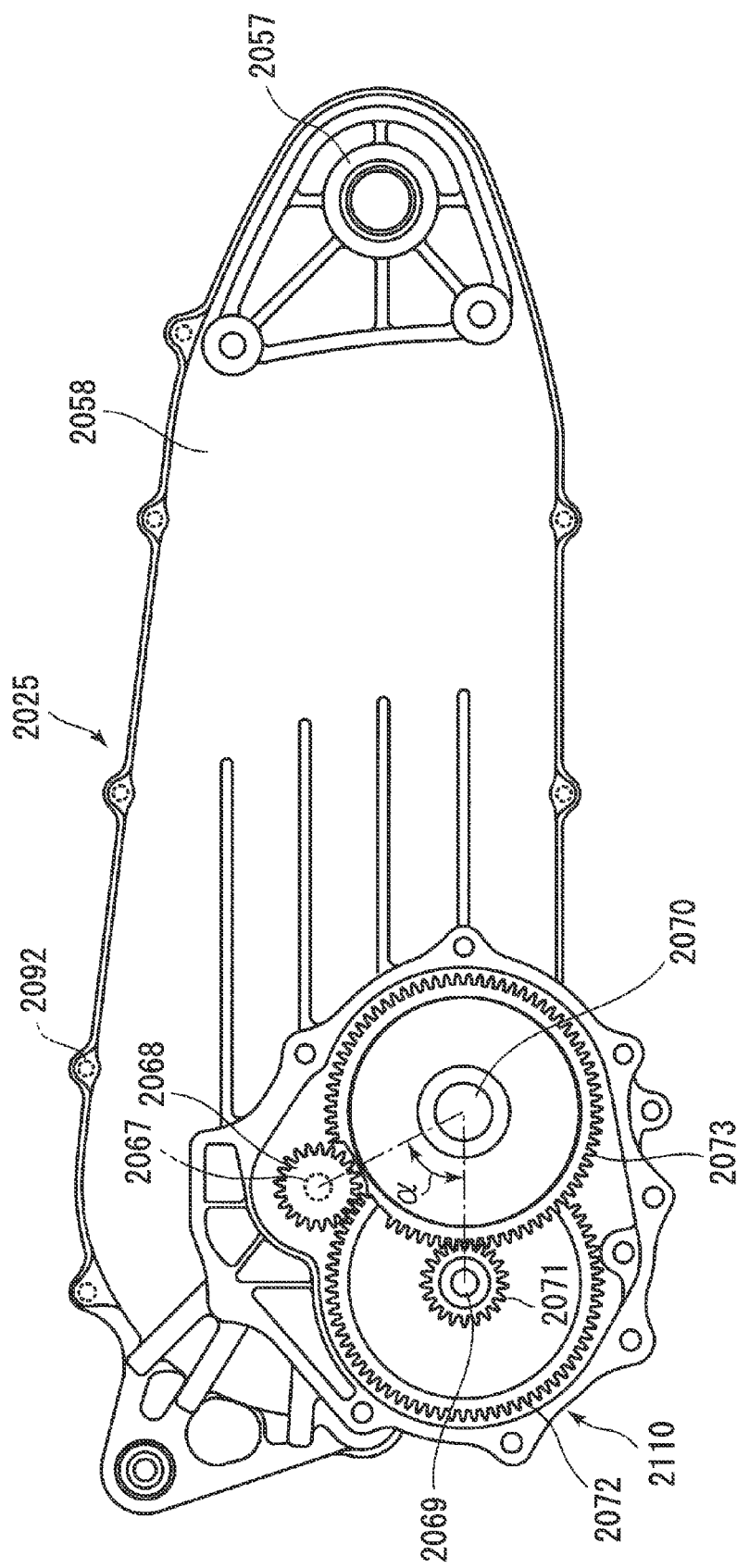
FIG. 22 is a partially exploded right side view of a drive device related to a second embodiment of the invention.
Figure 27:
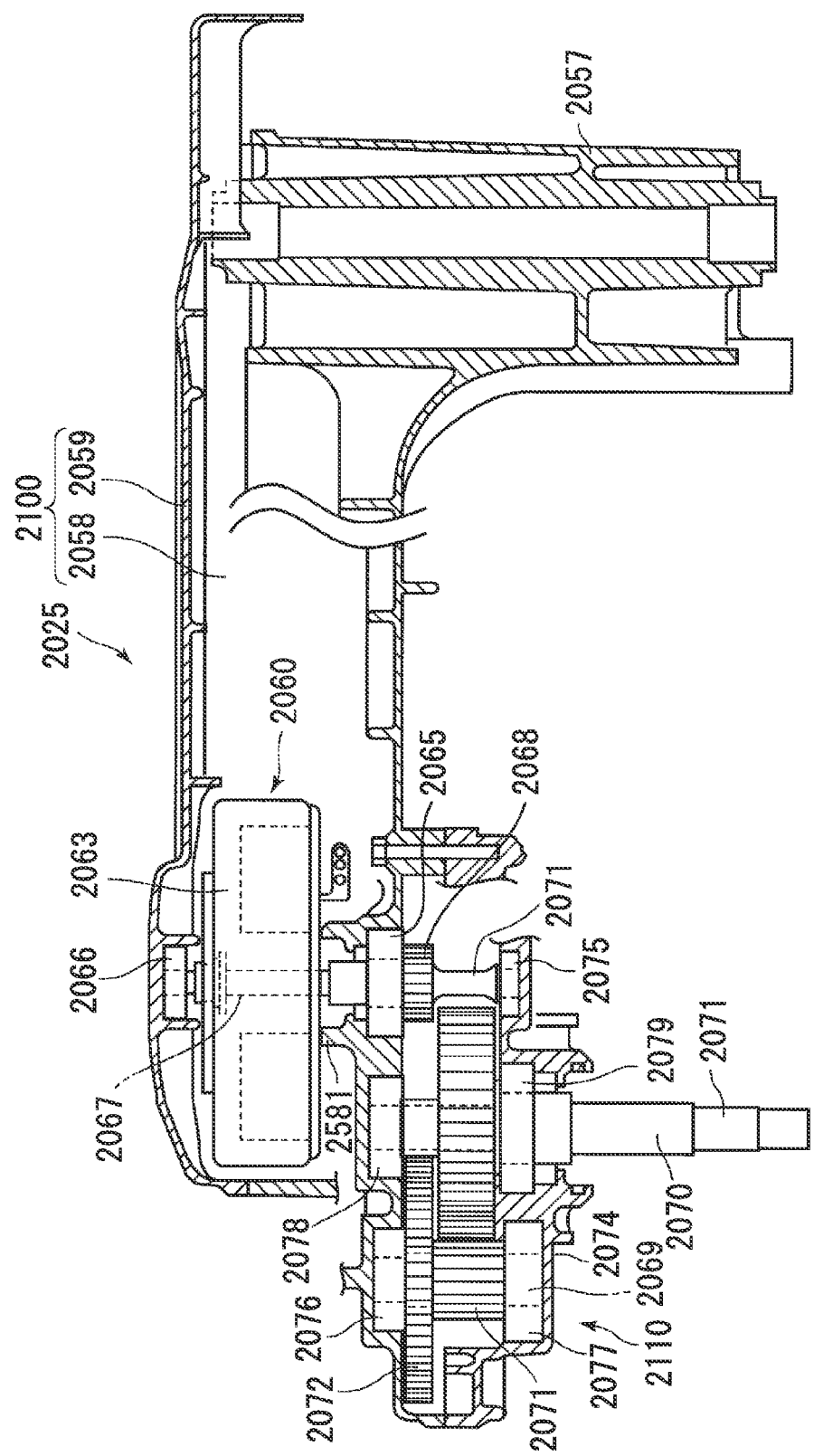
FIG. 27 is a plan cross-sectional view of the drive device including the swing arm.
Figure 28:
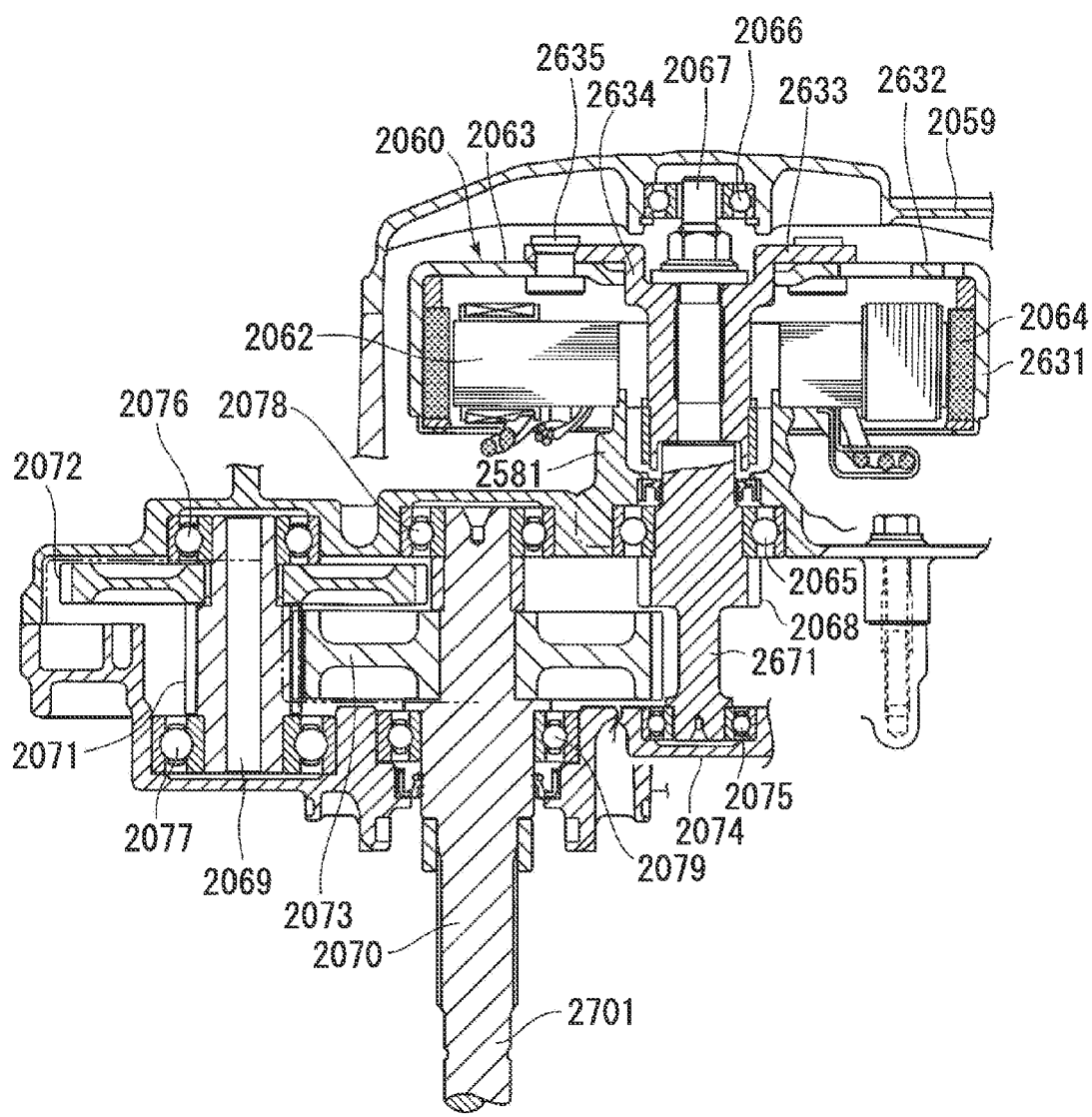
FIG. 28 is an enlarged view of chief portions of FIG. 27.
Figure 29:
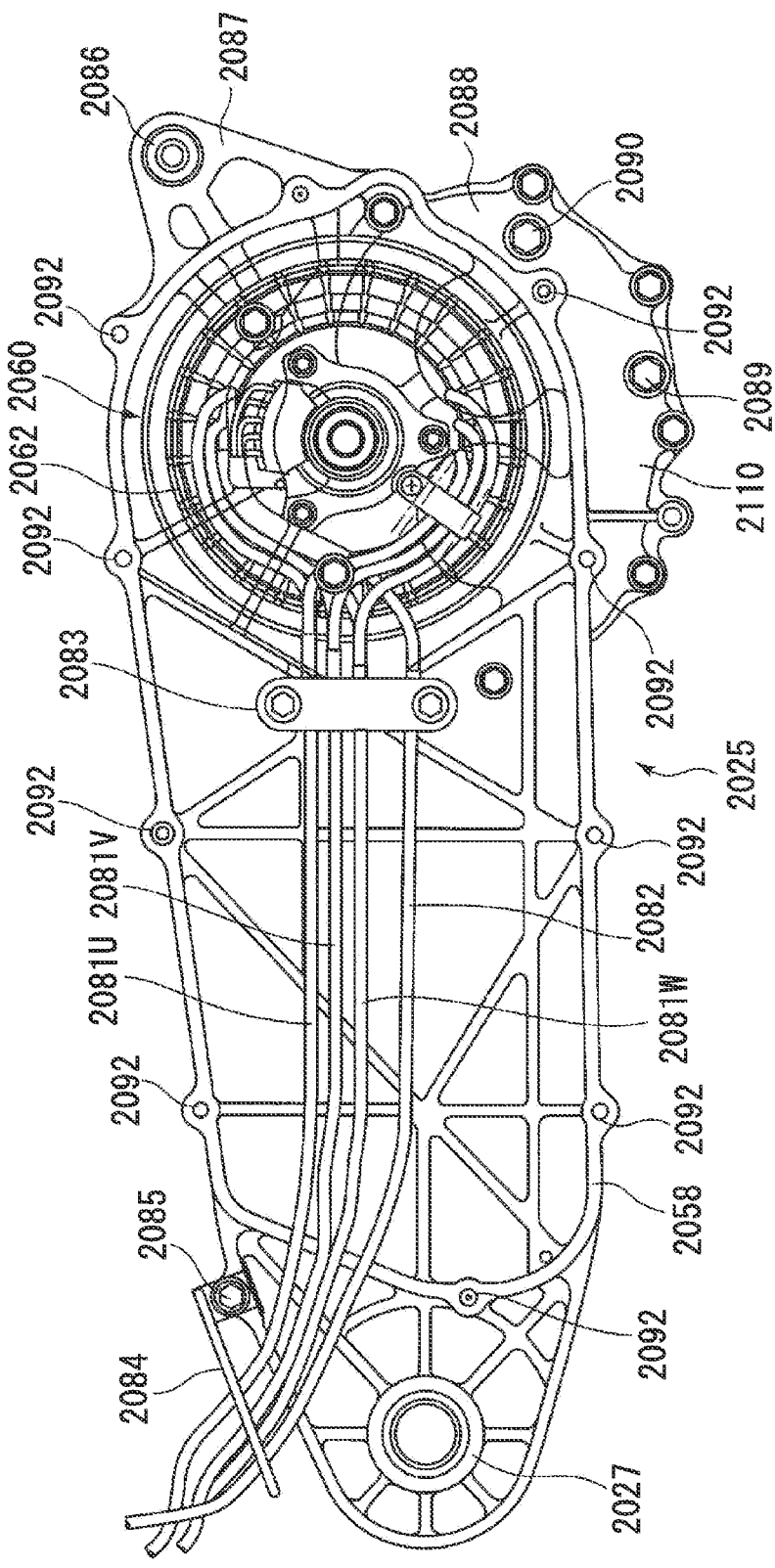
FIG. 29 is a partially exploded left side view of the drive device including the swing arm.

FIG. 22 is a right side view of the swing arm including the speed-reducing mechanism, FIG. 27 is a plan cross-sectional view of the drive device including the swing arm, FIG. 28 is an enlarged view of chief portions of FIG. 27, and FIG. 29 is a vehicle body right side view of the swing arm from which a case portion cover is removed. In addition, FIGS. 27 and 28 show that respective shafts of the speed-reducing mechanism are deployed in a plane in order to avoid that a plurality of gears of the speed-reducing mechanism overlap each other and become complicated, when the swing arm is seen in a plan view.

In FIG. 22 and FIGS. 27, 28, and 29, the swing arm 2025 has a pivot portion 2057 that is rotatably supported by the pivot shaft 2026 that has both ends coupled to the pivot plates 2056, a case portion 2058 that extends to the rear of the vehicle body from a position biased leftward in the vehicle width direction with respect to the pivot portion 2057, and a case portion cover 2059 that covers and a left side portion of the case portion 2058. The case portion cover 2059 is fastened to the case portion 2058 with a plurality of bolts (to be described below in relation to FIG. 30). Thereby, a swing arm portion 2100 is provided by the case portion cover 2059 and the case portion 2058. Reference numeral 2092 shown in FIG. 22 designates a screw hole into which a bolt is screwed. An electric motor (hereinafter simply referred to as "motor") 2060 is provided near the rear of the vehicle body in the case portion 2058, and a speed-reducing mechanism 2110 that reduces the output rotation of the motor 2060 and transmits the reduced rotation to the rear wheel RW is also provided in the case portion. The speed-reducing mechanism 2110 includes the case portion 2058 of the arm portion 2100 that houses shafts and gears to be described below, and a speed-reducing mechanism cover 2074.

As shown in FIG. 28, the motor 2060 has a stator 2062 around which three-phase winding is are wound, and a rotor 2063 that rotates along an outer peripheral surface of the stator 2062. The rotor 2063 has a peripheral wall 2631 that retains a permanent magnet 2064 arranged so as to face the outer peripheral surface of the stator 2062, a bottom 2632 that has a surface orthogonal to the peripheral wall 2631, and a hub 2634 including a flange 2633 that runs along the surface of the bottom 2632. The bottom 2632 and the flange 2633 are joined and integrated by rivets 2635 in a plurality of locations.

The motor 2060 has an intermediate portion supported by a bearing 2065 provided at the case portion 2058. Moreover, the motor 2060 includes a drive shaft 2067 that has one end portion supported by a bearing 2066 provided at the case portion cover 2059. The rotor 2063 is fixed to the drive shaft 2067 between the bearing 2065 and the bearing 2066. The case portion 2058 is provided with a boss 2581 that protrudes to the motor 2060 side, and the stator 2062 of the motor 2060 is fixed to an end portion of the boss 2581.

The speed-reducing mechanism 2110 coupled to the drive shaft 2067 reduces the output rotation of the motor 2060 by the drive shaft 2067 in two steps, and transmits the reduced output rotation to a final shaft 2070. The drive shaft 2067 has a portion 2671 that protrudes from the case portion 2058 to the speed-reducing mechanism 2110 side. A driving gear 2068 is provided integrally with the protruding portion 2671. The speed-reducing mechanism 2110 has an idling shaft 2069 and the final shaft 2070. The idling shaft 2069 includes a first-stage idling gear 2072 that meshes with the driving gear 2068, and a second-stage idling gear (idling pinion) 2071 that meshes with the final gear 2070. The idling pinion 2071 is formed integrally with the idling shaft 2069. The final gear 2073 is coupled to the final shaft 2070.

An end portion of the protruding portion 2671 of the drive shaft 2067 is supported by a bearing 2075 provided at the speed-reducing mechanism case 2074. The idling shaft 2069 has one end (idling gear side) supported by a bearing 2076 provided at the case portion 2058. Moreover, the idling shaft has the other end (idling pinion side) supported by a bearing 2077 provided at the speed-reducing mechanism case 2074. The final shaft 2070 has one end supported by a bearing 2078 provided at the case portion 2058. Moreover, the final shaft has an intermediate portion supported by a bearing 2079 provided at the speed-reducing mechanism case 2074. The final shaft 2070 passes through the bearing 2079, and extends from the speed-reducing mechanism case 2074. An extending portion 2701 of the final shaft 2070 is coupled to the hub of the rear wheel RW. The coupling structure between the rear wheel RW and the final shaft 2070 will be described below.

The arrangement relationship of the drive shaft 2067, the idling shaft 2069, and the final shaft 2070 in a side view is set as shown in FIG. 22. That is, the final shaft 2070 among these three shafts is arranged near the foremost of the vehicle body (near the pivot portion 2057). The drive shaft 2067 is arranged on the rear side of the vehicle body above the final shaft 2070. The idling shaft 2069 is arranged on the lower rear side of the drive shaft 2067. When a triangle having the axial center of the drive shaft 2067, the axial center of the idling shaft 2069, and the axial center of the final shaft 2070 as vertexes in a side view is assumed, the interior angle (a smaller angle of angles formed by first and second segments) a formed by the first segment that connects the axial center of the drive shaft 2067 and the axial center of the idling shaft 2069 and the second segment that connects the axial center of the final shaft 2070 and the axial center of the idling shaft 2069 is set so as to become an acute angle. Thereby, the speed-reducing mechanism 2110 becomes compact in the up-and-down direction. Particularly, as can be understood from FIG. 22, it is preferable that the lengths of the segments that connect the respective vertexes in the triangle that has the axial center of the drive shaft 2067, the axial center of the idling shaft 2069, and the axial center of the final shaft 2070 as vertexes in a side view be equal to each other. That is, it is preferable that these axial centers be respectively located at the vertexes of a substantially equilateral triangle. That is, it is preferable that the angle α formed by the first segment and the second segment be about 60 degrees. Thereby, the shaft-to-shaft distance among the drive shaft 2067, the idling shaft 2069, and the final shaft 2070 becomes short. The speed-reducing mechanism 2110 may be settled inside the wheel in a vehicle side view. Even if an in-wheel type in which the speed-reducing mechanism 2110 is arranged so as to overlap the wheel in a vehicle width direction is adopted in this way, the drive device related to the present embodiment is easily applied to a smaller-diameter wheel.

Additionally, the idling gear 2072 has a larger diameter than the driving gear 2068. Moreover, the idling gear 2072 is set so as to mesh with the driving gear 2068 at a position biased further toward to the front of the vehicle body than the idling shaft 2069. That is, the driving gear 2068 meshes with the idling gear 2072 below the highest position of the idling gear 2072. Thereby, the speed-reducing mechanism 2110 becomes more compact in the up-and-down direction.

Moreover, it is desirable that the idling gear 2072 and final gear 2073 have nearly the same appearance, and the idling shaft 2069 and the final shaft 2070 be arranged substantially at the same height in the up-and-down direction. If the idling shaft 2069 and the final shaft 2070 deviate in the up-and-down direction, the oil level of lubricating oil within the speed-reducing mechanism 2110 should be secured according to the height position of a shaft located on the upper side among these shafts. In this regard, if the idling shaft 2069 and the final shaft 2070 are nearly horizontal, that is, substantially at the same height, the amount of lubricating oil within the speed-reducing mechanism case 2074 can be lessened.

In FIG. 29, the three-phase winding provided at the stator 2062 of the motor 2060 is led out as lead cables 2081U, 2081V, and 2081W in two locations from the motor 2060. Additionally, the motor 2060 includes sensor harness 2082 that detects the rotational angle of the drive shaft 2067. The sensor harness 2082 is obtained by bundling a plurality of sensor signal lines. The cables 2081U, 2081V, and 2081W and the sensor harness 2082 are fixed to the case portion 2058 by a clamp 2083 in the vicinity of the motor 2060 (between the motor 2060 and the pivot portion 2057). The cables and the sensor hardness are further guided from the fixation location to the front of the vehicle body, that is, in the direction of the pivot portion 2057. A second clamp 2084 that bundles the three-phase cables 2081U, 2081V, and 2081W and the sensor harness 2082 is fixed to a surrounding wall of the case portion 2058 in the pivot portion 2057 with a bolt 2085.

A bracket 2087 having a bearing 2086 is provided at an end portion of the case portion 2058 on the rear side of the vehicle body. A shaft that couples an end portion of the rear suspension 2027 is supported. Additionally, an overhanging portion 2088 that is united with the speed-reducing mechanism case 2074 and becomes as a cover of the speed-reducing mechanism case 2110 is provided at a lower end portion of the case portion 2058 on the rear side of the vehicle body. The overhanging portion 2088 is provided with an oil drain and an oil check hole. The oil drain and the oil check hole are respectively mounted with plugs 2089 and 2090 that are bolts.

Figure 30:
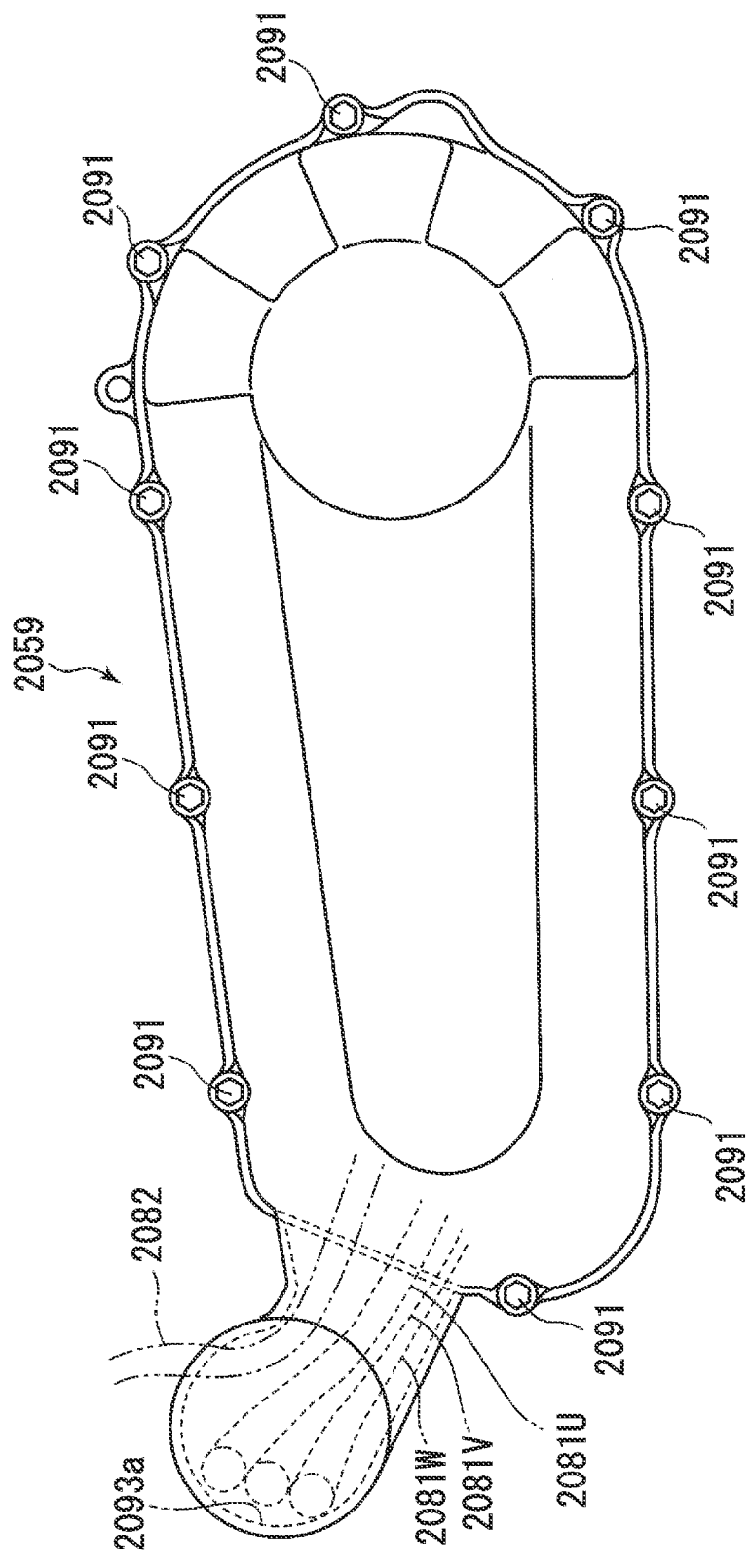
FIG. 30 is a front view of a case portion cover.

FIG. 30 is a front view of the case portion cover. A surrounding wall of the case portion cover 2059 is provided with a plurality of holes through which bolts are inserted. The case portion cover 2059 is attached to the case portion 2058 by passing the bolts 2091 through the holes and threadedly engaging the bolts with the plurality of screw holes 2092 (refer to FIG. 29) provided in the case portion 2058. An extending cover portion 2093 that has a partial cylindrical front wall 2093a that guides the cables in the right direction of the vehicle body overhangs to the vehicle body front of the case portion cover 2059. The three-phase cables 2081U, 2081V, and 2081W and the sensor harness 2082 that are led out from the motor 2060 butt against the front wall 2093a and are guided in the right direction of the vehicle body.

In the drive device of the above configuration, if electric power is supplied to the three-phase winding of the stator 2062 with the batteries, the motor 2060 rotates. The rotation is reduced via the driving gear 2068, and the idling gear 2072 that meshes with the driving gear 2068, and is transmitted to the idling shaft 2069. The reduced rotation of the idling shaft 2069 is further reduced and transmitted to the final gear 2073 from the idling pinion 2071, and rotates the final shaft 2070. In this way, the output of the motor 2060 is reduced in two steps, and is transmitted to the final shaft 2070, to drive the rear wheel RW coupled to the final shaft 2070.

Figure 31:
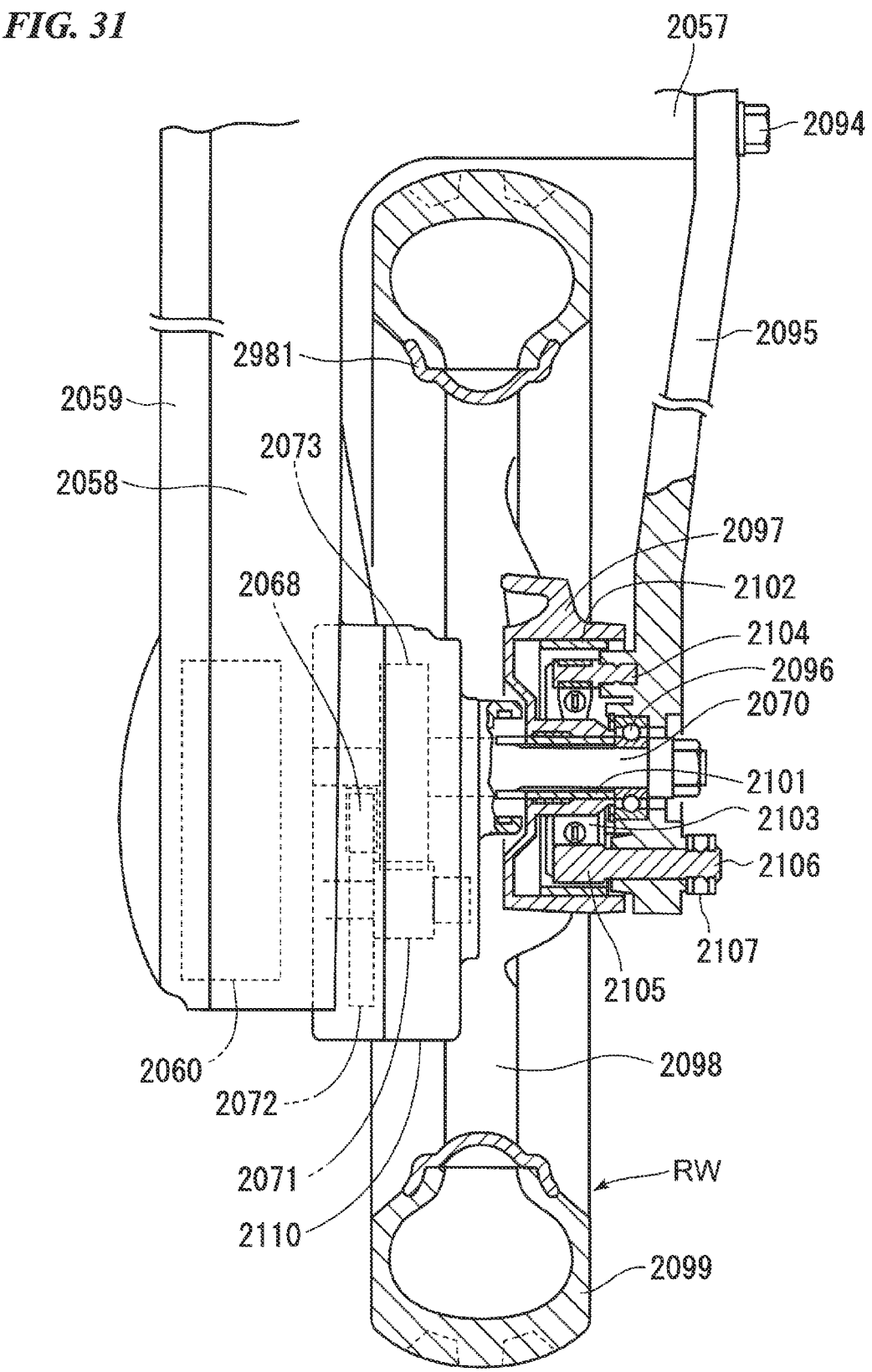
FIG. 31 is a cross-sectional view showing the coupling structure between a final shaft and a rear wheel.

FIG. 31 is a cross-sectional view showing the coupling structure between the final shaft and the rear wheel. In FIG. 31, a bearing plate 2095 is provided on a vehicle body right end surface of the pivot portion 2057 of the swing arm 2025. The bearing plate 2095 has a front portion fixed with a bolt 2094. A rear portion of the bearing plate 2095 is provided with a bearing 2096 that rotatably supports a vehicle body right end portion of the final shaft 2070.

The rear wheel RW has a wheel 2098 having a hub 2097, and a tire 2099 fitted into an outer periphery (an outer periphery of a rim 2981) of the wheel 2098. The hub 2097 of the rear wheel RW is spline-coupled to the final shaft 2070 via a sleeve 2101 fitted into a center hole of the hub 2097. A braking device is provided within the hub 2097. The braking device includes a brake drum 2102 that is fitted to a central portion of the hub 2097 that opens to the right of the vehicle body, and a pair of brake shoes 2103 that face an inner peripheral surface of the brake drum 2102. Moreover, a shaft 2104 that pivotally supports the brake shoe 2103, and a cam shaft 2106 of a cam 2105 that open and close the brake shoe 2103 is supported by the bearing plate 2095. One end of an arm 2107 is fixed to the tip of the cam shaft 2106, and the other end of the arm 2107 is coupled to a brake wire that is not shown.

As shown in FIG. 31, at least the second-stage idling gear 2071 of the two idling gears 2071 and 2072 that meshes with at least the final gear 2073, and the final gear 2073 is arranged at a position that overlaps the rear wheel RW in the width direction of the rear wheel RW.

Figure 32:
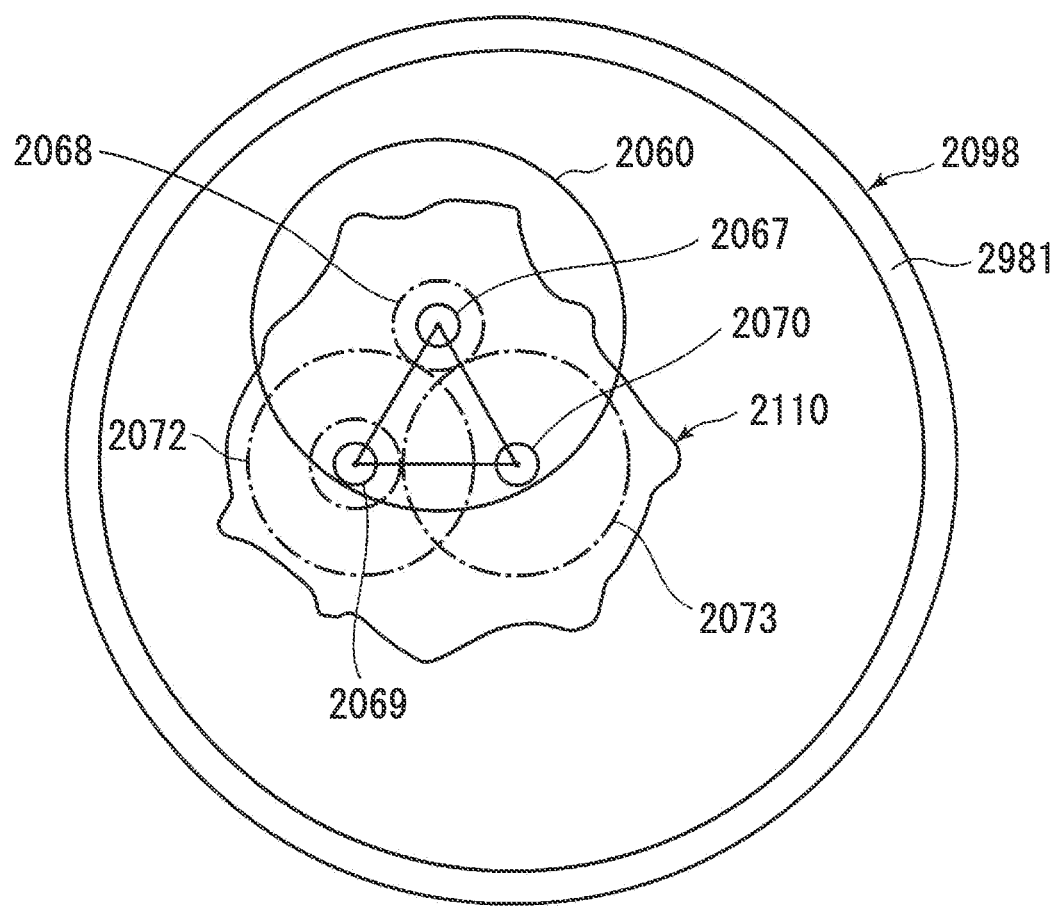
FIG. 32 is a schematic view as seen from the right side of the electric vehicle, showing the positional relationship between a motor and the speed-reducing mechanism within a wheel.

FIG. 32 is a schematic view as seen from the right of the electric vehicle 2001, showing the positional relationship between the motor 2060 and the speed-reducing mechanism 2110 within the wheel 2098. In FIG. 32, the final shaft 2070 is located at the center of the wheel 2098. The axial center of the drive shaft 2067 located on the upper rear side of the vehicle, the axial center of the idling shaft 2069 located on the lower rear side of the drive shaft 2067, and the axial center of the final shaft 2070 are respectively arranged at the vertexes of an equilateral triangle in a side view. The motor 2060 is arranged at a position that overlaps both the idling gears 2071 and 2072 and the final gear 2070 in a vehicle side view. Additionally, all the outlines (that is, the outlines of the speed-reducing mechanism case 2074) of the speed-reducing mechanism 2110 including the driving gear 2068, the idling gears 2071 and 2072, the final gear 2073, and the like are settled inside the wheel 2098, that is, within a range of the minimum diameter of the rim 2981 of the wheel 2098 in a vehicle side view.

Next, a modified example of the above embodiment will be described referring to FIGS. 33, 34, and 35. In this modified example, a speed-reducing mechanism unit in which the speed-reducing mechanism 2110 and a rear portion of the swing arm 2025 are integrated is provided so as to be separable from a front portion of the swing arm 2025.

Figure 33:
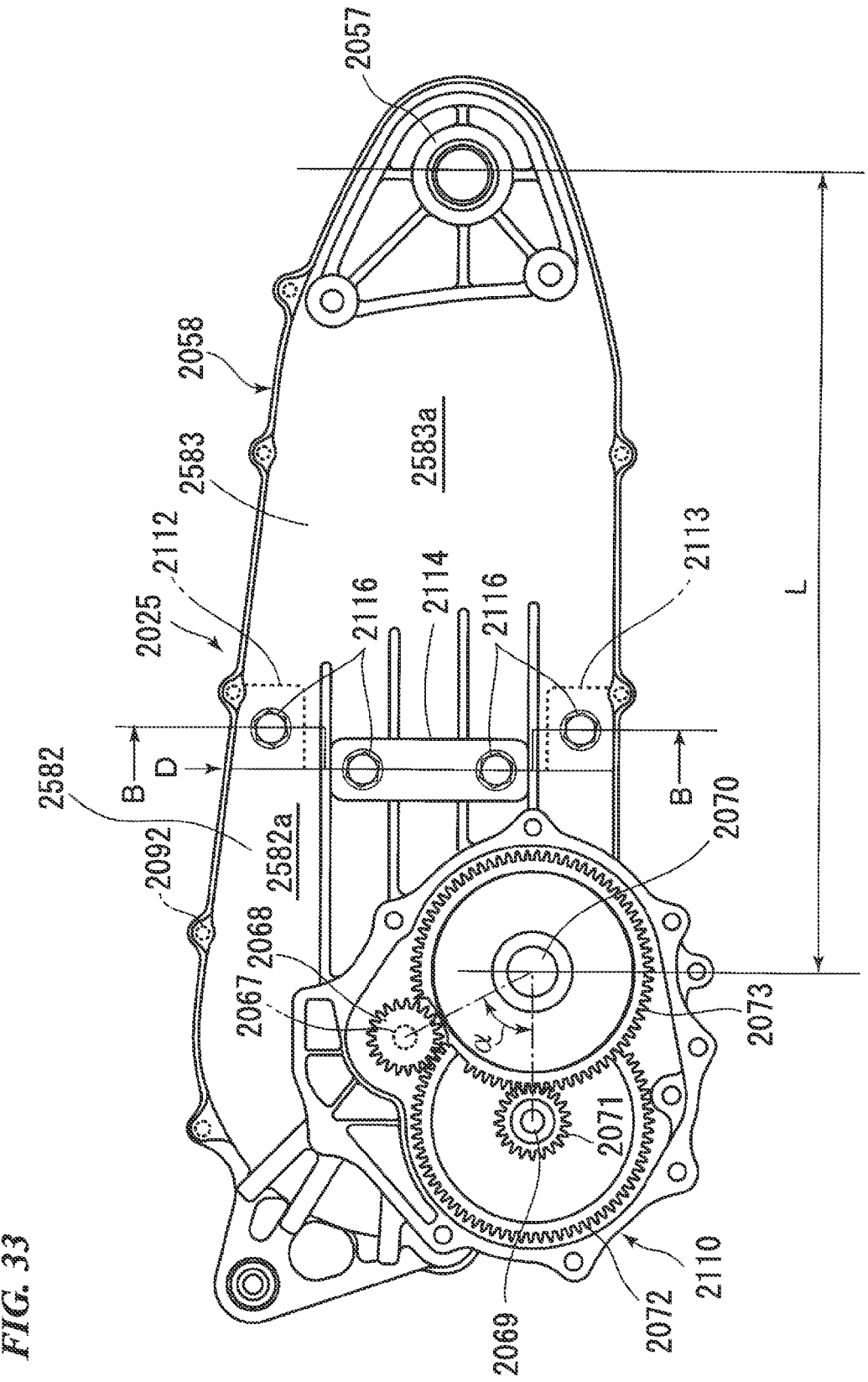
FIG. 33 is a partially exploded right side view of a drive device related to a modified example.
Figure 34:
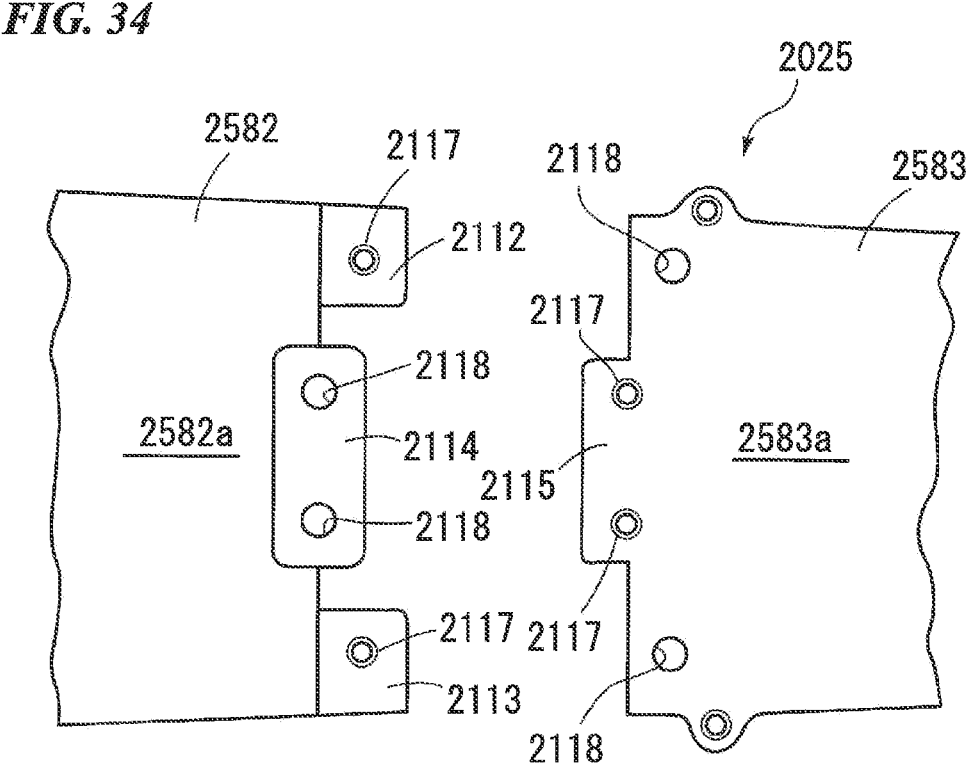
FIG. 34 is a right side view of the chief portions in a state where a speed-reducing mechanism unit and a front portion of the swing arm are separated.
Figure 35:
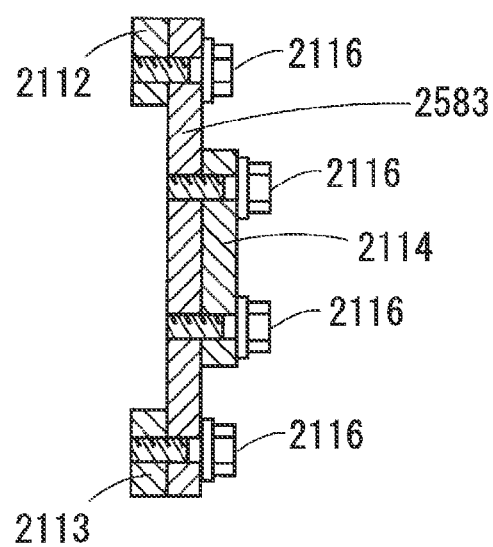
FIG. 35 is a cross-sectional view at position B-B of FIG. 33.

FIG. 33 is a partially exploded right side view of a drive device related to the modified example, FIG. 34 is a right side view of chief portions in a state where the speed-reducing mechanism unit and the front portion of the swing arm are separated, and FIG. 35 is a cross-sectional view at position B-B of FIG. 33. Reference numeral L in the drawing designates the distance between the center of the pivot portion 2057 and the center to center of the final shaft 2070.

The case portion 2058 of the swing arm is separated into two portions 2582 (rear case portion) and 2583 (front case portion) in the front-and-rear direction of the vehicle body at a position shown by arrow D. The front portion 2583 of the swing arm 2025 includes the pivot portion 2057. Tongue pieces 2112, 2113, and 2114 are provided at a front end portion (an end near the pivot portion 2057) of the portion 2582 on the speed-reducing mechanism unit 2111 side. The tongue pieces 2112 and 2113 are respectively arranged above and below the case portion 2058, and are provided so as to be biased to the left of the vehicle body with respect to a principal surface 2582a of the portion 2582. On the other hand, the tongue portion 2114 arranged at an intermediate portion of the tongue pieces 2112 and 2113 in the up-and-down direction of the case portion 2058 is provided so as to be biased to the right of the vehicle body with respect to the principal surface 2582a of the portion 2582. The tongue portion 2114 has a smaller amount of protruding nearer to the pivot portion 2057 than the tongue pieces 2112 and 2113, and also extends near the peed-reducing mechanism 2110.

On the other hand, another portion 2583 having the case portion 2058 protrudes near the speed-reducing mechanism 2110 at the intermediate position of the portion 2583 in the up-and-down direction. Additionally, the portion 2583 has a tongue piece 2115 that is set so as to engage the tongue piece 2114 on the left of the vehicle body. The tongue piece 2115 is flush with a principal surface 2583a of the portion 2583.

Screw holes 2117 with which bolts 2116 are threadedly engaged are provided in the tongue pieces 2112 and 2113 of the portion 2582 and the tongue piece 2115 of the portion 2583. Bolt through holes 2118 that enable the bolts 2116 to pass therethrough are provided in the upper and lower sides of the tongue piece 2114 of the portion 2582 and the upper and lower sides of the portion 2583. The bolts 2116 are threadedly engaged with the screw holes 2117.

As described above, in the electric saddled vehicle in the above embodiment, as an aspect that is not indispensable, the drive motor 2060 may be housed in the speed-reducing mechanism 2110, and the swing arm 2025 may further have the pivot portion 2057 and the arm portion 2100. The pivot portion 2057 may be pivotally supported by the vehicle body frame 2002, the arm portion 2100 may extend to the rear side of the vehicle body from the pivot portion 2057 and support the rear wheel RW at the rear end portion of the vehicle body, the drive motor 2060 may drive the rear wheel RW, the speed-reducing mechanism 2110 may further have the output shaft 2067 of the drive motor 2060, the final shaft 2070 coupled to the rear wheel RW, and the idling shaft 2069 that supports the two idling gears (2071, 2072), the two idling gears may reduce the rotation of the output shaft 2067 to transmit the reduced rotation to the final shaft 2070, the output shaft 2067 may be arranged on the upper rear side of the final shaft 2070, the idling shaft 2069 may be arranged on the lower rear side of the output shaft 2067, and the interior angle formed by the first segment that connects the axial center of the final shaft 2070 and the axial center of the output shaft 2067 and the second segment that connects the axial center of the final shaft 2070 and the axial center of the idling shaft 2069 may form an acute angle in a side view.

In the electric saddled vehicle of this embodiment, the speed-reducing mechanism 2110 may be settled inside the wheel 2098 of the rear wheel RW in a side view.

In the electric saddled vehicle of this embodiment, the final gear 2073 may be supported by the final shaft 2070. One of the two idling gears of the idling shaft 2069 may be the second-stage idling gear 2071 that meshes with the final gear 2073. The final gear 2073 and the second-stage idling gear 2071 may be arranged at a position that overlaps the rear wheel RW as seen from the rear.

In the electric saddled vehicle of this embodiment, one of the two idling gears of the idling shaft 2069 may be the first-stage idling gear 2072 that meshes with the output shaft 2067. The driving gear 2068 provided at the output shaft 2067 may mesh with the first-stage idling gear 2072 at a position further toward the front of the vehicle body than the idling shaft 2069.

In the electric saddled vehicle of this embodiment, the drive motor 2060 may be arranged at a position that overlaps the two idling gears (2071, 2072) and the final gear 2073 in a vehicle side view.

In the electric saddled vehicle of this embodiment, the axial center of the output shaft 2067, the axial center of the idling shaft 2069, and the axial center of the final shaft 2070 may be arranged so as to be respectively located at the vertexes of an equilateral triangle, in a side view.

In the electric saddled vehicle of this embodiment, the idling shaft 2069 and the final shaft 2070 may be arranged substantially at the same height.

In the electric saddled vehicle of this embodiment, the swing arm 2025 may further have the rear case portion 2582 integrated with the case of the speed-reducing mechanism 2110; and the front case portion 2583 that is separably joined to the rear case portion 2582 and has the pivot portion.

In addition, although FIGS. 33 to 35 show the junction structure of the case portion 2058 of the swing arm 2025, the case portion cover 2059 can also be similarly provided. In addition, the case portion 2058 may have a split structure, and either a split type or an integral type may be selected as the case portion cover 2059.

According to this modified example, the rear portion 2582 and the front portion 2583 of the case portion 2058 joined by the bolts 2116 can be commonly used for various vehicles without changing the design of a chief portion of the swing arm 2025 including the pivot portion 2057, that is, the front portion 2583 when the motor 2060 and the speed-reducing mechanism 2110 are selected according to the specification required for the vehicle ranks or the like of the electric vehicle 2001.

INDUSTRIAL APPLICABILITY

According to the electric saddled vehicle, the left-and-right balance in the swing unit as a single body can be improved, using the drive wheel, the drum brake, the speed-reducing mechanism, and the like in the existing unit swing type vehicle.

REFERENCE SIGNS LIST

1: MOTORCYCLE (ELECTRIC SADDLED VEHICLE)
7: REAR WHEEL (DRIVE WHEEL)
SL: LEFT END SURFACE (END SURFACE OF FIRST SIDE)
SR: RIGHT END SURFACE (END SURFACE OF SECOND SIDE)
8: DRIVE MOTOR
11: VEHICLE BODY FRAME
18: SWING ARM
18U: SWING UNIT
19: GEAR MECHANISM (SPEED-REDUCING MECHANISM)
19d: SECOND LARGER-DIAMETER GEAR (WHEEL DRIVE PORTION)
71: DRUM BRAKE
72: BRAKE DRUM
73: BRAKE BASE (BRAKE PANEL)
81: GEAR CASE (SPEED-REDUCER CASE)
83: INNER CASE HALF BODY (CASE HALF BODY)
D1, D2: MATING PLANE
87: REAR AXLE (DRIVE SHAFT)
B3R: BEARING
OS: OIL SEAL
96: CASE HUB PORTION
97: ANNULAR RECESS
98: DRAIN PASSAGE
2001: ELECTRIC VEHICLE
2002: VEHICLE BODY FRAME
2025: SWING ARM
2057: PIVOT PORTION
2058: CASE PORTION OF SWING ARM
2059: CASE PORTION COVER
2060: MOTOR
2067: DRIVE SHAFT
2068: DRIVING GEAR
2069: IDLING SHAFT
2070: FINAL SHAFT
2071: SECOND-STAGE IDLING GEAR
2072: FIRST-STAGE IDLING GEAR
2073: FINAL GEAR
2098: WHEEL
2110: SPEED-REDUCING MECHANISM (SPEED REDUCER)

The invention claimed is:
1. An electric saddled vehicle comprising:
a vehicle body frame;
a drive wheel;

a drum brake that brakes the drive wheel; and
a swing unit that is swingably supported by the vehicle body frame, wherein the swing unit includes:
a drive motor configured separately from the drive wheel; and
a speed-reducing mechanism that transmits a power from the drive motor, to the drive wheel and has a wheel drive portion,
wherein if one of a left side and a right side with respect to a center of the vehicle in a left-right direction is defined as a first side and an other is defined as a second side and if an end surface of the drive wheel on the first side is defined as a first end surface and an end surface of the drive wheel on the second side is defined as a second end surface,
the drive motor and the speed-reducing mechanism are disposed on the first side,
the drum brake is arranged on the second side,
the wheel drive portion is arranged between the center of the vehicle in the left-right direction and the first end surface of the drive wheel,
a brake drum of the drum brake is arranged at a position where the brake drum overlaps the second end surface of the drive wheel in a plan view, and
a cam shaft of the drum brake is arranged at a position that overlaps the second end surface in a plan view.

2. The electric saddled vehicle according to claim 1,
wherein the swing unit further has a swing arm and a speed-reducer case that houses the speed-reducing mechanism,
wherein a front portion of the swing arm is supported by the vehicle body frame, and a rear portion of the swing arm supports the drive wheel,
wherein the speed-reducer case has:
an outer case half body formed integrally with the swing arm; and
an inner case half body attached to the outer case half body from a left-and-right center side of the vehicle body, and
wherein a mating plane between the outer case half body and the inner case half body is arranged so that a distance to the first end surface of the drive wheel is shorter than a distance to the left-and-right center of the vehicle body.

3. The electric saddled vehicle according to claim 2,
wherein the swing unit further has:
a case hub portion that is provided at the inner case half body and has an opening;
a drive shaft that is rotatably supported by the case hub portion via a bearing, protrudes to an outside of the speed-reducer case through the inner case half body, and rotates integrally with the wheel drive portion; and
an oil seal that is arranged between the opening in an inner periphery of the case hub portion, and the bearing, and
wherein an annular recess is provided between the opening in the inner periphery of the case hub portion and the oil seal.

4. The electric saddled vehicle according to claim 3,
wherein the annular recess is provided with an opening, and a drain passage is provided to allow a communication from the opening of the annular recess to the first side of the swing unit.

5. The electric saddled vehicle according to claim 2,
wherein a distance from the wheel drive portion to the left-and-right center of the vehicle body is shorter than a distance from the first end surface to the left-and-right center of the vehicle body.

6. The electric saddled vehicle according to claim 2,
wherein the brake drum has an opening covered with a brake panel, and
wherein a mating plane between the brake drum and the brake panel is arranged so that a distance to the second end surface of the above is shorter than a distance to the left-and-right center of the vehicle body.

7. The electric saddled vehicle according to claim 1,
wherein a distance from the wheel drive portion to the left-and-right center of the vehicle body is shorter than a distance from the first end surface to the left-and-right center of the vehicle body.

8. The electric saddled vehicle according to claim 1,
wherein the drive motor is housed in the speed-reducing mechanism,
wherein the swing arm further has a pivot portion and an arm portion,
wherein the pivot portion is pivotally supported by the vehicle body frame,
wherein the arm portion extends to a rear side of the vehicle body from the pivot portion and supports a rear wheel at a rear end portion of the vehicle body,
wherein the drive motor drives the rear wheel,
wherein the speed-reducing mechanism further has an output shaft of the drive motor, a final shaft coupled to the rear wheel, and an idling shaft that supports two idling gears,
wherein the two idling gears reduce the rotation of the output shaft to transmit the reduced rotation to the final shaft,
wherein the output shaft is arranged on an upper rear side of the final shaft,
wherein the idling shaft is arranged on a lower rear side of the output shaft, and
wherein an interior angle formed by a first segment that connects an axial center of the final shaft and an axial center of the output shaft and a second segment that connects the axial center of the final shaft and an axial center of the idling shaft forms an acute angle in a side view.

9. The electric saddled vehicle according to claim 8,
wherein the speed-reducing mechanism is settled inside a wheel of the rear wheel in a side view.

10. The electric saddled vehicle according to claim 9,
wherein a final gear is supported by the final shaft,
wherein one of the two idling gears of the idling shaft is a second-stage idling gear that meshes with the final gear, and
wherein the final gear and the second-stage idling gear are arranged at a position that overlaps the rear wheel as seen from a rear.

11. The electric saddled vehicle according to claim 9,
wherein the drive motor is arranged at a position that overlaps the two idling gears and the final gear in a vehicle side view.

12. The electric saddled vehicle according to claim 9,
wherein the axial center of the output shaft, the axial center of the idling shaft, and the axial center of the final shaft are arranged so as to be respectively located at the vertices of an equilateral triangle in a side view.

13. The electric saddled vehicle according to claim 8,
wherein one of the two idling gears of the idling shaft is a first-stage idling gear that meshes with the output shaft, and
wherein a driving gear provided at the output shaft meshes with the first-stage idling gear at a position further toward a front of the vehicle body than the idling shaft.

14. The electric saddled vehicle according to claim 8,
wherein the idling shaft and the final shaft are arranged substantially at a same height.

15. The electric saddled vehicle according to claim 8,
wherein the swing arm further has a rear case portion integrated with a case of the speed-reducing mechanism; and a front case portion that is separably joined to the rear case portion and has the pivot portion.

16. The electric saddled vehicle according to claim 8,
wherein the drive motor is arranged at a position that overlaps the two idling gears and the final gear in a vehicle side view.

17. The electric saddled vehicle according to claim 8,
wherein the axial center of the output shaft, the axial center of the idling shaft, and the axial center of the final shaft are arranged so as to be respectively located at the vertices of an equilateral triangle in a side view.

18. The electric saddled vehicle according to claim 1,
wherein the brake drum has an opening covered with a brake panel, and
wherein a mating plane between the brake drum and the brake panel is arranged so that a distance to the second end surface of the above is shorter than a distance to the left-and-right center of the vehicle body.

\* \* \* \* \*